US010542141B2

(12) United States Patent
Engelke et al.

(10) Patent No.: US 10,542,141 B2
(45) Date of Patent: *Jan. 21, 2020

(54) SEMIAUTOMATED RELAY METHOD AND APPARATUS

(71) Applicant: ULTRATEC, INC., Madison, WI (US)

(72) Inventors: Robert M. Engelke, Madison, WI (US); Kevin R. Colwell, Middleton, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,954

(22) Filed: Apr. 3, 2017

(65) Prior Publication Data

US 2017/0208172 A1  Jul. 20, 2017

Related U.S. Application Data

(63) Continuation of application No. 14/632,257, filed on Feb. 26, 2015.
(Continued)

(51) Int. Cl.
*H04M 11/00* (2006.01)
*H04M 3/42* (2006.01)
(Continued)

(52) U.S. Cl.
CPC ......... *H04M 3/42391* (2013.01); *G10L 15/01* (2013.01); *G10L 15/06* (2013.01);
(Continued)

(58) Field of Classification Search
CPC . H04M 2203/2061; H04M 2203/5018; H04M 3/42391; H04M 3/4285;
(Continued)

(56) References Cited

U.S. PATENT DOCUMENTS

| 3,372,246 A | 3/1968 | Knuepfer |
| 3,507,997 A | 4/1970 | Weitbrecht |

(Continued)

FOREIGN PATENT DOCUMENTS

| DE | 2647097 | 4/1978 |
| DE | 2749923 | 5/1979 |

(Continued)

OTHER PUBLICATIONS

United States Patent and Trademark Office Before the Patent Trial and Appeal Board, Decision—Institution of Inter Partes Review, *CaptionCall LLC v. Ultratec Inc.,* Case IPR2013-00550, U.S. Pat. No. 7,003,082 B2, Mar. 5, 2014, 13 pages.
(Continued)

*Primary Examiner* — Solomon G Bezuayehu
(74) *Attorney, Agent, or Firm* — Quarles & Brady LLP

(57) ABSTRACT

A system and method, the method comprising receiving, at a processor, an hearing user's (HU's) voice signal from an HU participant during a first call, wherein the first call is a communication across a communication network, the processor programmed to perform the steps of, examining at least a portion of the voice signal to determine an identity of the HU, identifying a voice model associated with the identity of the HU, wherein the voice model comprises a plurality of rules, and further wherein each of the plurality of rules is a rule for transcribing a word in the HU voice signal into text and generating a text output, wherein the text output is a transcription of a plurality of words identified in the HU voice signal, and further wherein at least one of the plurality of words identified is identified using at least one rule of the plurality of rules.

27 Claims, 21 Drawing Sheets

Related U.S. Application Data

(60) Provisional application No. 61/946,072, filed on Feb. 28, 2014.

(51) Int. Cl.

| | | |
|---|---|---|
| *G10L 15/06* | (2013.01) | |
| *G10L 15/22* | (2006.01) | |
| *H04M 1/247* | (2006.01) | |
| *H04M 1/725* | (2006.01) | |
| *G10L 15/26* | (2006.01) | |
| *H04W 4/12* | (2009.01) | |
| *H04W 4/16* | (2009.01) | |
| *G10L 21/10* | (2013.01) | |
| *G10L 15/01* | (2013.01) | |
| *H04M 3/533* | (2006.01) | |

(52) U.S. Cl.
CPC ............ *G10L 15/22* (2013.01); *G10L 15/26* (2013.01); *G10L 15/265* (2013.01); *G10L 21/10* (2013.01); *H04M 1/2475* (2013.01); *H04M 1/7255* (2013.01); *H04M 1/72591* (2013.01); *H04W 4/12* (2013.01); *H04W 4/16* (2013.01); *H04M 3/53366* (2013.01); *H04M 2201/18* (2013.01); *H04M 2201/40* (2013.01); *H04M 2201/405* (2013.01)

(58) Field of Classification Search
CPC ........ H04M 3/493; H04M 3/567; H04M 7/00; H04M 7/006; H04M 7/12; H04M 7/128; H04M 7/1295
USPC ............................................ 379/88.01–88.19
See application file for complete search history.

(56) References Cited

U.S. PATENT DOCUMENTS

| | | |
|---|---|---|
| 3,515,814 A | 6/1970 | Morgan |
| 3,585,303 A | 6/1971 | Chieffo |
| 3,598,920 A | 8/1971 | Fischer |
| 3,800,089 A | 3/1974 | Reddick |
| 3,896,267 A | 7/1975 | Sachs et al. |
| 3,959,607 A | 5/1976 | Vargo |
| 3,976,995 A | 8/1976 | Sebestyen |
| 4,012,599 A | 3/1977 | Meyer |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel |
| 4,191,854 A | 3/1980 | Coles |
| 4,201,887 A | 5/1980 | Burns |
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |
| 4,302,629 A | 11/1981 | Foulkes et al. |
| 4,307,266 A | 12/1981 | Messina |
| 4,354,252 A | 10/1982 | Lamb |
| 4,415,065 A | 11/1983 | Sandstedt |
| 4,426,555 A | 1/1984 | Underkoftler |
| 4,430,726 A | 2/1984 | Kasday |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyen |
| 4,650,927 A | 3/1987 | James |
| 4,659,876 A | 4/1987 | Sullivan et al. |
| 4,713,808 A | 12/1987 | Gaskill |
| 4,754,474 A | 6/1988 | Feinson |
| D296,894 S | 7/1988 | Chen |
| 4,777,469 A | 10/1988 | Engelke et al. |
| 4,799,254 A | 1/1989 | Dayton |
| 4,815,121 A | 3/1989 | Yoshida |
| 4,817,135 A | 3/1989 | Winebaum |
| 4,839,919 A | 6/1989 | Borges |
| 4,849,750 A | 7/1989 | Andros |
| 4,866,778 A | 9/1989 | Baker |
| 4,868,860 A | 9/1989 | Andros |
| 4,879,738 A | 11/1989 | Petro |
| 4,897,868 A | 1/1990 | Engelke et al. |
| D306,727 S | 3/1990 | Fritzsche |
| 4,908,866 A | 3/1990 | Goldwasser |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke et al. |
| D312,457 S | 11/1990 | Inatomi |
| 4,995,077 A | 2/1991 | Malinowski |
| 5,025,442 A | 6/1991 | Lynk et al. |
| 5,027,406 A | 6/1991 | Roberts et al. |
| 5,033,088 A | 7/1991 | Shipman |
| 5,051,924 A | 9/1991 | Bergeron |
| D322,785 S | 12/1991 | Wu |
| 5,081,673 A | 1/1992 | Engelke et al. |
| 5,086,453 A | 2/1992 | Senoo |
| 5,091,906 A | 2/1992 | Reed et al. |
| 5,095,307 A | 3/1992 | Shimura |
| 5,099,507 A | 3/1992 | Mukai |
| 5,121,421 A | 6/1992 | Alheim |
| 5,128,980 A | 7/1992 | Choi |
| 5,134,633 A | 7/1992 | Werner |
| 5,146,502 A | 9/1992 | Davis |
| 5,163,081 A | 11/1992 | Wycherley et al. |
| 5,192,948 A | 3/1993 | Neustein |
| 5,199,077 A | 3/1993 | Wilcox et al. |
| 5,210,689 A | 5/1993 | Baker |
| 5,214,428 A | 5/1993 | Allen |
| 5,216,702 A | 6/1993 | Ramsden |
| 5,249,220 A | 9/1993 | Moskowitz |
| 5,280,516 A | 1/1994 | Jang |
| 5,289,523 A | 2/1994 | Vasile et al. |
| 5,294,982 A | 3/1994 | Salomon |
| 5,307,399 A | 4/1994 | Dai |
| 5,311,516 A | 5/1994 | Kuznicki et al. |
| 5,318,340 A | 6/1994 | Henry |
| 5,325,417 A | 6/1994 | Engelke et al. |
| 5,327,479 A | 7/1994 | Engelke et al. |
| 5,339,358 A | 8/1994 | Danish |
| 5,343,519 A | 8/1994 | Feldman |
| 5,351,288 A | 9/1994 | Engelke et al. |
| D351,185 S | 10/1994 | Matsuda et al. |
| 5,359,651 A | 10/1994 | Draganoff |
| 5,375,160 A | 12/1994 | Guidon et al. |
| 5,377,263 A | 12/1994 | Bazemore |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,424,785 A | 6/1995 | Orphan |
| 5,426,706 A | 6/1995 | Wood |
| 5,432,837 A | 7/1995 | Engelke et al. |
| 5,459,458 A | 10/1995 | Richardson |
| 5,463,665 A | 10/1995 | Millios et al. |
| D364,865 S | 12/1995 | Engelke et al. |
| 5,475,733 A | 12/1995 | Eisdorfer et al. |
| 5,475,798 A | 12/1995 | Handlos |
| 5,477,274 A | 12/1995 | Akiyoshi |
| 5,487,102 A | 1/1996 | Rothschild |
| 5,487,671 A | 1/1996 | Shpiro |
| 5,497,373 A | 3/1996 | Hulen et al. |

(56) References Cited

U.S. PATENT DOCUMENTS

| | | |
|---|---|---|
| 5,508,754 A | 4/1996 | Orphan |
| 5,517,548 A | 5/1996 | Engelke et al. |
| 5,519,443 A | 5/1996 | Salomon |
| 5,519,808 A | 5/1996 | Benton, Jr. |
| 5,521,960 A | 5/1996 | Aronow |
| 5,522,089 A | 5/1996 | Kikinis |
| 5,537,436 A | 7/1996 | Bottoms |
| 5,559,855 A | 9/1996 | Dowens |
| 5,559,856 A | 9/1996 | Dowens |
| 5,574,776 A | 11/1996 | Leuca |
| 5,574,784 A | 11/1996 | LaPadula |
| 5,581,593 A | 12/1996 | Engelke et al. |
| 5,604,786 A | 2/1997 | Engelke et al. |
| D379,181 S | 5/1997 | Sawano et al. |
| 5,649,060 A | 7/1997 | Ellozy |
| 5,680,443 A | 10/1997 | Kasday et al. |
| 5,687,222 A | 11/1997 | McLaughlin |
| 5,701,338 A | 12/1997 | Leyen |
| 5,710,806 A | 1/1998 | Lee et al. |
| 5,712,901 A | 1/1998 | Meermans |
| 5,724,405 A | 3/1998 | Engelke et al. |
| 5,745,550 A | 4/1998 | Eisdorfer |
| 5,751,338 A | 5/1998 | Ludwig, Jr. |
| 5,787,148 A | 7/1998 | August |
| 5,799,273 A | 8/1998 | Mitchell et al. |
| 5,799,279 A | 8/1998 | Gould et al. |
| 5,809,112 A | 9/1998 | Ryan |
| 5,809,425 A | 9/1998 | Colwell et al. |
| 5,815,196 A | 9/1998 | Alshawi |
| 5,826,102 A | 10/1998 | Escobar et al. |
| 5,850,627 A | 12/1998 | Gould et al. |
| 5,855,000 A | 12/1998 | Waibel et al. |
| D405,793 S | 2/1999 | Engelke et al. |
| 5,867,817 A | 2/1999 | Catallo et al. |
| 5,870,709 A | 2/1999 | Bernstein |
| 5,883,986 A | 3/1999 | Kopec et al. |
| 5,893,034 A | 4/1999 | Hikuma |
| 5,899,976 A | 5/1999 | Rozak |
| 5,905,476 A | 5/1999 | McLaughlin et al. |
| 5,909,482 A | 6/1999 | Engelke |
| 5,915,379 A | 6/1999 | Wallace |
| 5,917,888 A | 6/1999 | Giuntoli |
| 5,926,527 A | 7/1999 | Jenkins |
| 5,940,475 A | 8/1999 | Hansen |
| 5,974,116 A | 10/1999 | Engelke et al. |
| 5,978,014 A | 11/1999 | Martin |
| 5,978,654 A | 11/1999 | Colwell et al. |
| 5,982,853 A | 11/1999 | Liebermann |
| 5,982,861 A | 11/1999 | Holloway |
| 5,991,291 A | 11/1999 | Asai |
| 5,991,723 A | 11/1999 | Duffin |
| 5,995,590 A | 11/1999 | Brunet et al. |
| 6,002,749 A | 12/1999 | Hansen et al. |
| 6,067,516 A | 5/2000 | Levay |
| 6,075,534 A | 6/2000 | VanBuskirk et al. |
| 6,075,841 A | 6/2000 | Engelke et al. |
| 6,075,842 A | 6/2000 | Engelke et al. |
| 6,100,882 A | 8/2000 | Sharman |
| 6,141,341 A | 10/2000 | Jones et al. |
| 6,141,415 A | 10/2000 | Rao |
| 6,173,259 B1 | 1/2001 | Biji et al. |
| 6,175,819 B1 | 1/2001 | Van Alstine |
| 6,181,736 B1 | 1/2001 | McLaughlin |
| 6,181,778 B1 | 1/2001 | Ohki et al. |
| 6,188,429 B1 | 2/2001 | Martin et al. |
| 6,233,314 B1 | 5/2001 | Engelke |
| 6,243,684 B1 | 6/2001 | Stuart |
| 6,278,772 B1 | 8/2001 | Bowater |
| 6,298,326 B1 | 10/2001 | Feller |
| 6,307,921 B1 | 10/2001 | Engelke et al. |
| 6,314,396 B1 | 11/2001 | Monkowski |
| 6,317,716 B1 | 11/2001 | Braida |
| 6,324,507 B1 | 11/2001 | Lewis et al. |
| 6,345,251 B1 | 2/2002 | Jansson |
| 6,366,882 B1 | 4/2002 | Bijl et al. |
| 6,374,221 B1 | 4/2002 | Haimi-Cohen |
| 6,377,925 B1 * | 4/2002 | Greene, Jr. ............ G10L 21/06 379/52 |
| 6,381,472 B1 | 4/2002 | LaMedica, Jr. |
| 6,385,582 B1 | 5/2002 | Iwata |
| 6,385,586 B1 | 5/2002 | Dietz |
| 6,389,114 B1 | 5/2002 | Dowens et al. |
| 6,424,935 B1 * | 7/2002 | Taylor .................. G10L 15/005 704/10 |
| 6,445,799 B1 | 9/2002 | Taenzer |
| 6,457,031 B1 | 9/2002 | Hanson |
| 6,493,426 B2 | 12/2002 | Engelke et al. |
| 6,493,447 B1 | 12/2002 | Goss et al. |
| 6,504,910 B1 | 1/2003 | Engelke et al. |
| 6,507,735 B1 | 1/2003 | Baker |
| 6,510,206 B2 | 1/2003 | Engelke et al. |
| 6,549,611 B2 | 4/2003 | Engelke et al. |
| 6,549,614 B1 | 4/2003 | Zebryk |
| 6,567,503 B2 | 5/2003 | Engelke et al. |
| 6,594,346 B2 | 7/2003 | Engelke |
| 6,603,835 B2 | 8/2003 | Engelke et al. |
| 6,625,259 B1 | 9/2003 | Hollatz |
| 6,633,630 B1 * | 10/2003 | Owens .................. H04L 51/066 379/100.08 |
| 6,661,879 B1 | 12/2003 | Schwartz et al. |
| 6,668,042 B2 | 12/2003 | Michaelis |
| 6,668,044 B1 | 12/2003 | Schwartz |
| 6,701,162 B1 | 3/2004 | Everett |
| 6,704,709 B1 | 3/2004 | Kahn et al. |
| 6,748,053 B2 | 6/2004 | Engelke et al. |
| 6,763,089 B2 | 7/2004 | Feigenbaum |
| 6,775,360 B2 | 8/2004 | Davidson |
| 6,778,824 B2 | 8/2004 | Wonak et al. |
| 6,813,603 B1 | 11/2004 | Groner et al. |
| 6,816,468 B1 | 11/2004 | Cruickshank |
| 6,816,469 B1 | 11/2004 | Kung et al. |
| 6,816,834 B2 | 11/2004 | Jaroker |
| 6,831,974 B1 | 12/2004 | Watson et al. |
| 6,850,609 B1 | 2/2005 | Schrage |
| 6,865,258 B1 | 3/2005 | Polcyn |
| 6,876,967 B2 | 4/2005 | Goto |
| 6,885,731 B2 | 4/2005 | Engelke et al. |
| 6,894,346 B2 | 5/2005 | Onose |
| 6,934,366 B2 | 8/2005 | Engelke et al. |
| 6,934,376 B2 | 8/2005 | McLaughlin |
| 6,947,896 B2 | 9/2005 | Hanson |
| 6,948,066 B2 | 9/2005 | Hind |
| 6,950,500 B1 | 9/2005 | Chaturvedi et al. |
| 6,980,953 B1 | 12/2005 | Kanevsky |
| 7,003,082 B2 | 2/2006 | Engelke et al. |
| 7,003,463 B1 | 2/2006 | Maes et al. |
| 7,006,604 B2 | 2/2006 | Engelke |
| 7,016,479 B2 | 3/2006 | Flathers |
| 7,016,844 B2 | 3/2006 | Othmer et al. |
| 7,035,383 B2 | 4/2006 | O'Neal |
| 7,042,718 B2 | 5/2006 | Aoki et al. |
| 7,088,832 B1 | 8/2006 | Cooper |
| 7,117,152 B1 | 10/2006 | Mukherji |
| 7,117,438 B2 | 10/2006 | Wallace |
| 7,130,790 B1 | 10/2006 | Flanagan et al. |
| 7,142,642 B2 | 11/2006 | McClelland et al. |
| 7,142,643 B2 | 11/2006 | Brooksby |
| 7,164,753 B2 | 1/2007 | Engelke et al. |
| 7,191,135 B2 | 3/2007 | O'Hagan |
| 7,199,787 B2 | 4/2007 | Lee et al. |
| 7,221,405 B2 | 5/2007 | Basson |
| 7,233,655 B2 | 6/2007 | Gailey |
| 7,287,009 B1 | 10/2007 | Liebermann |
| 7,295,663 B2 | 11/2007 | McLaughlin |
| 7,313,231 B2 | 12/2007 | Reid |
| 7,315,612 B2 | 1/2008 | McClelland |
| 7,319,740 B2 | 1/2008 | Engelke et al. |
| 7,330,737 B2 | 2/2008 | Mahini |
| 7,346,506 B2 | 3/2008 | Lueck et al. |
| 7,363,006 B2 | 4/2008 | Mooney |
| 7,406,413 B2 | 7/2008 | Geppert |
| 7,428,702 B1 | 9/2008 | Cervantes et al. |
| 7,430,283 B2 | 9/2008 | Steel, Jr. |
| 7,480,613 B2 | 1/2009 | Kellner |

(56) References Cited

U.S. PATENT DOCUMENTS

| | | |
|---|---|---|
| 7,519,536 B2 | 4/2009 | Maes et al. |
| 7,555,104 B2 | 6/2009 | Engelke |
| 7,573,985 B2 | 8/2009 | McClelland |
| 7,606,718 B2 | 10/2009 | Cloran |
| 7,613,610 B1 | 11/2009 | Zimmerman et al. |
| 7,660,398 B2 | 2/2010 | Engelke et al. |
| 7,747,434 B2 | 6/2010 | Flanagan et al. |
| 7,792,701 B2 | 9/2010 | Basson |
| 7,831,429 B2 | 11/2010 | O'Hagan |
| 7,836,412 B1 | 11/2010 | Zimmerman |
| 7,844,454 B2 | 11/2010 | Coles et al. |
| 7,848,358 B2 | 12/2010 | LaDue |
| 7,881,441 B2 | 2/2011 | Engelke et al. |
| 7,904,113 B2 | 3/2011 | Ozluturk et al. |
| 7,962,339 B2 | 6/2011 | Pieraccini et al. |
| 8,019,608 B2 | 9/2011 | Carraux et al. |
| 8,180,639 B2 | 5/2012 | Pieraccini et al. |
| 8,213,578 B2 | 7/2012 | Engleke et al. |
| 8,249,878 B2 | 8/2012 | Carraux et al. |
| 8,259,920 B2 | 9/2012 | Abramson et al. |
| 8,265,671 B2 | 9/2012 | Gould et al. |
| 8,286,071 B1 | 10/2012 | Zimmerman et al. |
| 8,325,883 B2 | 12/2012 | Schultz et al. |
| 8,332,212 B2 | 12/2012 | Wittenstein et al. |
| 8,332,227 B2 | 12/2012 | Maes et al. |
| 8,335,689 B2 | 12/2012 | Wittenstein et al. |
| 8,352,883 B2 | 1/2013 | Kashik et al. |
| 8,370,142 B2 | 2/2013 | Frankel et al. |
| 8,379,801 B2 | 2/2013 | Romriell |
| 8,407,052 B2 | 3/2013 | Hager |
| 8,416,925 B2 | 4/2013 | Engelke et al. |
| 8,447,366 B2 | 5/2013 | Ungari et al. |
| 8,473,003 B2 | 6/2013 | Jung et al. |
| 8,504,372 B2 | 8/2013 | Carraux et al. |
| 8,526,581 B2 | 9/2013 | Charugundla |
| 8,538,324 B2 | 9/2013 | Hardacker et al. |
| 8,605,682 B2 | 12/2013 | Efrati et al. |
| 8,626,249 B2 | 1/2014 | Ungari et al. |
| 8,645,136 B2 | 2/2014 | Milstein |
| 8,682,672 B1 | 3/2014 | Ha et al. |
| 8,781,510 B2 | 7/2014 | Gould et al. |
| 8,867,532 B2 | 10/2014 | Wozniak et al. |
| 8,868,425 B2 | 10/2014 | Maes et al. |
| 8,874,070 B2 | 10/2014 | Basore et al. |
| 8,892,447 B1 | 11/2014 | Srinivasan et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 8,930,194 B2 | 1/2015 | Newman et al. |
| 8,972,261 B2 | 3/2015 | Milstein |
| 9,069,377 B2 | 6/2015 | Wilson et al. |
| 9,124,716 B1 | 9/2015 | Charugundla |
| 9,161,166 B2 | 10/2015 | Johansson et al. |
| 9,183,843 B2 | 11/2015 | Fanty et al. |
| 9,191,789 B2 | 11/2015 | Pan |
| 9,215,406 B2 | 12/2015 | Paripally et al. |
| 9,215,409 B2 | 12/2015 | Montero et al. |
| 9,218,808 B2 | 12/2015 | Milstein |
| 9,231,902 B2 | 1/2016 | Brown et al. |
| 9,245,522 B2 | 1/2016 | Hager |
| 9,247,052 B1 | 1/2016 | Walton |
| 9,277,043 B1 | 3/2016 | Bladon et al. |
| 9,305,552 B2 | 4/2016 | Kim et al. |
| 9,318,110 B2 | 4/2016 | Roe |
| 9,324,324 B2 | 4/2016 | Knighton |
| 9,336,689 B2 | 5/2016 | Romriell et al. |
| 9,344,562 B2 | 5/2016 | Moore et al. |
| 9,355,611 B1 | 5/2016 | Wang et al. |
| 9,380,150 B1 | 6/2016 | Bullough et al. |
| 9,392,108 B2 | 7/2016 | Milstein |
| 9,460,719 B1 | 10/2016 | Antunes et al. |
| 9,495,964 B2 | 11/2016 | Kim et al. |
| 9,502,033 B2 | 11/2016 | Carraux et al. |
| 9,535,891 B2 | 1/2017 | Raheja et al. |
| 9,536,567 B2 | 1/2017 | Garland et al. |
| 9,571,638 B1 | 2/2017 | Knighton et al. |
| 9,576,498 B1 | 2/2017 | Zimmerman et al. |
| 9,628,620 B1 | 4/2017 | Rae et al. |
| 9,632,997 B1 | 4/2017 | Johnson et al. |
| 9,633,657 B2 | 4/2017 | Svendsen et al. |
| 9,633,658 B2 | 4/2017 | Milstein |
| 9,633,696 B2 | 4/2017 | Miller et al. |
| 9,653,076 B2 | 5/2017 | Kim |
| 9,672,825 B2* | 6/2017 | Arslan .................. G10L 25/63 |
| 9,704,111 B1 | 7/2017 | Antunes et al. |
| 9,715,876 B2 | 7/2017 | Hager |
| 9,761,241 B2 | 9/2017 | Maes et al. |
| 9,774,747 B2 | 9/2017 | Garland et al. |
| 9,805,118 B2 | 10/2017 | Ko et al. |
| 9,858,256 B2 | 1/2018 | Hager |
| 9,858,929 B2 | 1/2018 | Milstein |
| 9,886,956 B1 | 2/2018 | Antunes et al. |
| 9,916,295 B1 | 3/2018 | Crawford |
| 9,947,322 B2 | 4/2018 | Kang et al. |
| 9,953,653 B2 | 4/2018 | Newman et al. |
| 10,032,455 B2 | 7/2018 | Newman et al. |
| 10,044,854 B2 | 8/2018 | Rae et al. |
| 10,049,669 B2 | 8/2018 | Newman et al. |
| 2001/0005825 A1 | 6/2001 | Engelke et al. |
| 2002/0007275 A1 | 1/2002 | Goto et al. |
| 2002/0055351 A1 | 5/2002 | Elsey et al. |
| 2002/0085685 A1 | 7/2002 | Engelke et al. |
| 2002/0085703 A1 | 7/2002 | Proctor |
| 2002/0094800 A1 | 7/2002 | Trop et al. |
| 2002/0101537 A1 | 8/2002 | Basson et al. |
| 2002/0103008 A1 | 8/2002 | Rahn et al. |
| 2002/0119800 A1 | 8/2002 | Jaggers et al. |
| 2002/0178001 A1 | 11/2002 | Balluff et al. |
| 2004/0066926 A1 | 4/2004 | Brockbank et al. |
| 2004/0083105 A1 | 4/2004 | Jaroker |
| 2004/0143430 A1 | 7/2004 | Said et al. |
| 2005/0094776 A1 | 5/2005 | Haldeman et al. |
| 2005/0094777 A1 | 5/2005 | McClelland |
| 2005/0144012 A1 | 6/2005 | Afrashteh et al. |
| 2005/0180553 A1 | 8/2005 | Moore |
| 2005/0183109 A1 | 8/2005 | Basson et al. |
| 2005/0225628 A1 | 10/2005 | Antoniou |
| 2005/0226394 A1 | 10/2005 | Engelke et al. |
| 2005/0226398 A1 | 10/2005 | Bojeun |
| 2005/0232169 A1 | 10/2005 | McLaughlin et al. |
| 2005/0277431 A1 | 12/2005 | White |
| 2006/0089857 A1 | 4/2006 | Zimmerman et al. |
| 2006/0105712 A1 | 5/2006 | Glass et al. |
| 2006/0133583 A1 | 6/2006 | Brooksby |
| 2006/0140354 A1 | 6/2006 | Engelke |
| 2006/0285652 A1 | 12/2006 | McClelland et al. |
| 2006/0285662 A1 | 12/2006 | Yin et al. |
| 2007/0011012 A1 | 1/2007 | Yurick et al. |
| 2007/0024583 A1 | 2/2007 | Gettemy et al. |
| 2007/0036282 A1 | 2/2007 | Engelke et al. |
| 2007/0208570 A1 | 9/2007 | Bhardwaj et al. |
| 2008/0005440 A1 | 1/2008 | Li et al. |
| 2008/0043936 A1 | 2/2008 | Liebermann |
| 2008/0064326 A1 | 3/2008 | Foster et al. |
| 2008/0129864 A1 | 6/2008 | Stone et al. |
| 2008/0152093 A1 | 6/2008 | Engelke et al. |
| 2008/0187108 A1 | 8/2008 | Engelke et al. |
| 2008/0215323 A1* | 9/2008 | Shaffer ............... H04M 3/5335 704/246 |
| 2009/0037171 A1 | 2/2009 | McFarland et al. |
| 2009/0174759 A1 | 7/2009 | Yeh et al. |
| 2009/0299743 A1 | 12/2009 | Rogers |
| 2009/0326939 A1 | 12/2009 | Toner et al. |
| 2010/0007711 A1 | 1/2010 | Bell |
| 2010/0063815 A1 | 3/2010 | Cloran et al. |
| 2010/0145729 A1 | 6/2010 | Katz |
| 2010/0323728 A1 | 12/2010 | Gould et al. |
| 2011/0022387 A1 | 1/2011 | Hager |
| 2011/0087491 A1 | 4/2011 | Wittenstein et al. |
| 2011/0123003 A1 | 5/2011 | Romriell et al. |
| 2011/0128953 A1 | 6/2011 | Wozniak et al. |
| 2011/0289134 A1 | 11/2011 | de los Reyes et al. |
| 2012/0062791 A1 | 3/2012 | Thakolsri et al. |
| 2012/0178064 A1 | 7/2012 | Katz |

(56) References Cited

U.S. PATENT DOCUMENTS

| | | | |
|---|---|---|---|
| 2012/0214447 A1* | 8/2012 | Russell | H04W 4/02 455/412.1 |
| 2012/0250837 A1 | 10/2012 | Engleke et al. | |
| 2013/0013904 A1 | 1/2013 | Tran | |
| 2013/0086293 A1 | 4/2013 | Bosse et al. | |
| 2013/0219098 A1 | 8/2013 | Turnpenny et al. | |
| 2013/0254264 A1 | 9/2013 | Hankinson et al. | |
| 2013/0262563 A1 | 10/2013 | Lu | |
| 2013/0289971 A1 | 10/2013 | Parkinson et al. | |
| 2013/0308763 A1 | 11/2013 | Engleke et al. | |
| 2013/0340003 A1 | 12/2013 | Davis et al. | |
| 2014/0018045 A1* | 1/2014 | Tucker | H04W 4/12 455/413 |
| 2014/0153705 A1 | 6/2014 | Moore et al. | |
| 2014/0314220 A1 | 10/2014 | Charugundla | |
| 2014/0341359 A1 | 11/2014 | Engelke et al. | |
| 2015/0032450 A1 | 1/2015 | Hussain et al. | |
| 2015/0073790 A1 | 3/2015 | Steuble et al. | |
| 2015/0094105 A1 | 4/2015 | Pan | |
| 2015/0130887 A1 | 5/2015 | Thelin et al. | |
| 2015/0288815 A1 | 10/2015 | Charugundla | |
| 2015/0341486 A1 | 11/2015 | Knighton | |
| 2016/0012751 A1 | 1/2016 | Hirozawa | |
| 2016/0133251 A1 | 5/2016 | Kadirkamanathan et al. | |
| 2016/0179831 A1 | 6/2016 | Gruber et al. | |
| 2017/0085506 A1 | 3/2017 | Gordon | |
| 2017/0187826 A1* | 6/2017 | Russell | H04L 67/2819 |
| 2017/0187876 A1 | 6/2017 | Hayes et al. | |
| 2018/0081869 A1 | 3/2018 | Hager | |
| 2018/0197545 A1 | 7/2018 | Willett et al. | |
| 2018/0270350 A1 | 9/2018 | Engelke et al. | |

FOREIGN PATENT DOCUMENTS

| | | |
|---|---|---|
| DE | 3410619 | 10/1985 |
| DE | 3632233 | 4/1988 |
| DE | 10328884 | 2/2005 |
| EP | 0016281 A1 | 10/1980 |
| EP | 0029246 A1 | 5/1981 |
| EP | 0651372 A2 | 5/1995 |
| EP | 0655158 A1 | 5/1995 |
| EP | 0664636 A2 | 7/1995 |
| EP | 0683483 A2 | 11/1995 |
| EP | 1039733 A2 | 9/2000 |
| EP | 1330046 A1 | 7/2003 |
| EP | 1486949 A1 | 12/2004 |
| EP | 2093974 A1 | 8/2009 |
| EP | 2373016 A2 | 10/2011 |
| FR | 2403697 A | 4/1979 |
| FR | 2432805 A | 2/1980 |
| FR | 2538978 A | 7/1984 |
| GB | 2183880 A | 6/1987 |
| GB | 2285895 A | 7/1995 |
| GB | 2327173 A | 1/1999 |
| GB | 2335109 A | 9/1999 |
| GB | 2339363 A | 1/2000 |
| GB | 2334177 B | 12/2002 |
| JP | S5544283 A | 3/1980 |
| JP | S5755649 A | 4/1982 |
| JP | S58134568 A | 8/1983 |
| JP | S60259058 A | 12/1985 |
| JP | S63198466 A | 8/1988 |
| JP | H04248596 A | 9/1992 |
| KR | 20050004503 A | 12/2005 |
| WO | 9323947 A1 | 11/1993 |
| WO | 9405006 A1 | 3/1994 |
| WO | 9500946 A1 | 1/1995 |
| WO | 9519086 A1 | 7/1995 |
| WO | 9839901 A1 | 9/1998 |
| WO | 9913634 A1 | 3/1999 |
| WO | 9952237 A1 | 10/1999 |
| WO | 0049601 A1 | 8/2000 |
| WO | 0155914 A1 | 8/2001 |
| WO | 0158165 A2 | 8/2001 |
| WO | 0180079 A2 | 10/2001 |
| WO | 0225910 A2 | 3/2002 |
| WO | 02077971 A1 | 10/2002 |
| WO | 03026265 A1 | 3/2003 |
| WO | 03030018 A1 | 4/2003 |
| WO | 03071774 A1 | 8/2003 |
| WO | 2005081511 A1 | 9/2005 |
| WO | 2008053306 A2 | 5/2008 |
| WO | 2015131028 A1 | 9/2015 |
| WO | 2015148037 A1 | 10/2015 |

OTHER PUBLICATIONS

United States Patent and Trademark Office Before the Patent Trial and Appeal Board, Decision—Institution of Inter Partes Review, *CaptionCall LLC v. Ultratec Inc.*, Case IPR2013-00543, U.S. Pat. No. 7,555,104, Mar. 5, 2014, 16 pages.

United States Patent and Trademark Office Before the Patent Trial and Appeal Board, Decision—Institution of Inter Partes Review, *CaptionCall LLC v. Ultratec Inc.*, Case IPR2013-00540, U.S. Pat. No. 6,233,314, Mar. 5, 2014, 17 pages.

United States Patent and Trademark Office Before the Patent Trial and Appeal Board, Decision—Institution of Inter Partes Review, *CaptionCall LLC v. Ultratec Inc.*, Case IPR2013-00545, U.S. Pat. No. 6,594,346, Mar. 5, 2014, 21 pages.

United States Patent and Trademark Office Before the Patent Trial and Appeal Board, Decision—Institution of Inter Partes Review, *CaptionCall LLC v. Ultratec Inc.*, Case IPR2013-00541, U.S. Pat. No. 5,909,482, Mar. 5, 2014, 32 pages.

United States Patent and Trademark Office Before the Patent Trial and Appeal Board, Decision—Institution of Inter Partes Review, *CaptionCall LLC v. Ultratec Inc.*, Case IPR2013-00544, U.S. Pat. No. 8,213,578, Mar. 5, 2014, 22 pages.

United States Patent and Trademark Office Before the Patent Trial and Appeal Board, Decision—Institution of Inter Partes Review, *CaptionCall LLC v. Ultratec Inc.*, Case IPR2013-00542, U.S. Pat. No. 7,319,740, Mar. 5, 2014, 17 pages.

United States Patent and Trademark Office Before the Patent Trial and Appeal Board, Decision—Institution of Inter Partes Review, *CaptionCall LLC v. Ultratec Inc.*, Case IPR2013-00549, U.S. Pat. No. 6,603,835 B2, Mar. 5, 2014, 26 pages.

Ultratec Inc. and CapTel Inc., Complaint for Patent Infringement, *Ultratec Inc. and CapTel Inc. v. Sorenson Communications Inc. and CaptionCall LLC*, Civil Action No. 13-346, May 17, 2013, 13 pages.

Ultratec Inc. and CapTel Inc., Amended Complaint for Patent Infringement and Declaratory Judgment, *Ultratec Inc. and CapTel Inc. v. Sorenson Communications Inc. and CaptionCall LLC*, Civil Action No. 13-346, Jul. 31, 2013, 16 pages.

Sorenson Communications Inc. and CaptionCall LLC, Defendants' Amended Answer to Plaintiffs' Amended Complaint for Patent Infringement and Declaratory Judgment and Counterclaims, *Ultratec Inc. and CapTel Inc. v. Sorenson Communications Inc. and CaptionCall LLC*, Civil Action No. 13-346, Aug. 14, 2013, 71 pages.

Ultratec Inc. and CapTel Inc., Plaintiffs' Answer to Defendants' Amended Counterclaims, *Ultratec Inc. and CapTel Inc. v. Sorenson Communications Inc. and CaptionCall LLC*, Civil Action No. 13-346, Aug. 28, 2013, 26 pages.

Sorenson Communications Inc. and CaptionCall LLC, Invalidity Contentions, *Ultratec Inc. and CapTel Inc. v. Sorenson Communications Inc. and CaptionCall LLC*, Civil Action No. 13-346, Sep. 23, 2013, 31 pages.

Sorenson Communications Inc. and CaptionCall LLC, Exhibits to Invalidity Contentions, *Ultratec Inc. and CapTel Inc. v. Sorenson Communications Inc. and CaptionCall LLC*, Civil Action No. 13-346, Sep. 23, 2013, 587 pages.

Sorenson Communications Inc. and CaptionCall LLC, Defendants' Answer to Plaintiffs' Original Complaint for Patent Infringement and Counterclaims, *Ultratec Inc. and CapTel Inc. v. Sorenson Communications Inc. and CaptionCall LLC*, Civil Action No. 14-66, Feb. 24, 2014, 41 pages.

(56) References Cited

OTHER PUBLICATIONS

Ultratec Inc. and CapTel Inc., Plaintiffs' Answer to Defendants' Counterclaims, *Ultratec Inc. and CapTel Inc. v. Sorenson Communications Inc. and CaptionCall LLC,* Civil Action No. 14-CV-66, Mar. 17, 2014, 14 pages.
Ultratec Inc. and CapTel Inc., Amended Complaint for Patent Infringement, *Ultratec Inc. and CapTel Inc. v. Sorenson Communications Inc. and CaptionCall LLC,* Civil Action No. 3-14-CV-66-BBC, Mar. 26, 2014, 11 pages.
CaptionCall L.L.C. Petition for Inter Partes Review of Claims 6 and 8 of U.S. Pat. No. 6,603,835 Under 35 U.S.C. 311-319 and 37 C.F.R. 42.100 Et Seq., May 19, 2014, 67 pages.
Opinion and Order, *Ultratec, Inc., et al. v. Sorenson Communications, Inc., et al.,* Civil Action No. 13-CV-346-BBC, United States District Court, Western District of Wisconsin, Aug. 28, 2014.
CaptionCall L.L.C. Petition for Inter Partes Review of Claims 11-13 of U.S. Pat. No. 7,660,398 Under 35 U.S.C. 311-319 and 37 C.F.R. 42.100 Et Seq., Aug. 13, 2014, 64 pages.
Prosecution History of the U.S. Pat. No. 7,660,398, 489 pages.
Vaseghi, Chapter 14: Echo Cancellation, Advanced Digital Signal Processing and Noise Reduction, Second Edition, John Wiley & Sons, Ltd., 2000, pp. 396-415.
Utratec, Inc. and CapTel, Inc. Complaint for Patent Infringement, *Ultratec, Inc. and CapTel Inc. v. Sorenson Communications, Inc. and CaptionCall, LLC,* Civil Action No. 14-CV-66, Feb. 3, 2014, 9 pages.
Plaintiffs, Ultratec, Inc. and CapTel, Inc.'s Infringement Contentions, *Ultratec, Inc. and CapTel Inc. v. Sorenson Communications, Inc. and CaptionCall, LLC,* Civil Action No. 14-CV-66, Mar. 28, 2014, 9 pages.
Declaration of Benedict J. Occhiogrosso, In Re: U.S. Pat. No. 7,660,398, United States Patent and Trademark Office Before the Patent Trial and Appeal Board, Aug. 13, 2014, 62 pages.
United States Patent and Trademark Office, Office Action Summary and Detailed Action, U.S. Appl. No. 13/486,221, dated Jan. 28, 2015, 8 pages.
United States Patent and Trademark Office, Office Action Summary and Detailed Action, U.S. Appl. No. 14/506,080, dated Feb. 27, 2015, 7 pages.
United States Patent and Trademark Office, Office Action Summary and Detailed Action, U.S. Appl. No. 14/299,531, dated Sep. 19, 2014, 8 pages.
Applicant, Amendment (Response to Sep. 19, 2014, Office Action), U.S. Appl. No. 14/299,531, dated Sep. 24, 2014, 12 pages.
United States Patent and Trademark Office, Office Action Summary and Detailed Action, U.S. Appl. No. 14/299,531, dated Oct. 10, 2014, 6 pages.
Applicant, Response (Response to Oct. 10, 2014, Office Action), U.S. Appl. No. 14/299,531, dated Oct. 17, 2014, 3 pages.
United States Patent and Trademark Office, Office Action Summary and Detailed Action, U.S. Appl. No. 14/299,651, dated Oct. 16, 2014, 5 pages.
Applicant, Response (Response to Oct. 16, 2014, Office Action), U.S. Appl. No. 14/299,651, dated Oct. 17, 2014, 3 pages.
United States Patent and Trademark Office, Office Action Summary and Detailed Action, U.S. Appl. No. 13/950,860, dated Sep. 3, 2014, 9 pages.
Applicant, Amendment (Response to Sep. 3, 2014, Office Action), U.S. Appl. No. 13/950,860, dated Mar. 3, 2015, 11 pages.
United States Patent and Trademark Office, Office Action Summary and Detailed Action, U.S. Appl. No. 13/950,860, dated Apr. 2, 2015, 8 pages.
United States Patent and Trademark Office, Office Action Summary and Detailed Action, U.S. Appl. No. 13/486,221, dated Aug. 18, 2015
United States Patent and Trademark Office, Office Action Summary and Detailed Action, U.S. Appl. No. 13/486,221, dated Apr. 20, 2016.
United States Patent and Trademark Office, Office Action Summary and Detailed Action, U.S. Appl. No. 13/950,860, dated Nov. 4, 2015.
United States Patent and Trademark Office, Office Action Summary and Detailed Action, U.S. Appl. No. 14/506,080, dated Oct. 8, 2015.
United States Patent and Trademark Office, Office Action Summary and Detailed Action, U.S. Appl. No. 14/553,291, dated Mar. 4, 2015.
United States Patent and Trademark Office, Office Action Summary and Detailed Action, U.S. Appl. No. 14/553,291, dated Oct. 8, 2015.
United States Patent and Trademark Office, Office Action Summary and Detailed Action, U.S. Appl. No. 14/553,291, dated Apr. 5, 2016.
United States Patent and Trademark Office, Office Action Summary and Detailed Action, U.S. Appl. No. 14/553,291, dated Dec. 23, 2016.
United States Patent and Trademark Office, Office Action Summary and Detailed Action, U.S. Appl. No. 14/573,085, dated Nov. 21, 2016.
United States Patent and Trademark Office, Office Action Summary and Detailed Action, U.S. Appl. No. 14/632,257, dated Dec. 20, 2016.
United States Patent and Trademark Office, Office Action Summary and Detailed Action, U.S. Appl. No. 14/988,407, dated Mar. 4, 2016.
United States Patent and Trademark Office, Office Action Summary and Detailed Action, U.S. Appl. No. 14/988,407, dated Jul. 28, 2016.
United States Patent and Trademark Office, Office Action Summary and Detailed Action, U.S. Appl. No. 14/988,407, dated Nov. 10, 2016.
United States Patent and Trademark Office, Office Action Summary and Detailed Action, U.S. Appl. No. 15/010,179, dated May 24, 2016.
United States Patent and Trademark Office, Office Action Summary and Detailed Action, U.S. Appl. No. 15/010,179, dated May 4, 2017.
United States Patent and Trademark Office, Office Action Summary and Detailed Action, U.S. Appl. No. 15/010,193, dated Mar. 31, 2016.
United States Patent and Trademark Office, Office Action Summary and Detailed Action, U.S. Appl. No. 15/010,193, dated Nov. 10, 2016.
United States Patent and Trademark Office, Office Action Summary and Detailed Action, U.S. Appl. No. 15/010,193, dated May 4, 2017.
United States Patent and Trademark Office, Office Action Summary and Detailed Action, U.S. Appl. No. 15/010,199, dated Apr. 29, 2016.
United States Patent and Trademark Office, Office Action Summary and Detailed Action, U.S. Appl. No. 15/010,199, dated Sep. 29, 2016.
United States Patent and Trademark Office, Office Action Summary and Detailed Action, U.S. Appl. No. 15/010,199, dated May 3, 2017.
United States Patent and Trademark Office, Office Action Summary and Detailed Action, U.S. Appl. No. 15/204,142, dated Nov. 3, 2016.
United States Patent and Trademark Office, Office Action Summary and Detailed Action, U.S. Appl. No. 15/204,142, dated Jan. 19, 2017.
PCT International Search Report and Written Opinion, PCT/US2015/017954, dated Aug. 17, 2015.
Declaration of Paul W. Ludwick, In Re: U.S. Pat. No. 6,594,346, Case IPR2013-00545, In The United States Patent and Trademark Office Before the Patent Trial and Appeal Board, May 11, 2014.
Declaration of Paul W. Ludwick, In Re: U.S. Pat. No. 7,555,104, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 7,319,740, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 6,233,314, Case IPR2013-00540, In The United States Patent and Trademark Office Before the Patent Trial and Appeal Board, May 30, 2014.

(56) References Cited

OTHER PUBLICATIONS

Declaration of Paul W. Ludwick, In Re: U.S. Pat. No. 5,909,482, Case IPR2013-00541, In The United States Patent and Trademark Office Before the Patent Trial and Appeal Board, May 30, 2014.
Declaration of Paul W. Ludwick, In Re: U.S. Pat. No. 8,213,578, Case IPR2013-00544, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 7,555,104, Case IPR2013-00543, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 7,319,740, Case IPR2013-00542, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,603,835, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,594,346, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,233,314, Case IPR2013-00540, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 5,909,482, Case IPR2013-00541, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 8,213,578, Case IPR2013-00544, In The United States Patent and Trademark Office Before the Patent Trial and Appeal Board, May 30, 2014.
Declaration of Kelby Brick, Esq., CDI, In Re: U.S. Pat. No. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 7,003,082, Case IPR2013-00550, In The United States Patent and Trademark Office Before the Patent Trial and Appeal Board, Jul. 7, 2014.
Supplemental Declaration of Benedict J. Occhiogrosso, In Re: U.S. Pat. No. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 6,594,346, Case IPR2013-00545, In The United States Patent and Trademark Office Before the Patent Trial and Appeal Board, Jul. 7, 2014.
Supplemental Declaration of Benedict J. Occhiogrosso, In Re: U.S. Pat. No. 6,603,835, Case IPR2013-00549, In The United States Patent and Trademark Office Before the Patent Trial and Appeal Board, Jul. 7, 2014.
Supplemental Declaration of Benedict J. Occhiogrosso, In Re: U.S. Pat. No. 7,319,740, Case IPR2013-00542, In The United States Patent and Trademark Office Before the Patent Trial and Appeal Board, Jul. 7, 2014.
Supplemental Declaration of Benedict J. Occhiogrosso, In Re: U.S. Pat. No. 6,233,314, Case IPR2013-00540, In The United States Patent and Trademark Office Before the Patent Trial and Appeal Board, Jul. 7, 2014.
Supplemental Declaration of Benedict J. Occhiogrosso, In Re: U.S. Pat. No. 5,909,482, Case IPR2013-00541, In The United States Patent and Trademark Office Before the Patent Trial and Appeal Board, Jul. 7, 2014.
Supplemental Declaration of Benedict J. Occhiogrosso, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,003,082, Case IPR2013-00550, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,594,346, Case IPR2013-00545, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,555,104, Case IPR2013-00543, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 5,909,482, Case IPR2013-00541, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,319,740, Case IPR2013-00542, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,233,314, Case IPR2013-00540, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,603,835, Case IPR2013-00549, In The United States Patent and Trademark Office Before the Patent Trial and Appeal Board, Jul. 7, 2014.
Decision, CaptionCall's Request for Rehearing, In Re: U.S. Pat. No. 6,603,835, Case IPR2013-00549, In The United States Patent and Trademark Office Before the Patent Trial and Appeal Board, Apr. 28, 2014.
Expert Report of Brenda Battat Regarding Secondary Considerations Related to Plaintiffs' Patents-In-Suit, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Expert Report of Mr. Benedict J. Occhiogrosso Regarding Invalidity of Asserted Claims of U.S. Pat. No. 5,909,482; U.S. Pat. No. 6,233,314; U.S. Pat. No. 6,594,346; U.S. Pat. No. 6,603,835; U.S. Pat. No. 7,003,082; U.S. Pat. No. 7,319,740; U.S. Pat. No. 7,555,104; and U.S. Pat. No. 8,213,578, *Ultratec, Inc., et al.* v. *Sorenson Communications, Inc., et al.*, Civil Action No. 3:13-CV-346-BBC, May 30, 2014 [Redacted—Public Version].
Expert Report of Constance Phelps Regarding Secondary Considerations Related to Plaintiffs' Patents-In-Suit, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Validity Report of Paul W. Ludwick Under Rule 26(a)(2)(B) of the Federal Rules of Civil Procedure Regarding U.S. Pat. No. 5,909,482; U.S. Pat. No. 6,233,314; U.S. Pat. No. 6,594,346; and U.S. Pat. No. 8,213,578, *Ultratec, Inc., et al.* v. *Sorenson Communications, Inc., et al.*, Civil Action No. 3:13-CV-346-BBC, United States District Court, Western District of Wisconsin, Apr. 22, 2014 [Redacted].
Validity Report of James A. Steel, Jr. Regarding U.S. Pat. No. 6,603,835; U.S. Pat. No. 7,003,082; U.S. Pat. No. 7,319,740; and U.S. Pat. No. 7,555,104, in Response to Expert Report of Benedict Occhiogrosso and Non-Infringement Report Regarding U.S. Pat. No. 5,379,801, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Brief in Support of Defendants Sorenson Communications, Inc. and CaptionCall, LLC's Motion for Partial Summary Judgment, *Ultratec, Inc., et al.* v. *Sorenson Communications, Inc., et al.*, Civil Action

(56) References Cited

OTHER PUBLICATIONS

No. 3:13-CV-346-BBC, United States District Court, Western District of Wisconsin, Apr. 17, 2014 [Redacted].
[Corrected] Brief in Support of Plaintiffs' Motion for Partial Summary Judgment of Infringement and Validity, *Ultratec, Inc., et al. v. Sorenson Communications, Inc., et al.*, Civil Action No. 3:13-CV-346-BBC, United States District Court, Western District of Wisconsin, Apr. 23, 2014 [Redacted].
Plaintiffs Ultratec, Inc. and Captel, Inc.'s Brief in Opposition to Defendants' Motion for Partial Summary Judgment—Willfulness, *Ultratec, Inc., et al. v. Sorenson Communications, Inc., et al.*, Civil Action No. 3:13-CV-346-BBC, United States District Court, Western District of Wisconsin, May 12, 2014.
Declaration of Benedict J. Occhiogrosso in Support of Defendants' Opposition to Plaintiffs' Motion for Partial Summary Judgment, *Ultratec, Inc., et al. v. Sorenson Communications, Inc., et al.*, Civil Action No. 3:13-CV-346-BBC, United States District Court, Western District of Wisconsin, May 12, 2014.
Response in Opposition to Plaintiffs' Motion for Partial Summary Judgment of Infringement and Validity, *Ultratec, Inc., et al. v. Sorenson Communications, Inc., et al.*, Civil Action No. 3:13-CV-346-BBC, United States District Court, Western District of Wisconsin, May 12, 2014 [Redacted—Public Version].
Declaration of Robert M. Engelke in Support of Plaintiffs' Response to Defendants' Motion for Partial Summary Judgment, *Ultratec, Inc., et al. v. Sorenson Communications, Inc., et al.*, Civil Action No. 3:13-CV-346-BBC, United States District Court, Western District of Wisconsin, May 12, 2014 [Redacted].
Defendants' Reply in Support of Their Motion for Partial Summary Judgment, *Ultratec, Inc., et al. v. Sorenson Communications, Inc., et al.*, Civil Action No. 3:13-CV-346-BBC, United States District Court, Western District of Wisconsin, May 22, 2014 [Redacted].
Reply Brief in Support of Plaintiffs' Motion for Partial Summary Judgment of Infringement and Validity, *Ultratec, Inc., et al. v. Sorenson Communications, Inc., et al.*, Civil Action No. 3:13-CV-346-BBC, United States District Court, Western District of Wisconsin, May 22, 2014 [Redacted—Public Version].
Sorenson Communications, Inc. and CaptionCall, LLC's Invalidity Contentions and Exhibits, *Ultratec, Inc., et al. v. Sorenson Communications, Inc., et al.*, Civil Action No. 3:13-CV-346-BBC, United States District Court, Western District of Wisconsin, Jul. 16, 2014.
Sorenson Communications, Inc. and CaptionCall, LLC's Invalidity Contentions and Exhibits, *Ultratec, Inc., et al. v. Sorenson Communications, Inc., et al.*, Civil Action No. 3:13-CV-346-BBC, United States District Court, Western District of Wisconsin, May 16, 2014.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, In Frontiers in Education Conference, 1993, 23rd Annual Conference 'Engineering Education: Renewing America's Technology' Proceedings, IEEE, pp. 92-97.
IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.

Karjalainen, et al., Applications for the Hearing-Impaired: Evaluation of Finnish Phoneme Recognition Methods, Eurospeech, 1997, 4 pages.
Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35(5):80-90.
Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.
Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.
Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168:889-893.
Wactlar, et al., Informedia(TM): News-On-Demand Experiments in Speech Recognition, Proceedings of ARPA Speech Recognition Workshop, 1996, pp. 18-21.
Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
U.S. Appl. No. 08/396,554, Telephone for the Deaf and Method of Using Same, filed Mar. 1, 1995, 121 pages.
U.S. Appl. No. 09/599,347, filed Jun. 22, 2000, 19 pages.
U.S. Appl. No. 10/099,824, Graphic User Interface for a Patient Ventilator, filed Mar. 15, 2002, 3 pages.
U.S. Appl. No. 60/041,458, TTY Modem System, filed Mar. 25, 1997, 32 pages.
The Patent Office, Examination Report, dated Apr. 15, 2002, Application No. GB 9908312.3, 2 pages.
Applicant, Response to Apr. 15, 2002 Examination Report, dated Oct. 14, 2002, Application No. GB 9908312.3, 2 pages.
CaptionCall L.L.C. Petition for Inter Partes Review of Claims 1 and 2 of U.S. Pat. No. 7,555,104 Under 35 U.S.C. 311-319 and 37 C.F.R. 42.100 Et Seq., Aug. 30, 2013, 65 pages.
CaptionCall L.L.C. Petition for Inter Partes Review of Claims 1 and 2 of U.S. Pat. No. 6,233,314 Under 35 U.S.C. 311-319 and 37 C.F.R. 42.100 Et Seq., Aug. 30, 2013, 39 pages.

(56) References Cited

OTHER PUBLICATIONS

CaptionCall L.L.C. Petition for Inter Partes Review of Claims 1 and 2 of U.S. Pat. No. 6,594,346 Under 35 U.S.C. 311-319 and 37 C.F.R. 42.100 Et Seq., Aug. 30, 2013, 67 pages.
CaptionCall L.L.C. Petition for Inter Partes Review of Claims 1-15 of U.S. Pat. No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Pat. No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Pat. No. 6,603,835 Under 35 U.S.C. 311-319 and 37 C.F.R. 42.100 Et Seq., Aug. 30, 2013, 66 pages.
CaptionCall L.L.C. Petition for Inter Partes Review of Claims 1 of U.S. Pat. No. 7,003,082 Under 35 U.S.C. 311-319 and 37 C.F.R. 42.100 Et Seq., Aug. 30, 2013, 51 pages.
CaptionCall L.L.C. Petition for Inter Partes Review of Claims 1 and 2 of U.S. Pat. No. 7,319,740 Under 35 U.S.C. 311-319 and 37 C.F.R. 42.100 Et Seq., Aug. 30, 2013, 67 pages.
United States Patent and Trademark Office, Office Action Summary and Detailed Action, U.S. Appl. No. 09/783,679 (Now U.S. Pat. No. 6,594,346), dated Jun. 5, 2002.
Applicant, Response (to Jun. 5, 2002 Office Action), U.S. Appl. No. 09/783,679 (Now U.S. Pat. No. 6,594,346), dated Dec. 4, 2002.
United States Patent and Trademark Office, Notice of Allowance, U.S. Appl. No. 09/783,679 (Now U.S. Pat. No. 6,594,346), dated Feb. 19, 2003.
United States Patent and Trademark Office, Office Action Summary and Detailed Action, U.S. Appl. No. 09/789,120 (Now U.S. Pat. No. 6,567,503), dated Jun. 17, 2002.
Applicant, Amendment (Response to Jun. 17, 2002 Office Action), U.S. Appl. No. 09/789,120 (Now U.S. Pat. No. 6,567,503), dated Oct. 19, 2002.
United States Patent and Trademark Office, Notice of Allowance, U.S. Appl. No. 09/789,120 (Now U.S. Pat. No. 6,567,503), dated Dec. 30, 2002.
Canadian Intellectual Property Office, Examiner's Report, Application No. CA 2,372,061, dated Apr. 26, 2004.
Applicant, Response to Apr. 26, 2004 Official Action, Application No. CA 2,372,061, dated Oct. 26, 2004.
Canadian Intellectual Property Office, Notice of Allowance, Application No. CA 2,372,061, dated May 26, 2005.
Canadian Intellectual Property Office, Examiner's Report, Application No. CA 2,520,594, dated Mar. 7, 2006.
Applicant, Response to Mar. 7, 2006 Office Action, Application No. CA 2,520,594, dated Sep. 6, 2006.
Canadian Intellectual Property Office, Examiner's Report, Application No. CA 2,520,594, dated Nov. 27, 2006.
Applicant, Response to Nov. 27, 2006 Office Action, Application No. CA 2,520,594, dated May 25, 2007.
United Kingdom Patent Office, Combined Search and Examination Report, Application No. GB 0203898.2, dated Aug. 30, 2002.
Applicant, Response to Aug. 30, 2002 Official Letter, Application No. GB 0203898.2, dated Oct. 28, 2002.
United Kingdom Patent Office, Examination Report, Application No. GB 0203898.2, dated Jan. 21, 2003.
Applicant, Response to Jan. 21, 2003 Official Letter, Application No. GB 0203898.2, dated Jul. 15, 2003.
United Kingdom Patent Office, Combined Search and Examination Report, Application No. GB 0225275.7, dated Jan. 20, 2003.
Applicant, Response to Jan. 20, 2003 Letter, Application No. GB 0225275.7, dated Jul. 14, 2003.
United States Patent and Trademark Office, Office Action Summary and Detailed Action, U.S. Appl. No. 09/790,413 (now U.S. Pat. No. 6,882,707), dated Mar. 23, 2004.
Applicant, Response to Restriction Requirement, U.S. Appl. No. 09/790,413 (now U.S. Pat. No. 6,882,707), dated Apr. 9, 2004.
United States Patent and Trademark Office, Office Action Summary and Detailed Action, U.S. Appl. No. 09/790,413 (now U.S. Pat. No. 6,882,707), dated May 7, 2004.
Applicant, Response to May 7, 2004 Office Action, U.S. Appl. No. 09/790,413 (now U.S. Pat. No. 6,882,707), dated Aug. 9, 2004.
United States Patent and Trademark Office, Notice of Allowance, Examiner's Amendment and Interview Summary, U.S. Appl. No. 09/790,413 (now U.S. Pat. No. 6,882,707), dated Dec. 10, 2004.
United States Patent and Trademark Office, Office Action Summary and Detailed Action, U.S. Appl. No. 10/336,950, dated Jun. 2, 2003.
United States Patent and Trademark Office, Office Action Summary and Detailed Action, U.S. Appl. No. 11/391,141 (now U.S. Pat. No. 7,881,441), dated Mar. 9, 2010.
Applicant, First Amendment, U.S. Appl. No. 11/391,141 (now U.S. Pat. No. 7,881,441), dated Jun. 9, 2010.
United States Patent and Trademark Office, Notice of Allowance, U.S. Appl. No. 11/391,141 (now U.S. Pat. No. 7,881,441), dated Sep. 21, 2010.
United States Patent and Trademark Office, Supplemental Notice of Allowability, U.S. Appl. No. 11/391,141 (now U.S. Pat. No. 7,881,441), dated Dec. 7, 2010.
European Patent Office, Communication, Application No. EP 06785768.0, dated Feb. 7, 2008.
Applicant, Reply to Feb. 7, 2008 Communication, Application No. EP 06785768.0, dated Mar. 12, 2008.
European Patent Office, Examination Report, Application No. EP 06785768.0, dated Aug. 9, 2010.
Applicant, Response to Aug. 9, 2010 Communication, Application No. EP 06785768.0, dated Dec. 20, 2010.
PCT International Search Report and Written Opinion, Application No. PCT/US2006/025236, dated Oct. 2, 2006.
PCT International Preliminary Report on Patentability, Application No. PCT/US2006/025236, dated Jan. 9, 2008.
Republic of the Philippines Intellectual Property Office, Findings/Action of Examiner, Application No. PH 1-2007-502940, dated Oct. 29, 2010.
Applicant, Response to Oct. 29, 2010 Office Action, Application No. PH 1-2007-502940, dated Dec. 29, 2010.
IP Australia, Examiner's First Report, Application No. AU 2006263680, dated Jun. 29, 2009.
Applicant, Response to Jun. 29, 2009 Examination Report, Application No. AU 2006263680, dated Jun. 17, 2010.
IP Australia, Examiner's Report No. 2, Application No. AU 2006263680, dated Jun. 22, 2010.
Applicant, Response to Jun. 22, 2010 Examination Report, Application No. AU 2006263680, dated Jul. 16, 2010.
United States Patent and Trademark Office, Office Action Summary and Detailed Action, U.S. Appl. No. 11/361,114 (now U.S. Pat. No. 7,555,104), dated May 21, 2007.
Applicant, Terminal Disclaimer, U.S. Appl. No. 11/361,114 (now U.S. Pat. No. 7,555,104), dated Jul. 23, 2007.
United States Patent and Trademark Office, Notice of Allowance and Examiner's Statement of Reasons for Allowance, U.S. Appl. No. 11/361,114 (now U.S. Pat. No. 7,555,104), dated Sep. 15, 2008.
Applicant, Request for Continued Examination and Submission of Supplemental Information Disclosure Statement, U.S. Appl. No. 11/361,114 (now U.S. Pat. No. 7,555,104), dated Dec. 15, 2008.
United States Patent and Trademark Office, Notice of Allowance, U.S. Appl. No. 11/361,114 (now U.S. Pat. No. 7,555,104), dated Feb. 25, 2009.
United States Patent and Trademark Office, Notice of Allowance and Examiner's Statement of Reasons for Allowance, U.S. Appl. No. 09/876,340 (now U.S. Pat. No. 6,504,910), dated Aug. 13, 2002.
PCT International Search Report, Application No. PCT/US02/18156, dated Oct. 29, 2002.
Canadian Intellectual Property Office, Examiner's Report, Application No. CA 2,613,363, dated Oct. 1, 2012.
Applicant, Response to Examiner's Report, Application No. CA 2,613,363, dated Mar. 7, 2013.
Canadian Intellectual Property Office, Notice of Allowance, Application No. CA 2,613,363, dated Oct. 18, 2013.
Government of India Patent Office, First Examination Report, Application No. IN 4970/KOLNP/2007, dated Feb. 26, 2014.
Canadian Intellectual Property Office, Examiner's Report, Application No. CA 2,556,933, dated Apr. 10, 2012.

(56) References Cited

OTHER PUBLICATIONS

Applicant, Response to Official Action, Application No. C 2,556,933, dated Jul. 12, 2012.
Canadian Intellectual Property Office, Notice of Allowance, Application No. CA 2,556,933, dated Feb. 14, 2013.
PCT International Search Report and Written Opinion, PCT/US2009/040523, dated Nov. 11, 2009.
Canadian Intellectual Property Office, Examiner's Report, Application No. CA 2,761,343, dated Mar. 8, 2012.
Applicant, Response to Official Action, Application No. CA 2,761,343, dated Mar. 30, 2012.
Canadian Intellectual Property Office, Notice of Allowance, Application No. CA 2,761,343, dated Jul. 24, 2012.
United States Patent and Trademark Office, Office Action Summary and Detailed Action, U.S. Appl. No. 11/955,476, dated Jan. 24, 2011.
Applicant, Amendment (Response to Jan. 24, 2011, Office Action) and Terminal Disclaimers, U.S. Appl. No. 11/955,476, dated May 23, 2011.
United States Patent and Trademark Office, Office Action Summary and Detailed Action, U.S. Appl. No. 11/955,476, dated Jun. 23, 2011.
Applicant, Amendment Submitted with a Request for Continued Examination and Terminal Disclaimers, U.S. Appl. No. 11/955,476, dated Oct. 19, 2011.
United States Patent and Trademark Office, Notice of Allowance, U.S. Appl. No. 11/955,476, dated Mar. 2, 2012.
United States Patent and Trademark Office, Office Action Summary and Detailed Action, U.S. Appl. No. 13/486,221, dated Sep. 13, 2013.
Applicant, Amendment (Response to Sep. 13, 2013, Office Action), U.S. Appl. No. 13/486,221, dated Mar. 11, 2014.
United States Patent and Trademark Office, Office Action Summary and Detailed Action, U.S. Appl. No. 13/486,221, dated Mar. 26, 2014.
Applicant, Terminal Disclaimers and Remarks, U.S. Appl. No. 13/486,221, dated Apr. 30, 2014.
United States Patent and Trademark Office, Office Action Summary and Detailed Action, U.S. Appl. No. 13/486,221, dated Jun. 25, 2014.
United States Patent and Trademark Office, Office Action Summary and Detailed Action, U.S. Appl. No. 13/950,860, dated Jan. 9, 2014.
Applicant, Amendment (Response to Jan. 9, 2014, Office Action), U.S. Appl. No. 13/950,860, dated Jun. 30, 2014.
Declaration of Benedict J. Occhiogrosso, In Re: U.S. Pat. No. 7,003,082, United States Patent and Trademark Office Before the Patent Trial and Appeal Board, Aug. 30, 2013.
Declaration of Benedict J. Occhiogrosso, In Re: U.S. Pat. No. 6,603,835, United States Patent and Trademark Office Before the Patent Trial and Appeal Board, Aug. 30, 2013.
Declaration of Benedict J. Occhiogrosso, In Re: U.S. Pat. No. 6,233,314, United States Patent and Trademark Office Before the Patent Trial and Appeal Board, Aug. 30, 2013.
Declaration of Benedict J. Occhiogrosso, In Re: U.S. Pat. No. 5,909,482, United States Patent and Trademark Office Before the Patent Trial and Appeal Board, Aug. 30, 2013.
Declaration of Benedict J. Occhiogrosso, In Re: U.S. Pat. No. 7,319,740, United States Patent and Trademark Office Before the Patent Trial and Appeal Board, Aug. 30, 2013.
Declaration of Benedict J. Occhiogrosso, In Re: U.S. Pat. No. 6,594,346, United States Patent and Trademark Office Before the Patent Trial and Appeal Board, Aug. 30, 2013.
Declaration of Benedict J. Occhiogrosso, In Re: U.S. Pat. No. 7,555,104, United States Patent and Trademark Office Before the Patent Trial and Appeal Board, Aug. 30, 2013.
Declaration of Benedict J. Occhiogrosso, In Re: U.S. Pat. No. 8,213,578, United States Patent and Trademark Office Before the Patent Trial and Appeal Board, Aug. 30, 2013.
Request for Rehearing Under 37 C.F.R. 42.71(d), In Re: U.S. Pat. No. 6,603,835, Case IPR2013-00549, United States Patent and Trademark Office Before the Patent Trial and Appeal Board, Mar. 19, 2014.
Patent Owner Response Under 37 C.F.R. 42.120 (to the Institution of Inter Partes Review), In Re: U.S. Pat. No. 6,594,346, Case IPR2013-00545, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,003,082, Case IPR2013-00550, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,555,104, Case IPR2013-00543, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,319,740, Case IPR2013-00542, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 6,603,835, Case IPR2013-00549, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 8,213,578, Case IPR2013-00544, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 5,909,482, Case IPR2013-00541, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 6,233,314, Case IPR2013-00540, In The United States Patent and Trademark Office Before the Patent Trial and Appeal Board, May 30, 2014.
Declaration of Brenda Battat, In Re: U.S. Pat. No. 8,231,578, Case IPR2013-00544, In The United States Patent and Trademark Office Before the Patent Trial and Appeal Board, May 8, 2014.
Declaration of Constance Phelps, In Re: U.S. Pat. No. 6,233,314, Case IPR2013-00540, In The United States Patent and Trademark Office Before the Patent Trial and Appeal Board, May 9, 2014.
Declaration of Benedict J. Occhiogrosso, In Re: U.S. Pat. No. 6,603,835, United States Patent and Trademark Office Before the Patent Trial and Appeal Board, May 19, 2014.
Declaration of James A. Steel, Jr., In Re: U.S. Pat. No. 7,319,740, Case IPR2013-00542, United States Patent and Trademark Office Before the Patent Trial and Appeal Board, May 10, 2014.
Declaration of James A. Steel, Jr., In Re: U.S. Pat. No. 7,003,082, Case IPR2013-00550, United States Patent and Trademark Office Before the Patent Trial and Appeal Board, May 10, 2014.
Declaration of James A. Steel, Jr., In Re: U.S. Pat. No. 6,603,835, Case IPR2013-00549, United States Patent and Trademark Office Before the Patent Trial and Appeal Board, May 11, 2014.
Declaration of James A. Steel, Jr., In Re: U.S. Pat. No. 7,555,104, Case IPR2013-00543, United States Patent and Trademark Office Before the Patent Trial and Appeal Board, May 12, 2014.
United States Patent and Trademark Office, Notice of Allowance, Examiner's Amendment, Examiner Interview Summary Record, U.S. Appl. No. 07/074,625 (now U.S. Pat. No. 4,777,469), dated May 20, 1988.
Canadian Patent Office, Notice of Allowance, Application No. CA 571,452 (Patent No. 1,301,388), dated Jan. 29, 1991.
Applicant, Restoration and Amendment, Application No. CA 571,452 (Patent No. 1,301,388), dated Aug. 8, 1991.
United States Patent and Trademark Office, Communication, U.S. Appl. No. 07/224,118 (now U.S. Pat. No. 4,897,868), dated Jun. 8, 1989.
Applicant, Amendment (Response to Jun. 8, 1989 Office Action) and Terminal Disclaimer, U.S. Appl. No. 07/224,118 (now U.S. Pat. No. 4,897,868), dated Jun. 19, 1989.

(56) References Cited

OTHER PUBLICATIONS

United States Patent and Trademark Office, Notice of Allowance, U.S. Appl. No. 07/224,118 (now U.S. Pat. No. 4,897,868), dated Aug. 29, 1989.
United States Patent and Trademark Office, Communication, U.S. Appl. No. 07/334,003 (now U.S. Pat. No. 4,959,847), dated Oct. 10, 1989.
Applicant, Amendment (Response to Oct. 10, 1989 Office Action), U.S. Appl. No. 07/334,003 (now U.S. Pat. No. 4,959,847), dated Jan. 10, 1990.
United States Patent and Trademark Office, Notice of Allowance, U.S. Appl. No. 07/334,003 (now U.S. Pat. No. 4,959,847), dated Mar. 27, 1990.
United Kingdom Patent Office, Examiner's Search Report, Application No. GB 9006994.9 (Patent No. GB 2,231,468), dated Jul. 12, 1990.
United Kingdom Patent Office, Examiner's Report, Application No. GB 9006994.9 (Patent No. GB 2,231,468), dated Dec. 16, 1992.
Applicant, Response to Dec. 16, 1992 Official Letter, Application No. GB 9006994.9 (Patent No. GB 2,231,468), dated Jun. 11, 1993.
Canadian Intellectual Property Office, Examination Report, Application No. CA 2,013,617, dated Jul. 28, 2000.
Applicant, Response to Jul. 28, 2000 Official Action, Application No. CA 2,013,617, dated Nov. 28, 2000.
Applicant, Information Letter, Application No. CA 2,013,617, dated Feb. 1, 2001.
Canadian Intellectual Property Office, Notice of Allowance, Application No. CA 2,013,617, dated Mar. 23, 2001.
United States Patent and Trademark Office, Communication, U.S. Appl. No. 07/842,943 (now U.S. Pat. No. 5,351,288), dated Oct. 22, 1993.
Applicant, Amendment (Response to Oct. 22, 1993 Office Action) and Terminal Disclaimer, U.S. Appl. No. 07/842,943 (now U.S. Pat. No. 5,351,288), dated Jan. 13, 1994.
United States Patent and Trademark Office, Communication, U.S. Appl. No. 07/842,943 (now U.S. Pat. No. 5,351,288), dated Mar. 30, 1994.
Applicant, Response to Mar. 30, 1994 Final Rejection, U.S. Appl. No. 07/842,943 (now U.S. Pat. No. 5,351,288), dated Apr. 12, 1994.
Applicant, Supplemental Response to Final Rejection and Terminal Disclaimer, U.S. Appl. No. 07/842,943 (now U.S. Pat. No. 5,351,288), dated Apr. 28, 1994.
United States Patent and Trademark Office, Notice of Allowance, U.S. Appl. No. 07/842,943 (now U.S. Pat. No. 5,351,288), dated Jun. 6, 1994.
United States Patent and Trademark Office, Communication, U.S. Appl. No. 07/255,357, dated May 3, 1989.
Applicant, Amendment (Response to May 3, 1989 Office Action), U.S. Appl. No. 07/255,357, dated Aug. 3, 1989.
United States Patent and Trademark Office, Communication, U.S. Appl. No. 07/255,357, dated Oct. 16, 1989.
Applicant, Amendment (Response to Oct. 16, 1989 Office Action), U.S. Appl. No. 07/255,357, dated Apr. 16, 1990.
United States Patent and Trademark Office, Communication, U.S. Appl. No. 07/255,357, dated Jul. 16, 1990.
Applicant, Response After Final, U.S. Appl. No. 07/255,357, dated Oct. 16, 1990.
United States Patent and Trademark Office, Advisory Action, U.S. Appl. No. 07/255,357, dated Nov. 6, 1990.
United States Patent and Trademark Office, Examiner's Action, U.S. Appl. No. 07/886,553 (now U.S. Pat. No. 5,325,417), dated May 21, 1993.
Applicant, First Amendment (Response to May 21, 1993 Office Action), U.S. Appl. No. 07/886,553 (now U.S. Pat. No. 5,325,417), dated Oct. 21, 1993.
United States Patent and Trademark Office, Notice of Allowance, U.S. Appl. No. 07/886,553 (now U.S. Pat. No. 5,325,417), dated Jan. 4, 1994.
European Patent Office, Communication, Application No. EP 93911359.3 (Patent No. EP 0608389), dated Jul. 10, 1998.
Applicant, Response to Jul. 10, 1998 Communication, Application No. EP 93911359.3 (Patent No. EP 0608389), dated Jan. 19, 1999.
Canadian Intellectual Property Office, Notice of Allowance, Application No. CA 2,113,841, dated Jun. 10, 2002.
PCT International Search Report, Application No. PCT/U593/04751, dated Aug. 18, 1993.
United States Patent and Trademark Office, Examiner's Action, U.S. Appl. No. 29/024,266 (now U.S. Pat. No. D. 364,865), dated Mar. 30, 1995.
Applicant, Response to First Office Action, U.S. Appl. No. 29/024,266 (now U.S. Pat. No. D. 364,865), dated May 16, 1995.
United States Patent and Trademark Office, Notice of Allowance, U.S. Appl. No. 29/024,266 (now U.S. Pat. No. D. 364,865), dated Jun. 7, 1995.
United States Patent and Trademark Office, Office Action Summary and Detailed Action, U.S. Appl. No. 29/076,383 (now U.S. Pat. No. D. 405,793), dated Apr. 14, 1998.
Applicant, First Amendment (Response to Apr. 14, 1998 Office Action), U.S. Appl. No. 29/076,383 (now U.S. Pat. No. D. 405,793), dated Jul. 14, 1998.
United States Patent and Trademark Office, Notice of Allowance and Examiner's Amendment, U.S. Appl. No. 29/076,383 (now U.S. Pat. No. D. 405,793), dated Aug. 10, 1998.
Applicant, Preliminary Response to United States Patent and Trademark Office, U.S. Appl. No. 07/616,720 (now U.S. Pat. No. 5,081,673), dated Dec. 31, 1990.
United States Patent and Trademark Office, Notice of Allowance, U.S. Appl. No. 07/616,720 (now U.S. Pat. No. 5,081,673), dated Mar. 7, 1991.
Canadian Intellectual Property Office, Notice of Allowance, Patent No. CA 1320602, dated Oct. 27, 1992.
United States Patent and Trademark Office, Examiner's Action, U.S. Appl. No. 07/886,642 (now U.S. Pat. No. 5,327,479), dated May 19, 1993.
Applicant, First Amendment (Response to May 19, 1993 Office Action), U.S. Appl. No. 07/886,642 (now U.S. Pat. No. 5,327,479), dated Oct. 19, 1993.
United States Patent and Trademark Office, Notice of Allowance and Examiner Interview Summary Record, U.S. Appl. No. 07/886,642 (now U.S. Pat. No. 5,327,479), dated Jan. 5, 1994.
Canadian Intellectual Property Office, Notice of Allowance, Application No. CA 2,113,839, dated Jun. 18, 2002.
PCT International Search Report, Application No. PCT/US93/04753, dated Aug. 20, 1993.
European Patent Office, Supplementary European Search Report, Application No. EP 93911360 (Patent No. EP 0596078), dated Mar. 27, 1995.
European Patent Office, Communication, Application No. EP 93911360.1 (Patent No. EP 0596078), dated Jul. 10, 1998.
Applicant, Response to Jul. 10, 1998 Communication, Application No. EP 93911360.1 (Patent No. EP 0596078), dated Jan. 20, 1999.
European Patent Office, Communication, Application No. EP 93911360.1 (Patent No. EP 0596078), dated Jun. 16, 1999.
United States Patent and Trademark Office, Notice of Allowance, Examiner's Amendment, Examiner Interview Summary Record, U.S. Appl. No. 08/129,894 (now U.S. Pat. No. 5,432,837), dated Dec. 29, 1994.
United States Patent and Trademark Office, Examiner's Action, U.S. Appl. No. 08/155,061 (now U.S. Pat. No. 5,517,548), dated Dec. 22, 1994.
Applicant, Amendment (Response to Dec. 22, 1994 Office Action), U.S. Appl. No. 08/155,061 (now U.S. Pat. No. 5,517,548), dated Jun. 22, 1995.
United States Patent and Trademark Office, Notice of Allowance, U.S. Appl. No. 08/155,061 (now U.S. Pat. No. 5,517,548), dated Aug. 8, 1995.
European Patent Office, Supplementary European Search Report, Application No. EP 93911361.9 (Patent No. EP 0596079), dated Mar. 27, 1995.
European Patent Office, Communication, Application No. EP 93911361.9 (Patent No. EP 0596079), dated Jul. 10, 1998.
Applicant, Response to Jul. 10, 1998 Communication, Application No. EP 93911361.9 (Patent No. EP 0596079), dated Jan. 20, 1999.

(56) References Cited

OTHER PUBLICATIONS

PCT International Search Report, Application No. PCT/US93/04760, dated Aug. 13, 1993.
United States Patent and Trademark Office, Communication, U.S. Appl. No. 07/886,552, dated May 21, 1993.
United States Patent and Trademark Office, Office Action Summary and Detailed Action, U.S. Appl. No. 08/802,053, dated Sep. 30, 1997.
Applicant, Response to Sep. 30, 1997 First Office Action, U.S. Appl. No. 08/802,053, dated Oct. 20, 1997.
United States Patent and Trademark Office, Office Action Summary and Detailed Action, U.S. Appl. No. 08/802,053, dated Jan. 5, 1998.
Applicant, Amendment After Final (Jan. 5, 1998 Office Action), U.S. Appl. No. 08/802,053, dated Feb. 6, 1998.
United States Patent and Trademark Office, Advisory Action, U.S. Appl. No. 08/802,053, dated Feb. 20, 1998.
Applicant, Appellant's Brief on Appeal, U.S. Appl. No. 08/802,053, May 29, 1998.
United States Patent and Trademark Office, Examiner's Answer, U.S. Appl. No. 08/802,053, dated Aug. 18, 1998.
United States Patent and Trademark Office, Decision on Appeal, U.S. Appl. No. 08/802,053, dated Oct. 19, 2001.
United States Patent and Trademark Office, Examiner's Action, U.S. Appl. No. 08/258,044 (now U.S. Pat. No. 5,604,786), dated Jun. 21, 1995.
Applicant, First Amendment (Response to Jun. 21, 1995 Office Action), U.S. Appl. No. 08/258,044 (now U.S. Pat. No. 5,604,786), dated Sep. 8, 1995.
United States Patent and Trademark Office, Communication, U.S. Appl. No. 08/258,044 (now U.S. Pat. No. 5,604,786), dated Dec. 14, 1995.
Applicant, Second Amendment, U.S. Appl. No. 08/258,044 (now U.S. Pat. No. 5,604,786), dated Jun. 14, 1996.
Applicant, Third Amendment, U.S. Appl. No. 08/258,044 (now U.S. Pat. No. 5,604,786), dated Jul. 31, 1996.
United States Patent and Trademark Office, Notice of Allowance, U.S. Appl. No. 08/258,044 (now U.S. Pat. No. 5,604,786), dated Aug. 7, 1996.
United States Patent and Trademark Office, Supplemental Notice of Allowability and Examiner's Amendment, U.S. Appl. No. 08/258,044 (now U.S. Pat. No. 5,604,786), dated Nov. 18, 1996.
United States Patent and Trademark Office, Communication, U.S. Appl. No. 08/369,205 (now U.S. Pat. No. 5,581,593), dated Nov. 2, 1995.
Applicant, Amendment (Response to Nov. 2, 1995 Office Action), U.S. Appl. No. 08/369,205 (now U.S. Pat. No. 5,581,593), dated Feb. 5, 1996.
United States Patent and Trademark Office, Notice of Allowance, Interview Summary, and Examiner's Amendment, U.S. Appl. No. 08/369,205 (now U.S. Pat. No. 5,581,593), dated May 15, 1996.
PCT International Search Report, Application No. PCT/US96/00282, dated Apr. 9, 1996.
United States Patent and Trademark Office, Office Action Summary and Detailed Action, U.S. Appl. No. 08/481,852 (now U.S. Pat. No. 5,978,654), dated Sep. 5, 1996.
Applicant, Amendment (Response to Sep. 5, 1996 Office Action), U.S. Appl. No. 08/481,852 (now U.S. Pat. No. 5,978,654), dated Nov. 26, 1997.
United States Patent and Trademark Office, Office Action Summary and Detailed Action, U.S. Appl. No. 08/481,852 (now U.S. Pat. No. 5,978,654), dated Oct. 16, 1998.
Applicant, Response (to Oct. 16, 1998 Office Action), U.S. Appl. No. 08/481,852 (now U.S. Pat. No. 5,978,654), dated Apr. 16, 1999.
United States Patent and Trademark Office, Notice of Allowance, U.S. Appl. No. 08/481,852 (now U.S. Pat. No. 5,978,654), dated May 5, 1999.
PCT International Search Report, Application No. PCT/US96/09391, dated Aug. 27, 1996.
United States Patent and Trademark Office, Office Action Summary and Detailed Action, U.S. Appl. No. 09/288,420 (now U.S. Pat. No. 6,233,314), dated Feb. 25, 2000.
Applicant, Amendment (Response to Feb. 25, 2000 Office Action) and Terminal Disclaimer, U.S. Appl. No. 09/288,420 (now U.S. Pat. No. 6,233,314), dated Aug. 25, 2000.
United States Patent and Trademark Office, Notice of Allowance, U.S. Appl. No. 09/288,420 (now U.S. Pat. No. 6,233,314), dated Dec. 5, 2000.
United States Patent and Trademark Office, Office Action Summary and Detailed Action, U.S. Appl. No. 09/783,337 (now U.S. Pat. No. 6,493,426), dated Dec. 14, 2001.
Applicant, Response to Dec. 14, 2001 Office Action and Terminal Disclaimer, U.S. Appl. No. 09/783,337 (now U.S. Pat. No. 6,493,426), dated Jun. 14, 2002.
United States Patent and Trademark Office, Notice of Allowance and Examiner's Statement of Reasons for Allowance, U.S. Appl. No. 09/783,337 (now U.S. Pat. No. 6,493,426), dated Jul. 25, 2002.
United Kingdom Patent Office, Examination Report, Application No. GB 0319142.6 (Patent No. GB 2389993), dated Jan. 13, 2004.
Canadian Intellectual Property Office, Examiner's Report, Application No. CA 2,438,412, dated May 20, 2009.
Applicant, Response to May 20, 2009 Official Action, Application No. CA 2,438,412, dated Nov. 18, 2009.
Canadian Intellectual Property Office, Notice of Allowance, Application No. Ca 2,438,412, dated Apr. 30, 2010.
Canadian Intellectual Property Office, Examiner's Report, Application No. CA 2,419,150, dated Sep. 17, 2009.
Applicant, Response to Sep. 17, 2009 Official Action, Application No. CA 2,419,150, dated Mar. 12, 2010.
United States Patent and Trademark Office, Office Action Summary and Detailed Action, U.S. Appl. No. 09/938,194 (now U.S. Pat. No. 6,603,835), dated Jul. 5, 2002.
Applicant, Response (to Jul. 5, 2002 Office Action), U.S. Appl. No. 09/938,194 (now U.S. Pat. No. 6,603,835), dated Jan. 6, 2003.
United States Patent and Trademark Office, Notice of Allowance, U.S. Appl. No. 09/938,194 (now U.S. Pat. No. 6,603,835), dated Mar. 18, 2003.
IP Australia, Examiner's First Report, Application No. AU 2002313798, dated Oct. 27, 2006.
Applicant, Response to Oct. 27, 2006 Examination Report, Application No. AU 2002313798, dated Feb. 9, 2007.
IP Australia, Notice of Acceptance, Application No. AU 2002313798, dated Apr. 2, 2007.
Canadian Intellectual Property Office, Examiner's Report, Application No. CA 2,458,372, dated Oct. 15, 2009.
Applicant, Response to Oct. 15, 2009 Official Action, Application No. CA 2,458,372, dated Apr. 15, 2010.
Canadian Intellectual Property Office, Notice of Allowance, Application No. CA 2,458,372, dated Jul. 27, 2010.
United Kingdom Patent Office, Examination Report, Application No. GB 0403994.7, dated May 28, 2004.
PCT International Search Report, Application No. PCT/US02/26815, dated Jan. 3, 2003.
PCT Written Opinion, Application No. PCT/US02/26815, dated Apr. 29, 2003.
PCT International Preliminary Examination Report, Application No. PCT/US02/26815, dated Apr. 14, 2004.
United States Patent and Trademark Office, Notice of Allowance and Examiner's Amendment, U.S. Appl. No. 09/956,310 (now U.S. Pat. No. 6,510,206), dated Aug. 19, 2002.
Applicant, Applicants' Comments on Examiner's Reason for Allowance (dated Aug. 19, 2002), U.S. Appl. No. 09/956,310 (now U.S. Pat. No. 6,510,206), dated Nov. 19, 2002.
United Kingdom Patent Office, Combined Search and Examination Report, Application No. GB 0406768.2 (Patent No. GB 2396774), dated Apr. 27, 2004.
PCT International Search Report, Application No. PCT/US01/29130, dated Mar. 1, 2003.
PCT International Preliminary Examination Report, Application No. PCT/US01/29130, dated Mar. 17, 2003.
United Kingdom Patent Office, Examination Report, Application No. GB 0306458.1, dated Sep. 17, 2003.

(56) References Cited

OTHER PUBLICATIONS

Applicant, Response to Sep. 17, 2003 Official Letter, Application No. GB 0306458.1, dated Mar. 16, 2004.
United States Patent and Trademark Office, Office Action Summary and Detailed Action, U.S. Appl. No. 09/977,842 (now U.S. Pat. No. 6,549,611), dated Apr. 23, 2002.
Applicant, Response (to Apr. 23, 2002 Office Action), U.S. Appl. No. 09/977,842 (now U.S. Pat. No. 6,549,611), dated Oct. 23, 2002.
Applicant, Terminal Disclaimer, U.S. Appl. No. 09/977,842 (now U.S. Pat. No. 6,549,611), dated Oct. 23, 2002.
United States Patent and Trademark Office, Notice of Allowance, U.S. Appl. No. 09/977,842 (now U.S. Pat. No. 6,549,611), dated Nov. 15, 2002.
United States Patent and Trademark Office, Office Action, U.S. Appl. No. 10/412,118, dated Nov. 3, 2003.
United States Patent and Trademark Office, Office Action Summary and Detailed Action, U.S. Appl. No. 10/316,215 (now U.S. Pat No. 6,934,366), dated Jul. 13, 2004.
Applicant, Response (to Jul. 13, 2004 Office Action) and Terminal Disclaimer, U.S. Appl. No. 10/316,215 (now U.S. Pat No. 6,934,366), dated Jan. 13, 2005.
United States Patent and Trademark Office, Notice of Allowance and Detailed Action, U.S. Appl. No. 10/316,215 (now U.S. Pat No. 6,934,366), dated Apr. 18, 2005.
United States Patent and Trademark Office, Office Action Summary and Detailed Action, U.S. Appl. No. 10/348,466 (now U.S. Pat No. 6,748,053), dated Jul. 3, 2003.
Applicant, Response (to Jul. 3, 2003 Office Action) and Terminal Disclaimer, U.S. Appl. No. 10/348,466 (now U.S. Pat No. 6,748,053), dated Jan. 5, 2004.
United States Patent and Trademark Office, Notice of Allowance, U.S. Appl. No. 10/348,466 (now U.S. Pat No. 6,748,053), dated Jan. 27, 2004.
United States Patent and Trademark Office, Office Action Summary and Detailed Action, U.S. Appl. No. 10/436,650 (now U.S. Pat. No. 7,164,753), dated Jul. 1, 2005.
Applicant, Amendment (Response to Jul. 1, 2005 Office Action), U.S. Appl. No. 10/436,650 (now U.S. Pat. No. 7,164,753), dated Sep. 14, 2005.
United States Patent and Trademark Office, Office Action Summary and Detailed Action, U.S. Appl. No. 10/436,650 (now U.S. Pat. No. 7,164,753), dated Nov. 17, 2005.
Applicant, Response (to Nov. 17, 2005 Office Action), U.S. Appl. No. 10/436,650 (now U.S. Pat. No. 7,164,753), dated Jan. 18, 2006.
United States Patent and Trademark Office, Office Action Summary and Detailed Action, U.S. Appl. No. 10/436,650 (now U.S. Pat. No. 7,164,753), dated Apr. 19, 2006.
Applicant, Response (to Apr. 19, 2006 Office Action), U.S. Appl. No. 10/436,650 (now U.S. Pat. No. 7,164,753), dated Jun. 13, 2006.
United States Patent and Trademark Office, Notice of Allowance and Detailed Action, U.S. Appl. No. 10/436,650 (now U.S. Pat. No. 7,164,753), dated Sep. 15, 2006.
IP Australia, Examiner's First Report, Application No. AU 2004239790, dated May 14, 2009.
Applicant, Response (to May 14, 2009 Examination Report), Application No. AU 2004239790, dated May 21, 2010.
Government of India the Patent Office, First Examination Report, Application No. 2262/KOLNP/2005, dated Apr. 29, 2008.
Applicant, Response to Apr. 29, 2008 Official Letter, Application No. 2262/KOLNP/2005, dated May 5, 2008.
Applicant, Response to Apr. 29, 2008 First Examination Report, Application No. 2262/KOLNP/2005, dated Oct. 23, 2008.
PCT International Preliminary Report on Patentability, Application No. PCT/US2004/014991, dated Dec. 1, 2005.
PCT International Search Report and Written Opinion, Application No. PCT/US2004/014991, dated Dec. 29, 2004.
Opinion and Order Regarding Summary Judgment, *Ultratec, Inc., et al. v. Sorenson Communications, Inc., et al.*, Civil Action No. 3:13-cv-00346-BBC, United States District Court, Western District of Wisconsin, Aug. 28, 2014.
Additional Opinion and Order Regarding Summary Judgment, *Ultratec, Inc., et al. v. Sorenson Communications, Inc., et al.*, Civil Action No. 3:13-cv-00346-BBC, United States District Court, Western District of Wisconsin, Aug. 28, 2014.
Opinion and Order Regarding Claim Construction, Daubert, Motions in Limine, and Secondary Considerations of Nonobviousness, *Ultratec, Inc., et al. v. Sorenson Communications, Inc., et al.*, Civil Action No. 3:13-cv-00346-BBC, United States District Court, Western District of Wisconsin, Sep. 29, 2014.
Opinion and Order Regarding Motions in Limine and Correcting Errors in Summary Judgment Order, *Ultratec, Inc., et al. v. Sorenson Communications, Inc., et al.*, Civil Action No. 3:13-cv-00346-BBC, United States District Court, Western District of Wisconsin, Oct. 1, 2014.
Opinion and Order Regarding Induced Infringement, *Ultratec, Inc., et al. v. Sorenson Communications, Inc., et al.*, Civil Action No. 3:13-cv-00346-BBC, United States District Court, Western District of Wisconsin, Oct. 1, 2014.
Opinion and Order Regarding Motions in Limine, *Ultratec, Inc., et al. v. Sorenson Communications, Inc., et al.*, Civil Action No. 3:13-cv-00346-BBC, United States District Court, Western District of Wisconsin, Oct. 3, 2014.
Opinion and Order Regarding Motions in Limine, *Ultratec, Inc., et al. v. Sorenson Communications, Inc., et al.*, Civil Action No. 3:13-cv-00346-BBC, United States District Court, Western District of Wisconsin, Oct. 8, 2014.
Opinion and Order Regarding Daubert Motions of Secondary Considerations, *Ultratec, Inc., et al. v. Sorenson Communications, Inc., et al.*, Civil Action No. 3:13-cv-00346-BBC, United States District Court, Western District of Wisconsin, Oct. 10, 2014.
Joint Stipulation of Dismissal With Prejudice of Claims and Counterclaims Relating to Claims 1-6 of the '835 Patent and Claim 10 of the '578 Patent, *Ultratec, Inc., et al. v. Sorenson Communications, Inc., et al.*, Civil Action No. 3:13-cv-00346-BBC, United States District Court, Western District of Wisconsin, Oct. 13, 2014.
Stipulation Regarding Infringement of Claim 11 of the '578 Patent, *Ultratec, Inc., et al. v. Sorenson Communications, Inc., et al.*, Civil Action No. 3:13-cv-00346-BBC, United States District Court, Western District of Wisconsin, Oct. 13, 2014.
Opinion and Order Regarding Motion for Claims Construction, *Ultratec, Inc., et al. v. Sorenson Communications, Inc., et al.*, Civil Action No. 3:13-cv-00346-BBC, United States District Court, Western District of Wisconsin, Oct. 21, 2014.
Special Verdict Regarding Liability, *Ultratec, Inc., et al. v. Sorenson Communications, Inc., et al.*, Civil Action No. 3:13-cv-00346-BBC, United States District Court, Western District of Wisconsin, Oct. 23, 2014.
Judgment, *Ultratec, Inc., et al. v. Sorenson Communications, Inc., et al.*, Civil Action No. 3:13-cv-00346-BBC, United States District Court, Western District of Wisconsin, Nov. 3, 2014.
Defendants' Rule 50(b) Motion for Judgment of Non-Infringement as a Matter of Law and Rule 59 Motion for New Trial, *Ultratec, Inc., et al. v. Sorenson Communications, Inc., et al.*, Civil Action No. 3:13-cv-00346-BBC, United States District Court, Western District of Wisconsin, Nov. 26, 2014.
Defendants' Rule 50(b) Motion for Judgment of Invalidity (Anticipation) and Alternative Rule 59 Motion for New Trial on Anticipation and Brief in Support, *Ultratec, Inc., et al. v. Sorenson Communications, Inc., et al.*, Civil Action No. 3:13-cv-00346-BBC, United States District Court, Western District of Wisconsin, Dec. 1, 2014.
Defendants' Rule 59 Motion for New Trial and Brief in Support, *Ultratec, Inc., et al. v. Sorenson Communications, Inc., et al.*, Civil Action No. 3:13-cv-00346-BBC, United States District Court, Western District of Wisconsin, Dec. 1, 2014.
Defendants' Rule 50(b) Motion for Judgment of Invalidity Obviousness and Alternative Rule 59 Motion for New Trial on Obviousness and Brief in Support, *Ultratec, Inc., et al. v. Sorenson Communications, Inc., et al.*, Civil Action No. 3:13-cv-00346-BBC, United States District Court, Western District of Wisconsin, Dec. 1, 2014 (Redacted).

(56) References Cited

OTHER PUBLICATIONS

Opinion and Order Regarding Stay of Litigation, *Ultratec, Inc., et al.* v. *Sorenson Communications, Inc., et al.*, Civil Action No. 3:13-cv-00346-BBC, United States District Court, Western District of Wisconsin, May 13, 2015.
Defendants' Answer to Plaintiffs' Second Amended Complaint for Patent Infringement and Counterclaims, *Ultratec, Inc., et al.* v. *Sorenson Communications, Inc., et al.*, Civil Action No. 3:14-cv-00066-BBC, United States District Court, Western District of Wisconsin, May 9, 2014.
Defendants' Notice of Motion and Motion for Summary Judgment Regarding U.S. Pat. No. 7,660,398, *Ultratec, Inc., et al.* v. *Sorenson Communications, Inc., et al.*, Civil Action No. 3:14-cv-00066-JDP, United States District Court, Western District of Wisconsin, Mar. 27, 2015.
Brief No. 1 in Support of Defendants' Motion for Summary Judgment (Indefiniteness and Claim Construction), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 2 in Support of Defendants' Motion for Summary Judgment (Non-Infringement and Invalidity Under 35 USC 102 and 103), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Reply in Support of Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc., et al.*, Civil Action No. 3:14-cv-00066-JDP, United States District Court, Western District of Wisconsin, Jun. 24, 2015 (Redacted).
Claim Construction and Summary Judgment Opinion and Order, *Ultratec, Inc., et al.* v. *Sorenson Communications, Inc., et al.*, Civil Action No. 3:14-cv-00066-JDP, United States District Court, Western District of Wisconsin, Sep. 11, 2015.
Final Pretrial Conference and Order, *Ultratec, Inc., et al.* v. *Sorenson Communications, Inc., et al.*, Civil Action No. 3:14-cv-00066-JDP, United States District Court, Western District of Wisconsin, Sep. 21, 2015.
Order of Plaintiffs' Motion in Limine 16, *Ultratec, Inc., et al.* v. *Sorenson Communications, Inc., et al.*, Civil Action No. 3:14-cv-00066-JDP, United States District Court, Western District of Wisconsin, Sep. 22, 2015.
Order, *Ultratec, Inc., et al.* v. *Sorenson Communications, Inc., et al.*, Civil Action No. 3:14-cv-00066-JDP, United States District Court, Western District of Wisconsin, Oct. 6, 2015.
Special Verdict Form—Liability, *Ultratec, Inc., et al.* v. *Sorenson Communications, Inc., et al.*, Civil Action No. 3:14-cv-00066-JDP, United States District Court, Western District of Wisconsin, Oct. 6, 2015.
Judgment in a Civil Case, *Ultratec, Inc., et al.* v. *Sorenson Communications, Inc., et al.*, Civil Action No. 3:14-cv-00066-JDP, United States District Court, Western District of Wisconsin, Oct. 15, 2015.
Complaint for Patent Infringement, *Ultratec, Inc., et al.* v. *Sorenson Communications, Inc., et al.*, Civil Action No. 3:14-cv-00847-BBC, United States District Court, Western District of Wisconsin, Dec. 8, 2014.
Amended Complaint for Patent Infringement, *Ultratec, Inc., et al.* v. *Sorenson Communications, Inc., et al.*, Civil Action No. 3:14-cv-00847-BBC, United States District Court, Western District of Wisconsin, Dec. 22, 2014.
Defendants' Answer to Plaintiffs' Amended Complaint for Patent Infringement and Counterclaims, *Ultratec, Inc., et al.* v. *Sorenson Communications, Inc., et al.*, Civil Action No. 3:14-cv-00847-BBC, United States District Court, Western District of Wisconsin, Jan. 30, 2015.
Plaintiffs' Answer to Defendants Counterclaims, *Ultratec, Inc., et al.* v. *Sorenson Communications, Inc., et al.*, Civil Action No. 3:14-cv-00847-BBC, United States District Court, Western District of Wisconsin, Feb. 20, 2015.
Defendants' First Amended Answer to Plaintiffs' Amended Complaint for Patent Infringement and Counterclaims, *Ultratec, Inc., et al.* v. *Sorenson Communications, Inc., et al.*, Civil Action No. 3:14-cv-00847-BBC, United States District Court, Western District of Wisconsin, Feb. 20, 2015.
Defendants' Motion to Stay Pending Inter Partes Review, *Ultratec, Inc., et al.* v. *Sorenson Communications, Inc., et al.*, Civil Action No. 3:14-cv-00847-BBC, United States District Court, Western District of Wisconsin, Apr. 7, 2015.
Parties' Stipulation to a Temporary Stay, *Ultratec, Inc., et al.* v. *Sorenson Communications, Inc., et al.*, Civil Action No. 3:14-cv-00847-BBC, United States District Court, Western District of Wisconsin, Apr. 24, 2015.
Order Granting Defendants' Motion to Stay Pending Inter Partes Review, *Ultratec, Inc., et al.* v. *Sorenson Communications, Inc., et al.*, Civil Action No. 3:14-cv-00847-BBC, United States District Court, Western District of Wisconsin, Apr. 30, 2015.
Joint Notice of IPR Institution and Stipulation to Continue the Stay, *Ultratec, Inc., et al.* v. *Sorenson Communications, Inc., et al.*, Civil Action No. 3:14-cv-00847-BBC, United States District Court, Western District of Wisconsin, Sep. 11, 2015.
Complaint for Patent Infringement, *Ultratec, Inc., et al.* v. *Sorenson Communications, Inc., et al.*, Civil Action No. 3:15-cv-00563-JDP, United States District Court, Western District of Wisconsin, Sep. 7, 2015.
Amended Complaint for Patent Infringement, *Ultratec, Inc., et al.* v. *Sorenson Communications, Inc., et al.*, Civil Action No. 3:15-cv-00563-JDP, United States District Court, Western District of Wisconsin, Nov. 12, 2015.
Defendants' Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 11, 2015.
Defendants' Answer to Plaintiffs' Amended Complaint for Patent Infringement and Counterclaims, *Ultratec, Inc., et al.* v. *Sorenson Communications, Inc., et al.*, Civil Action No. 3:15-cv-00563-JDP, United States District Court, Western District of Wisconsin, Dec. 11, 2015.
Plaintiffs' Response to Defendants' Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 18, 2015.
Order Granting Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 22, 2015.
PCT International Search Report and Written Opinion, PCT/US2006/025236, dated Oct. 2, 2006.
PCT International Preliminary Report on Patentability, PCT/US2006/025236, dated Jan. 9, 2008.
PCT International Search Report and Written Opinion, PCT/US2009/040523, dated Nov. 4, 2009.
Australian Government IP Australia, Examiner's First Report, Application No. 2006263680, dated Jun. 29, 2009.
Applicant, Response to Jun. 29, 2009 Examiner's First Report, Application No. 2006263680, dated Jun. 17, 2010.
European Patent Office, Examination Report, Application No. 06785768.0, dated Aug. 9, 2010.
Applicant, Response to Aug. 9, 2010 Examination Report, Application No. 06785768.0, dated Dec. 20, 2010.
In the United States Patent and Trademark Office Before the Patent Trial and Appeal Board, Petition for Inter Partes Review of Claims 1-29 of U.S. Pat. No. 8,917,822, *CaptionCall LLC* v. *Ultratec Inc.*, Case IPR2015-00636, U.S. Pat. No. 8,917,822, Jan. 29, 2015, 67 pages.

(56) References Cited

OTHER PUBLICATIONS

In the United States Patent and Trademark Office Before the Patent Trial and Appeal Board, Patent Owner's Preliminary Response, *CaptionCall LLC v. Ultratec Inc.,* Case IPR2015-00636, U.S. Pat. No. 8,917,822, Jun. 9, 2015, 66 pages.
In the United States Patent and Trademark Office Before the Patent Trial and Appeal Board, Decision Instituting Review, *CaptionCall LLC v. Ultratec Inc.,* Case IPR2015-00636, U.S. Pat. No. 8,917,822, Sep. 8, 2015, 20 pages.
In the United States Patent and Trademark Office Before the Patent Trial and Appeal Board, Patent Owner Response, *CaptionCall LLC v. Ultratec Inc.,* Case IPR2015-00636, U.S. Pat. No. 8,917,822, Nov. 23, 2015, 65 pages.
In the United States Patent and Trademark Office Before the Patent Trial and Appeal Board, Patent Owner's Contingent Motion to Amend, *CaptionCall LLC v. Ultratec Inc.,* Case IPR2015-00636, U.S. Pat. No. 8,917,822, Nov. 23, 2015, 39 pages.
In the United States Patent and Trademark Office Before the Patent Trial and Appeal Board, Petitioner's Reply to Patent Owner Response, *CaptionCall LLC v. Ultratec Inc.,* Case IPR2015-00636, U.S. Pat. No. 8,917,822, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC v. Ultratec Inc.,* Case IPR2015-00636, U.S. Pat. No. 8,917,822, Jan. 26, 2016, 28 pages.
Declaration of Benedict J. Occhiogrosso, In Re: U.S. Pat. No. 8,917,822, Case IPR2015-00636, In The United States Patent and Trademark Office Before the Patent Trial and Appeal Board, Jan. 29, 2015, 65 pages.
Supplemental Declaration of Benedict J. Occhiogrosso, In Re: U.S. Pat. No. 8,917,822, Case IPR2015-00636, In The United States Patent and Trademark Office Before the Patent Trial and Appeal Board, Jan. 26, 2016, 60 pages.
Declaration of Ivan Zatkovich, In Re: U.S. Pat. No. 8,917,822, Case IPR2015-00636, In The United States Patent and Trademark Office Before the Patent Trial and Appeal Board, Nov. 23, 2015, 108 pages.
Declaration of Paul Ludwick Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 61 pages.
Declaration of Katie Kretschman, In Re: U.S. Pat. No. 8,917,822, Case IPR2015-00636, In The United States Patent and Trademark Office Before the Patent Trial and Appeal Board, Nov. 23, 2015, 5 pages.
In the United States Patent and Trademark Office Before the Patent Trial and Appeal Board, Petition for Inter Partes Review of Claims 1-30 of U.S. Pat. No. 8,908,838, *CaptionCall LLC v. Ultratec Inc.,* Case IPR2015-00637, U.S. Pat. No. 8,908,838, Jan. 29, 2015, 67 pages.
In the United States Patent and Trademark Office Before the Patent Trial and Appeal Board, Patent Owner's Preliminary Response, *CaptionCall LLC v. Ultratec Inc.,* Case IPR2015-00637, U.S. Pat. No. 8,908,838, Jun. 9, 2015, 65 pages.
In the United States Patent and Trademark Office Before the Patent Trial and Appeal Board, Decision Instituting Review, *CaptionCall LLC v. Ultratec Inc.,* Case IPR2015-00637, U.S. Pat. No. 8,908,838, Sep. 8, 2015, 25 pages.
In the United States Patent and Trademark Office Before the Patent Trial and Appeal Board, Patent Owner Response, *CaptionCall LLC v. Ultratec Inc.,* Case IPR2015-00637, U.S. Pat. No. 8,908,838, Nov. 23, 2015, 65 pages.
In the United States Patent and Trademark Office Before the Patent Trial and Appeal Board, Patent Owner's Contingent Motion to Amend, *CaptionCall LLC v. Ultratec Inc.,* Case IPR2015-00637, U.S. Pat. No. 8,908,838, Nov. 23, 2015, 38 pages.

In the United States Patent and Trademark Office Before the Patent Trial and Appeal Board, Petitioner's Reply to Patent Owner Response, *CaptionCall LLC v. Ultratec Inc.,* Case IPR2015-00637, U.S. Pat. No. 8,908,838, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC v. Ultratec Inc.,* Case IPR2015-00637, U.S. Pat. No. 8,908,838, Jan. 26, 2016, 28 pages.
Declaration of Benedict J. Occhiogrosso, In Re: U.S. Pat. No. 8,908,838, Case IPR2015-00637, In The United States Patent and Trademark Office Before the Patent Trial and Appeal Board, Jan. 29, 2015, 62 pages.
Supplemental Declaration of Benedict J. Occhiogrosso, In Re: U.S. Pat. No. 8,908,838, Case IPR2015-00637, In The United States Patent and Trademark Office Before the Patent Trial and Appeal Board, Jan. 26, 2016, 62 pages.
Declaration of Ivan Zatkovich, In Re: U.S. Pat. No. 8,908,838, Case IPR2015-00637, In The United States Patent and Trademark Office Before the Patent Trial and Appeal Board, Nov. 23, 2015, 110 pages.
Declaration of Paul Ludwick Regarding Secondary Considerations of Non-Obviousness, In Re: U.S. Pat. No. 8,908,838, Case IPR2015-00637, In The United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,908,838, Case IPR2015-00637, In The United States Patent and Trademark Office Before the Patent Trial and Appeal Board, Nov. 24, 2015, 61 pages.
Declaration of Katie Kretschman, In Re: U.S. Pat. No. 8,908,838, Case IPR2015-00637, In The United States Patent and Trademark Office Before the Patent Trial and Appeal Board, Nov. 23, 2015, 5 pages.
In the United States Patent and Trademark Office Before the Patent Trial and Appeal Board, Petition for Inter Partes Review of Claims 1-74 of U.S. Pat. No. 9,131,045, *CaptionCall LLC v. Ultratec Inc.,* Case IPR2015-01889, U.S. Pat. No. 9,131,045, Sep. 9, 2015, 66 pages.
In the United States Patent and Trademark Office Before the Patent Trial and Appeal Board, Patent Owner's Preliminary Response, *CaptionCall LLC v. Ultratec Inc.,* Case IPR2015-01889, U.S. Pat. No. 9,131,045, Dec. 18, 2015, 26 pages.
Declaration of Benedict J. Occhiogrosso, In Re: U.S. Pat. No. 9,131,045, Case IPR2015-01889, In The United States Patent and Trademark Office Before the Patent Trial and Appeal Board, Sep. 9, 2015, 63 pages.
In the United States Patent and Trademark Office Before the Patent Trial and Appeal Board, Petition for Inter Partes Review of Claims 1-18 of U.S. Pat. No. 5,974,116, *CaptionCall LLC v. Ultratec Inc.,* Case IPR2015-01355, U.S. Pat. No. 5,974,116, Jun. 8, 2015, 65 pages.
In the United States Patent and Trademark Office Before the Patent Trial and Appeal Board, Patent Owner's Preliminary Response, *CaptionCall LLC v. Ultratec Inc.,* Case IPR2015-01355, U.S. Pat. No. 5,974,116, Sep. 18, 2015, 43 pages.
In the United States Patent and Trademark Office Before the Patent Trial and Appeal Board, Decision Instituting Review, *CaptionCall LLC v. Ultratec Inc.,* Case IPR2015-01355, U.S. Pat. No. 5,974,116, Dec. 16, 2015, 34 pages.
Declaration of Benedict J. Occhiogrosso, In Re: U.S. Pat. No. 5,974,116, Case IPR2015-001355, In The United States Patent and Trademark Office Before the Patent Trial and Appeal Board, Jun. 8, 2015, 45 pages.
In the United States Patent and Trademark Office Before the Patent Trial and Appeal Board, Petition for Inter Partes Review of Claim 1 of U.S. Pat. No. 6,934,366, *CaptionCall LLC v. Ultratec Inc.,* Case IPR2015-01357, U.S. Pat. No. 6,934,366, Jun. 8, 2015, 65 pages.
In the United States Patent and Trademark Office Before the Patent Trial and Appeal Board, Patent Owner's Preliminary Response, *CaptionCall LLC v. Ultratec Inc.,* Case IPR2015-01357, U.S. Pat. No. 6,934,366, Sep. 22, 2015, 37 pages.

(56) References Cited

OTHER PUBLICATIONS

In the United States Patent and Trademark Office Before the Patent Trial and Appeal Board, Decision Instituting Review, *CaptionCall LLC v. Ultratec Inc.*, Case IPR2015-01357, U.S. Pat. No. 6,934,366, Dec. 18, 2015, 16 pages.
Declaration of Benedict J. Occhiogrosso, In Re: U.S. Pat. No. 6,934,366, Case IPR2015-001357, In The United States Patent and Trademark Office Before the Patent Trial and Appeal Board, Jun. 8, 2015, 46 pages.
In the United States Patent and Trademark Office Before the Patent Trial and Appeal Board, Petition for Inter Partes Review of Claim 1 of U.S. Pat. No. 7,006,604, *CaptionCall LLC v. Ultratec Inc.*, Case IPR2015-01358, U.S. Pat. No. 7,006,604, Jun. 8, 2015, 65 pages.
In the United States Patent and Trademark Office Before the Patent Trial and Appeal Board, Patent Owner's Preliminary Response, *CaptionCall LLC v. Ultratec Inc.*, Case IPR2015-01358, U.S. Pat. No. 7,006,604, Sep. 22, 2015, 34 pages.
In the United States Patent and Trademark Office Before the Patent Trial and Appeal Board, Decision Instituting Review, *CaptionCall LLC v. Ultratec Inc.*, Case IPR2015-01358, U.S. Pat. No. 7,006,604, Dec. 18, 2015, 12 pages.
Declaration of Benedict J. Occhiogrosso, In Re: U.S. Pat. No. 7,006,604, Case IPR2015-001358, In The United States Patent and Trademark Office Before the Patent Trial and Appeal Board, Jun. 8, 2015, 45 pages.
In the United States Patent and Trademark Office Before the Patent Trial and Appeal Board, Petition for Inter Partes Review of Claims 1-3 and 5-7 of U.S. Pat. No. 6,493,426, *CaptionCall LLC v. Ultratec Inc.*, Case IPR2015-01359, U.S. Pat. No. 6,493,426, Jun. 8, 2015, 65 pages.
In the United States Patent and Trademark Office Before the Patent Trial and Appeal Board, Patent Owner's Preliminary Response, *CaptionCall LLC v. Ultratec Inc.*, Case IPR2015-01359, U.S. Pat. No. 6,493,426, Sep. 22, 2015, 40 pages.
In the United States Patent and Trademark Office Before the Patent Trial and Appeal Board, Decision Instituting Review, *CaptionCall LLC v. Ultratec Inc.*, Case IPR2015-01359, U.S. Pat. No. 6,493,426, Dec. 18, 2015, 17 pages.
Declaration of Benedict J. Occhiogrosso, In Re: U.S. Pat. No. 6,493,426, Case IPR2015-001359, In The United States Patent and Trademark Office Before the Patent Trial and Appeal Board, Jun. 8, 2015, 47 pages.
In the United States Patent and Trademark Office Before the Patent Trial and Appeal Board, Petition for Inter Partes Review of Claims 1-4 of U.S. Pat. No. 8,515,024, *CaptionCall LLC v. Ultratec Inc.*, Case IPR2015-01885, U.S. Pat. No. 8,515,024, Sep. 8, 2015, 35 pages.
In the United States Patent and Trademark Office Before the Patent Trial and Appeal Board, Patent Owner's Preliminary Response, *CaptionCall LLC v. Ultratec Inc.*, Case IPR2015-01885, U.S. Pat. No. 8,515,024, Dec. 17, 2015, 25 pages.
Declaration of Benedict J. Occhiogrosso, In Re: U.S. Pat. No. 8,515,024, Case IPR2015-01885, In The United States Patent and Trademark Office Before the Patent Trial and Appeal Board, Sep. 8, 2015, 23 pages.
In the United States Patent and Trademark Office Before the Patent Trial and Appeal Board, Petition for Inter Partes Review of Claims 1, 3, 6, 9-11, 13, 15, 19-23, 25-27, 34, and 36-38 of U.S. Pat. No. 7,881,441, *CaptionCall LLC v. Ultratec Inc.*, Case IPR2015-01886, U.S. Pat. No. 7,881,441, Sep. 8, 2015, 61 pages.
Declaration of Benedict J. Occhiogrosso, In Re: U.S. Pat. No. 7,881,441, Case IPR2015-01886, In The United States Patent and Trademark Office Before the Patent Trial and Appeal Board, Sep. 8, 2015, 29 pages.
CaptionCall L.L.C. Petition for Inter Partes Review of Claims 1-30 of U.S. Pat. No. 8,908,838 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,908,838, Case IPR2015-00637, In The United States Patent and Trademark Office Before the Patent Trial and Appeal Board, Jan. 28, 2015, 62 pages.
CaptionCall L.L.C. Petition for Inter Partes Review of Claims 1-29 of U.S. Pat. No. 8,917,822 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,917,822, Case IPR2015-00636, In The United States Patent and Trademark Office Before the Patent Trial and Appeal Board, Jan. 28, 2015, 65 pages.
In the United States Patent and Trademark Office Before the Patent Trial and Appeal Board, Decision—Institution of Inter Partes Review, *CaptionCall LLC v. Ultratec Inc.*, Case IPR2014-00780, U.S. Pat. No. 6,603,835, Dec. 4, 2014, 14 pages.
In the United States Patent and Trademark Office Before the Patent Trial and Appeal Board, Patent Owner Response Under 37 C.F.R. 42.120, *CaptionCall LLC v. Ultratec Inc.*, Case IPR2014-00780, U.S. Pat. No. 6,603,835, Feb. 11, 2015, 68 pages.
Ultratec Inc. and Captel Inc., Amended Complaint for Patent Infringement, *Ultratec, Inc., et al. v. Sorenson Communications, Inc., et al.*, Civil Action No. 3:14-cv-847-JDP, United States District Court, Western District of Wisconsin, Dec. 23, 2014, 15 pages.
Sorenson Communications Inc. and CaptionCall LLC, Defendants' First Amended Answer to Plaintiffs' Amended Complaint for Patent Infringement and Counterclaims, Civil Action No. 3:14-cv-847-JDP, United States District Court, Western District of Wisconsin, Feb. 20, 2015, 41 pages.
In the United States Patent and Trademark Office Before the Patent Trial and Appeal Board, Final Written Decision, *CaptionCall LLC v. Ultratec Inc.*, Case IPR2014-00540, U.S. Pat. No. 6,233,314, Mar. 3, 2015, 55 pages.
In the United States Patent and Trademark Office Before the Patent Trial and Appeal Board, Final Written Decision, *CaptionCall LLC v. Ultratec Inc.*, Case IPR2014-00541, U.S. Pat. No. 5,909,482, Mar. 3, 2015, 77 pages.
In the United States Patent and Trademark Office Before the Patent Trial and Appeal Board, Final Written Decision, *CaptionCall LLC v. Ultratec Inc.*, Case IPR2014-00542, U.S. Pat. No. 7,319,740, Mar. 3, 2015, 31 pages.
In the United States Patent and Trademark Office Before the Patent Trial and Appeal Board, Final Written Decision, *CaptionCall LLC v. Ultratec Inc.*, Case IPR2014-00543, U.S. Pat. No. 7,555,104, Mar. 3, 2015, 29 pages.
In the United States Patent and Trademark Office Before the Patent Trial and Appeal Board, Final Written Decision, *CaptionCall LLC v. Ultratec Inc.*, Case IPR2014-00544, U.S. Pat. No. 8,213,578, Mar. 3, 2015, 56 pages.
In the United States Patent and Trademark Office Before the Patent Trial and Appeal Board, Final Written Decision, *CaptionCall LLC v. Ultratec Inc.*, Case IPR2014-00545, U.S. Pat. No. 6,594,346, Mar. 3, 2015, 41 pages.
In the United States Patent and Trademark Office Before the Patent Trial and Appeal Board, Final Written Decision, *CaptionCall LLC v. Ultratec Inc.*, Case IPR2014-00549, U.S. Pat. No. 6,603,835, Mar. 3, 2015, 35 pages.
In the United States Patent and Trademark Office Before the Patent Trial and Appeal Board, Final Written Decision, *CaptionCall LLC v. Ultratec Inc.*, Case IPR2014-00550, U.S. Pat. No. 7,003,082, Mar. 3, 2015, 25 pages.
United States Patent and Trademark Office, Office Action Summary and Detailed Action, U.S. Appl. No. 08/946,538 (now U.S. Pat. No. 6,075,841), dated Sep. 18, 1998.
Applicant, First Amendment (Response to Sep. 18, 1998 Office Action), U.S. Appl. No. 08/946,538 (now U.S. Pat. No. 6,075,841), dated Jan. 15, 1999.
United States Patent and Trademark Office, Office Action Summary and Detailed Action, U.S. Appl. No. 08/946,538 (now U.S. Pat. No. 6,075,841), dated Mar. 26, 1999.
Applicant, Response to Mar. 26, 1999 Office Action and Terminal Disclaimer, U.S. Appl. No. 08/946,538 (now U.S. Pat. No. 6,075,841), dated Jul. 20, 1999.

(56) References Cited

OTHER PUBLICATIONS

United States Patent and Trademark Office, Notice of Allowability and Examiner's Amendment and Statement of Reasons for Allowance, U.S. Appl. No. 08/946,538 (now U.S. Pat. No. 6,075,841), dated Aug. 16, 1999.
United States Patent and Trademark Office, Office Action Summary and Detailed Action, U.S. Appl. No. 09/034,076 (now U.S. Pat. No. 6,075,842), dated Apr. 6, 1999.
Applicant, Response to Apr. 6, 1999 Office Action and Terminal Disclaimer, U.S. Appl. No. 09/034,076 (now U.S. Pat. No. 6,075,842), dated Jul. 21, 1999.
United States Patent and Trademark Office, Notice of Allowability, U.S. Appl. No. 09/034,076 (now U.S. Pat. No. 6,075,842), dated Jan. 7, 2000.
United States Patent and Trademark Office, Notice of Allowability and Examiner's Statement of Reasons for Allowance, U.S. Appl. No. 09/108,790 (now U.S. Pat. No. 5,974,116), dated May 11, 1999.
Canadian Intellectual Property Office, Examination Report, Application No. CA 2,268,383, dated May 10, 2007.
Applicant, Response to May 10, 2007 Office Action, Application No. CA 2,268,383, dated Nov. 9, 2007.
United Kingdom Patent Office, Examination Report, Application No. GB 9908310.7 (Patent No. GB 2339363), dated Jan. 25, 2003.
Applicant, Response to United Kingdom Patent Office Jan. 25, 2003 Report, Application No. GB 9908310.7 (Patent No. GB 2339363), dated Aug. 26, 2003.
United Kingdom Patent Office, Examination Report, Application No. GB 9908310.7 (Patent No. GB 2339363), dated Sep. 23, 2003.
Applicant, Response to United Kingdom Patent Office Sep. 23, 2003 Report, Application No. GB 9908310.7 (Patent No. GB 2339363), dated Nov. 17, 2003.
United Kingdom Patent Office, Examination Report, Application No. GB 9908310.7 (Patent No. GB 2339363), dated Dec. 16, 2003.
Applicant, Response to United Kingdom Patent Office Dec. 16, 2003 Report, Application No. GB 9908310.7 (Patent No. GB 2339363), dated Dec. 30, 2003.
United States Patent and Trademark Office, Office Action Summary and Detailed Action, U.S. Appl. No. 09/572,819 (now U.S. Pat. No. 6,307,921), dated Oct. 25, 2000.
Applicant, Response (to Oct. 25, 2000 Office Action) and Terminal Disclaimers, U.S. Appl. No. 09/572,819 (now U.S. Pat. No. 6,307,921), dated Apr. 25, 2001.
United States Patent and Trademark Office, Notice of Allowability, U.S. Appl. No. 09/572,819 (now U.S. Pat. No. 6,307,921), dated Jun. 4, 2001.
United States Patent and Trademark Office, Office Action Summary and Detailed Action, U.S. Appl. No. 08/481,856 (now U.S. Pat. No. 5,809,425), dated Aug. 28, 1996.
Applicant, Amendment (Response to Aug. 18, 1996 Office Action), U.S. Appl. No. 08/481,856 (now U.S. Pat. No. 5,809,425), dated Feb. 28, 1997.
United States Patent and Trademark Office, Office Action Summary and Detailed Action, U.S. Appl. No. 08/481,856 (now U.S. Pat. No. 5,809,425), dated May 28, 1997.
Applicant, Amendment (Response to May 28, 1997 Office Action), U.S. Appl. No. 08/481,856 (now U.S. Pat. No. 5,809,425), dated Nov. 26, 1997.
United States Patent and Trademark Office, Notice of Allowance and Statement of Reasons for Allowance, U.S. Appl. No. 08/481,856 (now U.S. Pat. No. 5,809,425), dated Dec. 23, 1997.
PCT International Search Report, Application No. PCT/US96/09492, dated Sep. 4, 1996.
United States Patent and Trademark Office, Office Action Summary and Detailed Action, U.S. Appl. No. 08/367,563, dated Aug. 2, 1996.
United States Patent and Trademark Office, Office Action Summary and Detailed Action, U.S. Appl. No. 09/153,771, dated Aug. 3, 1999.
Canadian Intellectual Property Office, Examiner's Report, Application No. CA 2,458,372, dated May 16, 2011.
Intellectual Property Philippines, Official Action, Application No. PH 12007502940, dated Jun. 6, 2011.
Applicant, Response to Jun. 6, 2011 Office Action, Application No. PH 12007502940, dated Aug. 4, 2011.
UK Intellectual Property Office, Examination Report, Application No. GB 0617585.5, dated Aug. 15, 2008.
UK Intellectual Property Office, Examination Report, Application No. GB 0617585.5, dated Dec. 17, 2008.
Applicant, Response to Dec. 17, 2008 Official Letter, Application No. GB 0617585.5, dated Feb. 16, 2009.
European Patent Office, Communication, Application No. EP 04761001.9, dated Jun. 30, 2011.
Applicant, First Amendment (in Response to United States Patent and Trademark Office Nov. 8, 2012 Office Action), U.S. Appl. No. 12/686,688, dated Feb. 7, 2013.
Intellectual Property Philippines, Official Action, Application No. PH 12005502024, dated Aug. 10, 2007.
Applicant, Response to Aug. 10, 2007 Official Action, Application No. PH 12005502024, dated Oct. 3, 2007.
Intellectual Property Philippines, Official Action, Application No. PH 12005502024, dated Oct. 17, 2007.
Applicant, Response to Oct. 17, 2007 Official Action, Application No. PH 12005502024, dated Dec. 11, 2007.
United States Patent and Trademark Office, Office Action Summary and Detailed Action, U.S. Appl. No. 10/619,040 (now U.S. Pat. No. 7,006,604), dated Dec. 2, 2004.
Applicant, Response (to Dec. 2, 2004 Office Action) and Terminal Disclaimer, U.S. Appl. No. 10/619,040 (now U.S. Pat. No. 7,006,604), dated Jun. 2, 2005.
United States Patent and Trademark Office, Notice of Allowance, U.S. Appl. No. 10/619,040 (now U.S. Pat. No. 7,006,604), dated Sep. 16, 2005.
United States Patent and Trademark Office, Supplemental Notice of Allowability, Examiner's Amendment and Interview Summary, U.S. Appl. No. 10/628,193 (now U.S. Pat. No. 6,885,731), dated Jan. 31, 2005.
United States Patent and Trademark Office, Office Action Summary and Detailed Action, U.S. Appl. No. 10/634,965 (now U.S. Pat. No. 7,003,082), dated Jul. 16, 2004.
Applicant, Response (to Jul. 16, 2004 Office Action) and Terminal Disclaimer, U.S. Appl. No. 10/634,965 (now U.S. Pat. No. 7,003,082), dated Jan. 14, 2005.
United States Patent and Trademark Office, Supplemental Notice of Allowability, U.S. Appl. No. 10/634,965 (now U.S. Pat. No. 7,003,082), dated Nov. 9, 2005.
United States Patent and Trademark Office, Office Action Summary and Detailed Action, U.S. Appl. No. 11/061,682 (now U.S. Pat. No. 7,660,398), dated Apr. 1, 2008.
Applicant, Amendment (Response to Apr. 1, 2008 Office Action), U.S. Appl. No. 11/061,682 (now U.S. Pat. No. 7,660,398), dated Jul. 1, 2008.
United States Patent and Trademark Office, Office Action Summary and Detailed Action, U.S. Appl. No. 11/061,682 (now U.S. Pat. No. 7,660,398), dated Nov. 4, 2008.
Applicant, Request for Continued Examination and Interview Summary, U.S. Appl. No. 11/061,682 (now U.S. Pat. No. 7,660,398), dated Jan. 22, 2009.
United States Patent and Trademark Office, Office Action Summary and Detailed Action, U.S. Appl. No. 11/061,682 (now U.S. Pat. No. 7,660,398), dated Mar. 25, 2009.
Applicant, Amendment, U.S. Appl. No. 11/061,682 (now U.S. Pat. No. 7,660,398), dated Jun. 22, 2009.
United States Patent and Trademark Office, Notice of Allowance, U.S. Appl. No. 11/061,682 (now U.S. Pat. No. 7,660,398), dated Sep. 25, 2009.
Applicant, Request for Recalculation of Patent Term Adjustment in View of Wyeth, U.S. Pat. No. 7,660,398, (U.S. Appl. No. 11/061,682), dated Feb. 25, 2010.
United States Patent and Trademark Office, Decision on Request for Recalculation of Patent Term Adjustment in View of Wyeth and Notice of Intent to Issue Certificate of Correction, U.S. Pat. No. 7,660,398 (U.S. Appl. No. 11/061,682), dated Apr. 20, 2010.

(56) References Cited

OTHER PUBLICATIONS

United States Patent and Trademark Office, Certificate of Correction, U.S. Pat. No. 7,660,398 (U.S. Appl. No. 11/061,682), dated Nov. 30, 2010.
PCT International Search Report and Written Opinion, Application No. PCT/US2005/005149, dated May 24, 2005.
PCT International Preliminary Report on Patentability, Application No. PCT/US2005/005149, dated Aug. 31, 2006.
UK Intellectual Property Office, Examination Report, Application No. GB 0617585.5, dated Jan. 23, 2008.
Applicant, Response to Jan. 23, 2008 Official Letter, Application No. GB 0617585.5, dated Jul. 22, 2008.
UK Intellectual Property Office, Combined Search and Examination Report, Application No. GB 0617585.5, dated Aug. 15, 2008.
Applicant, Response to Aug. 15, 2008 Official Letter, Application No. GB 0617585.5, dated Dec. 9, 2008.
UK Intellectual Property Office, Combined Search and Examination Report, Application No. GB 0813502.2, dated Aug. 15, 2008.
Applicant, Response to Aug. 15, 2008 Official Letter, Application No. GB 0813502.2, dated Dec. 9, 2008.
United States Patent and Trademark Office, Office Action Summary and Detailed Action, U.S. Appl. No. 11/257,703 (now U.S. Pat. No. 7,319,740), dated May 3, 2007.
Applicant, Amendment and Terminal Disclaimers (Response to May 3, 2007 Office Action), U.S. Appl. No. 11/257,703 (now U.S. Pat. No. 7,319,740), dated Jul. 26, 2007.
United States Patent and Trademark Office, Notice of Allowance, U.S. Appl. No. 11/257,703 (now U.S. Pat. No. 7,319,740), dated Aug. 23, 2007.
United States Patent and Trademark Office, Office Action Summary and Detailed Action, U.S. Appl. No. 08/217,518 (now U.S. Pat. No. 5,724,405), dated Jul. 20, 1995.
Applicant, Amendment (Response to Jul. 20, 1995 Office Action), U.S. Appl. No. 08/217,518 (now U.S. Pat. No. 5,724,405), dated Jan. 22, 1996.
United States Patent and Trademark Office, Office Action Summary and Detailed Action, U.S. Appl. No. 08/217,518 (now U.S. Pat. No. 5,724,405), dated Apr. 16, 1996.
Applicant, Amendment (Response to Apr. 16, 1996 Office Action) and Terminal Disclaimer, U.S. Appl. No. 08/217,518 (now U.S. Pat. No. 5,724,405), dated Oct. 16, 1996.
United States Patent and Trademark Office, Office Action Summary and Detailed Action, U.S. Appl. No. 08/217,518 (now U.S. Pat. No. 5,724,405), dated Jan. 15, 1997.
Applicant, Response After Final (Response to Jan. 15, 1997 Office Action) and Terminal Disclaimer, U.S. Appl. No. 08/217,518 (now U.S. Pat. No. 5,724,405), dated Jul. 15, 1997.
United States Patent and Trademark Office, Notice of Allowability, U.S. Appl. No. 08/217,518 (now U.S. Pat. No. 5,724,405), dated Aug. 19, 1997.
United Kingdom Patent Office, Search Report, Application No. GB 9804556.0 (Patent No. GB 2335109), dated Aug. 12, 1998.
United Kingdom Patent Office, Examination Report, Application No. GB 9804556.0 (Patent No. GB 2335109), dated Sep. 27, 2002.
Applicant, Response to United Kingdom Patent Office Sep. 27, 2002 Examination Report, Application No. GB 9804556.0 (Patent No. GB 2335109), dated Mar. 26, 2003.
United States Patent and Trademark Office, Notice of Allowability, U.S. Appl. No. 08/925,558 (now U.S. Pat. No. 5,909,482), dated Oct. 27, 1998.
United Kingdom Patent Office, Examination Report, Application No. GB 9908312.3 (Patent No. GB 2334177), dated Apr. 15, 2002.
Applicant, Response to United Kingdom Patent Office Apr. 15, 2002 Examination Report, Application No. GB 9908312.3 (Patent No. GB 2334177), dated Oct. 14, 2002.
PCT International Search Report, Application No. PCT/US98/18650, dated Nov. 6, 1998.
Canadian Intellectual Property Office, Examination Report, Application No. CA 2,268,582, dated Feb. 22, 2007.
Applicant, Amendment/Remarks Following Feb. 22, 2007 Examiner's Report, Application No. CA 2,268,582, dated Aug. 22, 2007.
Cooper, R. J., Break Feature for Half-Duplex Modem, IBM Technical Disclosure Bulletin, vol. 17, No. 8, pp. 2386-2387, Jan. 1975.
Gopalakrishnan, Effective Set-Up for Performing Phone Conversations by the Hearing Impaired, IBM Technical Disclosure Bulletin, vol. 34, No. 78, pp. 423-426, 1991.
Moskowitz, Telocator Alphanumeric Protocol, Version 1.8, Feb. 4, 1997.
Smith, R. L., ASCII to Baudot, Radio Electronics, pp. 51-58, Mar. 1976.
Applicant, Response to Apr. 10, 2012 Official Action, Canadian Application No. 2,556,933, dated Jul. 12, 2012.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
United States Patent and Trademark Office, Communication, U.S. Appl. No. 12/686,688, dated Nov. 8, 2012.
In the United States Patent and Trademark Office Before the Patent Trial and Appeal Board, Petitioner's Reply to Patent Owner's Response, *CaptionCall LLC* v. *Ultratec Inc.*, Case IPR2014-00780, U.S. Pat. No. 6,603,835, Apr. 20, 2015, 30 pages.
In the United States Patent and Trademark Office Before the Patent Trial and Appeal Board, Final Written Decision, *CaptionCall LLC* v. *Ultratec Inc.*, Case IPR2014-00780, U.S. Pat. No. 6,603,835, Dec. 1, 2015, 56 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2014-00780, U.S. Pat. No. 6,603,835, Dec. 31, 2015, 20 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00540, U.S. Pat. No. 6,233,314, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00540, U.S. Pat. No. 6,233,314, Dec. 1, 2015, 18 pages.
In the United States Patent and Trademark Office Before the Patent Trial and Appeal Board, Patent Owner's Notice of Appeal, *CaptionCall LLC* v. *Ultratec Inc.*, Case IPR2013-00540, U.S. Pat. No. 6,233,314, Feb. 2, 2016, 19 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00541, U.S. Pat. No. 5,909,482, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00541, U.S. Pat. No. 5,909,482, Dec. 1, 2015, 18 pages.
In the United States Patent and Trademark Office Before the Patent Trial and Appeal Board, Patent Owner's Notice of Appeal, *CaptionCall LLC* v. *Ultratec Inc.*, Case IPR2013-00541, U.S. Pat. No. 5,909,482, Feb. 2, 2016, 19 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00542, U.S. Pat. No. 7,319,470, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00542, U.S. Pat. No. 7,319,470, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00542, U.S. Pat. No. 7,319,470, Feb. 2, 2016, 12 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00543, U.S. Pat. No. 7,555,104, Apr. 2, 2015, 19 pages.

(56) References Cited

OTHER PUBLICATIONS

In the United States Patent and Trademark Office Before the Patent Trial and Appeal Board, Decision Denying Patent Owner's Request for Rehearing, *CaptionCall LLC* v. *Ultratec Inc.,* Case IPR2013-00543, U.S. Pat. No. 7,555,104, Dec. 1, 2015, 15 pages.

In the United States Patent and Trademark Office Before the Patent Trial and Appeal Board, Patent Owner's Notice of Appeal, *CaptionCall LLC* v. *Ultratec Inc.,* Case IPR2013-00543, U.S. Pat. No. 7,555,104, Feb. 2, 2016, 11 pages.

In the United States Patent and Trademark Office Before the Patent Trial and Appeal Board, Patent Owner's Request for Rehearing by Expanded Panel, *CaptionCall LLC* v. *Ultratec Inc.,* Case IPR2013-00544, U.S. Pat. No. 8,213,578, Apr. 2, 2015, 19 pages.

In the United States Patent and Trademark Office Before the Patent Trial and Appeal Board, Decision Denying Patent Owner's Request for Rehearing, *CaptionCall LLC* v. *Ultratec Inc.,* Case IPR2013-00544, U.S. Pat. No. 8,213,578, Dec. 1, 2015, 19 pages.

In the United States Patent and Trademark Office Before the Patent Trial and Appeal Board, Patent Owner's Notice of Appeal, *CaptionCall LLC* v. *Ultratec Inc.,* Case IPR2013-00544, U.S. Pat. No. 8,213,578, Feb. 2, 2016, 11 pages.

In the United States Patent and Trademark Office Before the Patent Trial and Appeal Board, Patent Owner's Request for Rehearing by Expanded Panel, *CaptionCall LLC* v. *Ultratec Inc.,* Case IPR2013-00545, U.S. Pat. No. 6,594,346, Apr. 2, 2015, 16 pages.

In the United States Patent and Trademark Office Before the Patent Trial and Appeal Board, Decision Denying Patent Owner's Request for Rehearing, *CaptionCall LLC* v. *Ultratec Inc.,* Case IPR2013-00545, U.S. Pat. No. 6,594,346, Dec. 1, 2015, 15 pages.

In the United States Patent and Trademark Office Before the Patent Trial and Appeal Board, Patent Owner's Notice of Appeal, *CaptionCall LLC* v. *Ultratec Inc.,* Case IPR2013-00545, U.S. Pat. No. 6,594,346, Feb. 2, 2016, 11 pages.

In the United States Patent and Trademark Office Before the Patent Trial and Appeal Board, Patent Owner's Request for Rehearing by Expanded Panel, *CaptionCall LLC* v. *Ultratec Inc.,* Case IPR2013-00549, U.S. Pat. No. 6,603,835, Apr. 2, 2015, 19 pages.

In the United States Patent and Trademark Office Before the Patent Trial and Appeal Board, Decision Denying Patent Owner's Request for Rehearing, *CaptionCall LLC* v. *Ultratec Inc.,* Case IPR2013-00549, U.S. Pat. No. 6,603,835, Dec. 1, 2015, 15 pages.

In the United States Patent and Trademark Office Before the Patent Trial and Appeal Board, Patent Owner's Notice of Appeal, *CaptionCall LLC* v. *Ultratec Inc.,* Case IPR2013-00549, U.S. Pat. No. 6,603,835, Feb. 2, 2016, 11 pages.

In the United States Patent and Trademark Office Before the Patent Trial and Appeal Board, Patent Owner's Request for Rehearing by Expanded Panel, *CaptionCall LLC* v. *Ultratec Inc.,* Case IPR2013-00550, U.S. Pat. No. 7,003,082, Apr. 2, 2015, 19 pages.

In the United States Patent and Trademark Office Before the Patent Trial and Appeal Board, Decision Denying Patent Owner's Request for Rehearing, *CaptionCall LLC* v. *Ultratec Inc.,* Case IPR2013-00550, U.S. Pat. No. 7,003,082, Dec. 1, 2015, 10 pages.

In the United States Patent and Trademark Office Before the Patent Trial and Appeal Board, Patent Owner's Notice of Appeal, *CaptionCall LLC* v. *Ultratec Inc.,* Case IPR2013-00550, U.S. Pat. No. 7,003,082, Feb. 2, 2016, 11 pages.

In the United States Patent and Trademark Office Before the Patent Trial and Appeal Board, Decision Denying Institution of Inter Pules Review, *CaptionCall LLC* v. *Ultratec Inc.,* Case IPR2014-01287, U.S. Pat. No. 7,660,398, Feb. 12, 2015, 15 pages.

In the United States Patent and Trademark Office Before the Patent Trial and Appeal Board, Request for Rehearing, *CaptionCall LLC* v. *Ultratec Inc.,* Case IPR2014-01287, U.S. Pat. No. 7,660,398, Mar. 13, 2015, 18 pages.

In the United States Patent and Trademark Office Before the Patent Trial and Appeal Board, Decision Denying Request for Rehearing, *CaptionCall LLC* v. *Ultratec Inc.,* Case IPR2014-01287, U.S. Pat. No. 7,660,398, Nov. 5, 2015, 7 pages.

\* cited by examiner

SEMIAUTOMATED RELAY METHOD AND APPARATUS

CROSS-REFERENCE TO RELATED APPLICATIONS

This application is a continuation of U.S. patent application Ser. No. 14/632,257, which was filed on Feb. 26, 2015, and which is titled "SEMIAUTOMATED RELAY METHOD AND APPARATUS," which claims priority to U.S. Provisional Patent Application Ser. No. 61/946,072, filed on Feb. 28, 2014, and entitled "SEMIAUTOMATIC RELAY METHOD AND APPARATUS."

STATEMENT REGARDING FEDERALLY SPONSORED RESEARCH OR DEVELOPMENT

Not applicable.

BACKGROUND OF THE INVENTION

The present invention relates to relay systems for providing voice-to-text captioning for hearing impaired users and more specifically to a relay system that uses automated voice-to-text captioning software to transcribe voice-to-text.

Many people have at least some degree of hearing loss. For instance, in the United states, about 3 out of every 1000 people are functionally deaf and about 17 percent (36 million) of American adults report some degree of hearing loss which typically gets worse as people age. Many people with hearing loss have developed ways to cope with the ways their loss effects their ability to communicate. For instance, many deaf people have learned to use their sight to compensate for hearing loss by either communicating via sign language or by reading another person's lips as they speak.

When it comes to remotely communicating using a telephone, unfortunately, there is no way for a hearing impaired person (e.g., an assisted user (AU)) to use sight to compensate for hearing loss as conventional telephones do not enable an assisted user to see a person on the other end of the line (e.g., no lip reading or sign viewing). For persons with only partial hearing impairment, some simply turn up the volume on their telephones to try to compensate for their loss and can make do in most cases. For others with more severe hearing loss conventional telephones cannot compensate for their loss and telephone communication is a poor option.

An industry has evolved for providing communication services to assisted users whereby voice communications from a person linked to an assisted user's communication device are transcribed into text and displayed on an electronic display screen for the assisted user to read during a communication session. In many cases the assisted user's device will also broadcast the linked person's voice substantially simultaneously as the text is displayed so that an assisted user that has some ability to hear can use their hearing sense to discern most phrases and can refer to the text when some part of a communication is not understandable from what was heard.

U.S. Pat. No. 6,603,835 (hereinafter "the '835 patent) titled system for text assisted telephony teaches several different types of relay systems for providing text captioning services to assisted users. One captioning service type is referred to as a single line system where a relay is linked between an AU's device and a telephone used by the person communicating with the AU. Hereinafter, unless indicated otherwise the other person communicating with the assisted user will be referred to as a hearing user (HU) even though the AU may in fact be communicating with another assisted user. In single line systems, one line links the HU to the relay user and one line (e.g., the single line) links to the relay to the AU device. Voice from the HU is presented to a relay call assistant (CA) who transcribes the voice-to-text and then the text is transmitted to the AU device to be displayed. The HU's voice is also, in at least some cases, carried or passed through the relay to the AU device to be broadcast to the AU.

The other captioning service type described in the '835 patent is a two line system. In a two line system a hearing user's telephone is directly linked to an assisted user's device for voice communications between the AU and the HU. When captioning is required, the AU can select a captioning control button on the AU device to link to the relay and provide the HU's voice to the relay on a first line. Again, a relay CA listens to the HU voice message and transcribes the voice message into text which is transmitted back to the AU device on a second line to be displayed to the AU. One of the primary advantages of the two line system over one line systems is that the AU can add captioning to an on-going call. This is important as many AUs are only partially impaired and may only want captioning when absolutely necessary. The option to not have captioning is also important in cases where an AU device can be used as a normal telephone and where non-assisted users (e.g., a spouse that has good hearing capability) that do not need captioning may also use the AU device.

With any relay system, the primary factors for determining the value of the system are accuracy, speed and cost to provide the service. Regarding accuracy, text should accurately represent voice messages from hearing users so that an AU reading the text has an accurate understanding of the meaning of the message. Erroneous words provide inaccurate messages and also can cause confusion for an AU reading the messages.

Regarding speed, ideally text is presented to an AU simultaneously with the voice message corresponding to the text so that an AU sees text associated with a message as the message is heard. In this regard, text that trails a voice message by several seconds can cause confusion. Current systems present captioned text relatively quickly (e.g. 1-3 seconds after the voice message is broadcast) most of the time. However, at times a CA can fall behind when captioning so that longer delays (e.g., 10-15 seconds) occur.

Regarding cost, existing systems require a unique and highly trained CA for each communication session. In known cases CAs need to be able to speak clearly and need to be able to type quickly and accurately. CA jobs are also relatively high pressure jobs and therefore turnover is relatively high when compared jobs in many other industries which further increases the costs associated with operating a relay.

One innovation that has increased captioning speed appreciably and that has reduced the costs associated with captioning at least somewhat has been the use of voice-to-text transcription software by relay CAs. In this regard, early relay systems required CAs to type all of the text presented via an AU device. To present text as quickly as possible after broadcast of an associated voice message, highly skilled typists were required. During normal conversations people routinely speak at a rate between 110 to 150 words per minute. During a conversation between an AU and an HU, typically only about half the words voiced have to be transcribed (e.g., the AU typically communicates to the HU during half of a session). This means that to keep up with transcribing the HU's portion of a typical conversation a CA has to be able to type at around 55 to 75 words per minute. To this end, most professional typists type at around 50 to 80 words per minute and therefore can keep up with a normal conversation for at least some time. Professional typists are relatively expensive. In addition, despite being able to keep up with a conversation most of the time, at other times (e.g., during long conversations or during particularly high speed conversations) even professional typists fall behind transcribing real time text and more substantial delays occur.

In relay systems that use voice-to-text transcription software trained to a CA's voice, a CA listens to an HU's voice and revoices the HU's voice message to a computer running the trained software. The software, being trained to the CA's voice, transcribes the revoiced message much more quickly than a typist can type text and with only minimal errors. In many respects revoicing techniques for generating text are easier and much faster to learn than high speed typing and therefore training costs and the general costs associated with CA's are reduced appreciably. In addition, because revoicing is much faster than typing in most cases, voice-to-text transcription can be expedited appreciably using revoicing techniques.

At least some prior systems have contemplated further reducing costs associated with relay services by replacing CA's with computers running voice-to-text software to automatically convert HU voice messages to text. In the past there have been several problems with this solution which have resulted in no one implementing a workable system. First, most voice messages (e.g., an HU's voice message) delivered over most telephone lines to a relay are not suitable for direct voice-to-text transcription software. In this regard, automated transcription software on the market has been tuned to work well with a voice signal that includes a much larger spectrum of frequencies than the range used in typical phone communications. The frequency range of voice signals on phone lines is typically between 300 and 3000 Hz. Thus, automated transcription software does not work well with voice signals delivered over a telephone line and large numbers of errors occur. Accuracy further suffers where noise exists on a telephone line which is a common occurrence.

Second, most automated transcription software has to be trained to the voice of a speaker to be accurate. When a new HU calls an AU's device, there is no way for a relay to have previously trained software to the HU voice and therefore the software cannot accurately generate text using the HU voice messages.

Third, many automated transcription software packages use context in order to generate text from a voice message. To this end, the words around each word in a voice message can be used by software as context for determining which word has been uttered. To use words around a first word to identify the first word, the words around the first word have to be obtained. For this reason, many automated transcription systems wait to present transcribed text until after subsequent words in a voice message have been transcribed so that context can be used to correct prior words before presentation. Systems that hold off on presenting text to correct using subsequent context cause delay in text presentation which is inconsistent with the relay system need for real time or close to real time text delivery.

BRIEF SUMMARY OF THE INVENTION

It has been recognized that a hybrid semi-automated system can be provided where, when acceptable accuracy can be achieved using automated transcription software, the system can automatically use the transcription software to transcribe HU voice messages to text and when accuracy is unacceptable, the system can patch in a human CA to transcribe voice messages to text. Here, it is believed that the number of CAs required at a large relay facility may be reduced appreciably (e.g., 30% or more) where software can accomplish a large portion of transcription to text. In this regard, not only is the automated transcription software getting better over time, in at least some cases the software may train to an HU's voice and the vagaries associated with voice messages received over a phone line (e.g., the limited 300 to 3000 Hz range) during a first portion of a call so that during a later portion of the call accuracy is particularly good. Training may occur while and in parallel with a CA manually (e.g., via typing, revoicing, etc.) transcribing voice-to-text and, once accuracy is at an acceptable threshold level, the system may automatically delink from the CA and use the text generated by the software to drive the AU display device.

It has been recognized that in a relay system there are at least two processor that may be capable of performing automated voice recognition processes and therefore that can handle the automated voice recognition part of a triage process involving a call assistant. To this end, in most cases either a relay processor or an assisted user's device processor may be able to perform the automated transcription portion of a hybrid process. For instance, in some cases an assisted user's device will perform automated transcription in parallel with a relay assistant generating call assistant generated text where the relay and assisted user's device cooperate provide text and assess when the call assistant should be cut out of a call with the automated text replacing the call assistant generated text.

In other cases where a hearing user's communication device is a computer or includes a processor capable of transcribing voice messages to text, a hearing user's device may generated automated text in parallel with a call assistant generating text and the hearing user's device and the relay may cooperate to provide text and determine when the call assistant should be cut out of the call.

Regardless of which device is performing automated captioning, the call assistant generated text may be used to assess accuracy of the automated text for the purpose of determining when the call assistant should be cut out of the call. In addition, regardless of which device is performing automated text captioning, the call assistant generated text may be used to train the automated voice-to-text software or engine on the fly to expedite the process of increasing accuracy until the call assistant can be cut out of the call.

It has also been recognized that there are times when a hearing impaired person is listening to a hearing user's voice without an assisted user's device providing simultaneous text when the hearing user is confused and would like transcription of recent voice messages of the hearing user. For instance, where an assisted user uses an assisted user's device to carry on a non-captioned call and the assisted user has difficulty understanding a voice message so that the assisted user initiates a captioning service to obtain text for subsequent voice messages. Here, while text is provided for subsequent messages, the assisted user still cannot obtain an understanding of the voice message that prompted initiation of captioning. As another instance, where call assistant generated text lags appreciably behind a current hearing user's voice message an assisted user may request that the captioning catch up to the current message.

To provide captioning of recent voice messages in these cases, in at least some embodiments of this disclosure an assisted user's device stores a hearing user's voice messages and, when captioning is initiated or a catch up request is received, the recorded voice messages are used to either automatically generate text or to have a call assistant generate text corresponding to the recorded voice messages.

In at least some cases when automated software is trained to a hearing user's voice, a voice model for the hearing user that can be used subsequently to tune automated software to transcribe the hearing user's voice may be stored along with a voice profile for the hearing user that can be used to distinguish the hearing user's voice from other hearing users. Thereafter, when the hearing user calls an assisted user's device again, the profile can be used to indentify the hearing user and the voice model can be used to tune the software so that the automated software can immediately start generating highly accurate or at least relatively more accurate text corresponding to the hearing user's voice messages.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
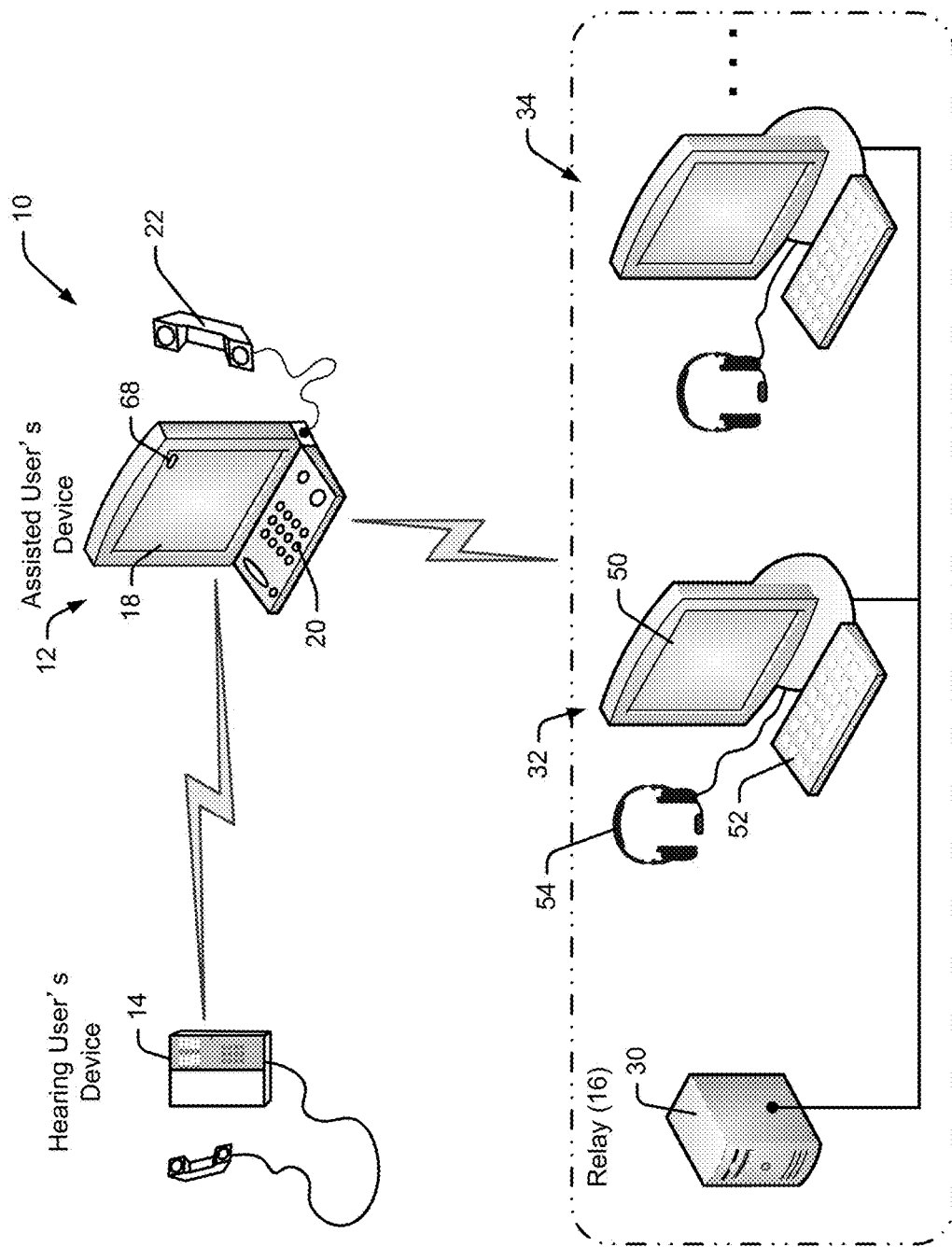
FIG. 1 is a schematic showing various components of a communication system including a relay that may be used to perform various processes and methods according to at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary communication system 10 including an assisted user's communication device 12, a hearing user's telephone or other type communication device 14, and a relay 16. The AU's device 12 is linked to the hearing user's device 14 via any network connection capable of facilitating a voice call between an the AU and the HU. For instance, the link may be a conventional telephone line, a network connection such as an internet connection or other network, a wireless connection, etc. AU device 12 includes a keyboard 20, a display screen 18 and a handset 22. Keyboard 20 can be used to dial any telephone number to initiate a call and, in at least some cases, includes other keys or may be controlled to present virtual buttons via screen 28 for controlling various functions that will be described in greater detail below. Other identifiers such as IP addresses or the like may also be used in at least some cases to initiate a call. Screen 18 includes a flat panel display screen for displaying, among other things, text transcribed from a voice message generated using HU's device 14, control icons or buttons, caption feedback signals, etc. Handset 22 includes a speaker for broadcasting a hearing user's voice messages to an assisted user and a microphone for receiving a voice message from an assisted user for delivery to the hearing user's device 14. Assisted user device 12 may also include a second loud speaker so that device 12 can operate as a speaker phone type device. Although not shown, device 12 further includes a processor and a memory for storing software run by the processor to perform various functions that are consistent with at least some aspects of the present disclosure. Device 12 is also linked or is linkable to relay 16 via any communication network including a phone network, a wireless network, the internet or some other similar network, etc.

Hearing user's device 14 includes a communication device (e.g., a telephone) including a keyboard for dialing phone numbers and a handset including a speaker and a microphone for communication with other devices. In other embodiments device 14 may include a computer, a smart phone, a smart tablet, etc., that can facilitate audio communications with other devices. Devices 12 and 14 may use any of several different communication protocols including analog or digital protocols, a VOIP protocol or others.

Referring still to FIG. 1, relay 16 includes, among other things, a relay server 30 and a plurality of call assistant work stations 32, 34, etc. Each of the call assistant work stations 32, 34, etc., is similar and operates in a similar fashion and therefore only station 32 is described here in any detail. Station 32 includes a display screen 50, a keyboard 52 and a headphone/microphone headset 54. Screen 50 may be any type of electronic display screen for presenting information including text transcribed from a hearing user's voice signal or message. In most cases screen 50 will present a graphical user interface with on screen tools for editing text that appears on the screen. One text editing system is described in U.S. Pat. No. 7,164,753 which issued on Jan. 16, 2007 which is titled "Real Time Transcription Correction System" and which is incorporated herein in its entirety.

Keyboard 52 is a standard text entry QUERTY type keyboard and can be use to type text or to correct text presented on displays screen 50. Headset 54 includes a speaker in an ear piece and a microphone in a mouth piece and is worn by a call assistant. The headset enables a call assistant to listen to the voice of a hearing user and the microphone enables the call assistant to speak voice messages into the relay system such as, for instance, revoiced messages from a hearing user to be transcribed into text. For instance, typically during a call between a hearing user on device 14 and an assisted user on device 12, the hearing user's voice messages are presented to a call assistant via headset 54 and the call assistant revoices the messages into the relay system using headset 54. Software trained to the voice of the call assistant transcribes the assistant's voice messages into text which is presented on display screen 52. The call assistant then uses keyboard 52 and/or headset 54 to make corrections to the text on display 50. The corrected text is then transmitted to the assisted user's device 12 for display on screen 18. In the alternative, the text may be transmitted prior to correction to the assisted user's device 12 for display and corrections may be subsequently transmitted to correct the displayed text via in-line corrections where errors are replaced by corrected text.

Although not shown, call assistant work station 32 may also include a foot pedal or other device for controlling the speed with which voice messages are played via headset 54 so that the call assistant can slow or even stop play of the messages while the assistant either catches up on transcription or correction of text.

Figure 2:
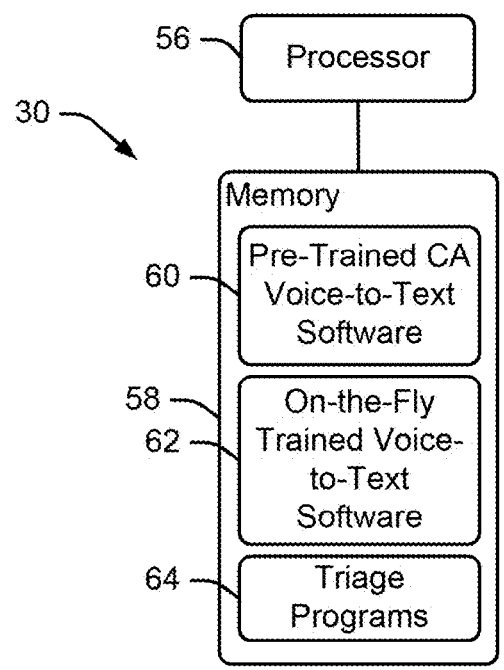
FIG. 2 is a schematic of the relay server shown in FIG. 1.

Referring still to FIG. 1 and also to FIG. 2, server 30 is a computer system that includes, among other components, at least a first processor 56 linked to a memory or database 58 where software run by server 56 to facilitate various functions that are consistent with at least some aspects of the present disclosure is stored. The software stored in memory 58 includes pre-trained call assistant voice-to-text transcription software 60 for each call assistant where call assistant specific software is trained to the voice of an associated call assistant thereby increasing the accuracy of transcription activities. For instance, Naturally Speaking continuous speech recognition software by Dragon, Inc. may be pre-trained to the voice of a specific call assistant and then used to transcribe voice messages voiced by the call assistant into text.

In addition to the call assistant trained software, a voice-to-text software program 62 that is not pre-trained to a CA's voice and instead that trains to any voice on the fly as voice messages are received is stored in memory 58. Again, Naturally Speaking software that can train on the fly may be used for this purpose.

Moreover, software 64 that automatically performs one of several different types of triage processes to generate text from voice messages accurately, quickly and in a relatively cost effective manner is stored in memory 58. The triage programs are described in detail hereafter.

One issue with existing relay systems is that each call is relatively expensive to facilitate. To this end, in order to meet required accuracy standards for text caption calls, each call requires a dedicated call assistant. While automated voice-to-text systems that would not require a call assistant have been contemplated, none has been implemented because of accuracy and speed problems.

One aspect of the present disclosure is related to a system that is semi-automated wherein a call assistant is used when accuracy of an automated system is not at required levels and the assistant is cut out of a call automatically or manually when accuracy of the automated system meets or exceeds accuracy standards. For instance, in at least some cases a call assistant will be assigned to every new call linked to a relay and the call assistant will transcribe voice-to-text as in an existing system. Here, however, the difference will be that, during the call, the voice of a hearing user will also be processed by server 30 to automatically transcribe the hearing user's voice messages to text (e.g., into "automated text"). Server 30 compares corrected text generated by the call assistant to the automated text to identify errors in the automated text. Server 30 uses identified errors to train the automated voice-to-text software to the voice of the hearing user. During the beginning of the call the software trains to the hearing user's voice and accuracy increases over time as the software trains. At some point the accuracy increases until required accuracy standards are met. Once accuracy standards are met, server 30 is programmed to automatically cut out the call assistant and start transmitting the automated text to the assisted user's device 12.

In at least some cases, when a call assistant is cut out of a call, the system may provide a "Help" or an "Assist" or "Assistance Request" type button (see 68 in FIG. 1) to an assisted user so that, if the assisted user recognizes that the automated text has too many errors for some reason, the assisted user can request a link to a call assistant to increase transcription accuracy (e.g., generated an assistance request). In some cases the help button may be a persistent mechanical button on the assisted user's device 12. In the alternative the help button may be a virtual on screen icon (e.g., see 68 in FIG. 1) and screen 18 may be a touch sensitive screen so that contact with the virtual button can be sensed. Where the help button is virtual, the button may only be presented after the system switches from providing call assistant generated text to an assisted user's device to providing automated text to the assisted user's device to avoid confusion (e.g., avoid a case where an assisted user is already receiving call assistant generated text but thinks, because of a help button, that even better accuracy can be achieved in some fashion). Thus, while call assistant generated text is displayed on an assisted user's device 12, no "help" button is presented and after automated text is presented, the "help" button is presented. After the help button is selected and a call assistant is re-linked to the call, the help button is again removed from the assisted user's device display 18 to avoid confusion.

Figure 3:
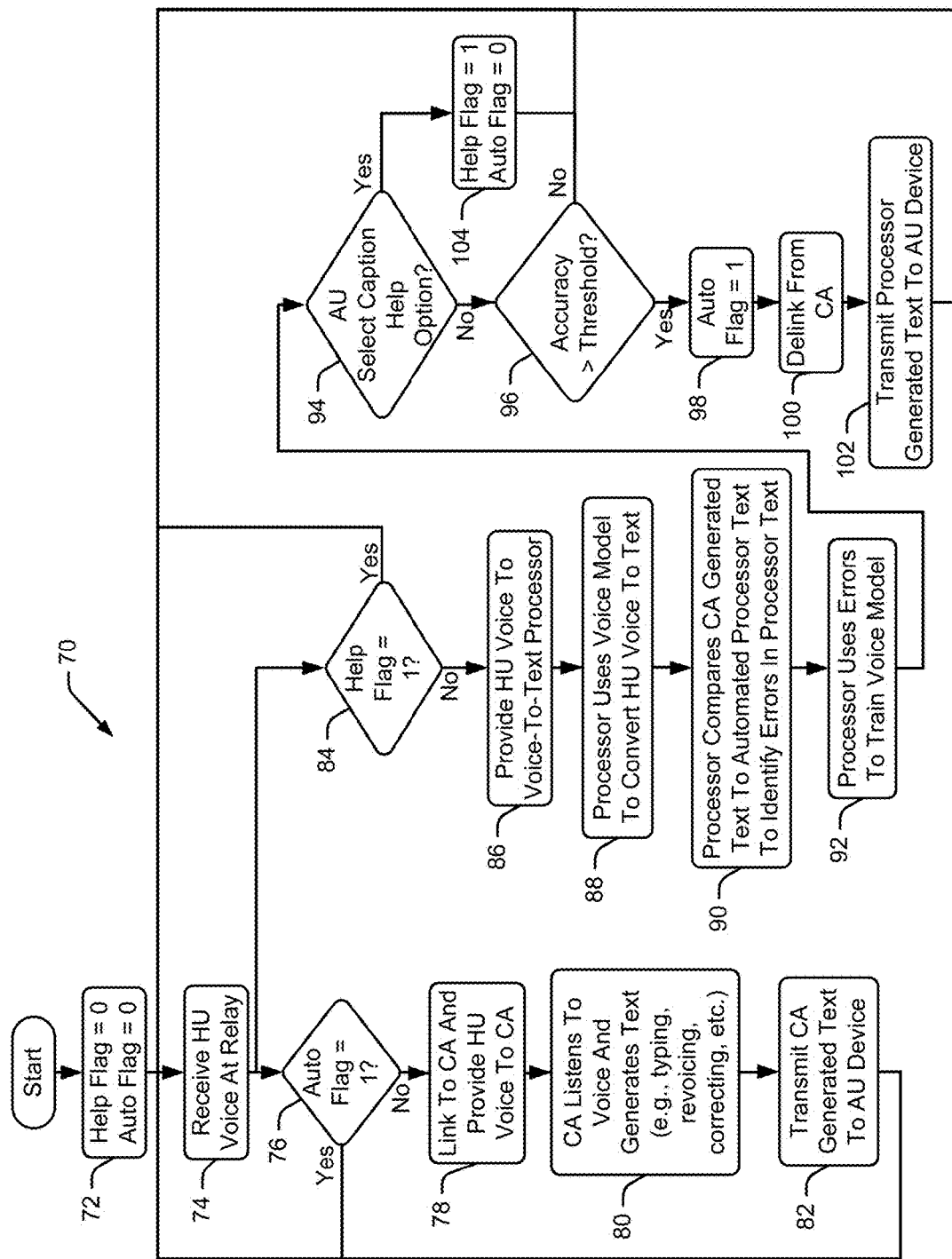
FIG. 3 is a flow chart showing a process whereby an automated voice-to-text engine is used to generate automated text in parallel with a call assistant generating text where the automated text is used instead of call assistant generated text to provide captioning an assisted user's device once an accuracy threshold has been exceeded.

Referring now to FIGS. 2 and 3, a method or process 70 is illustrated that may be performed by server 30 to cut out a call assistant when automated text reaches an accuracy level that meets a standard threshold level. Referring also to FIG. 1, at block 72, help and auto flags are each set to a zero value. The help flag indicates that an assisted user has selected a help or assist button via the assisted user's device 12 because of a perception that too many errors are occurring in transcribed text. The auto flag indicates that automated text accuracy has exceeded a standard threshold requirement. Zero values indicate that the help button has not been selected and that the standard requirement has yet to be met and one values indicate that the button has been selected and that the standard requirement has been met.

Referring still to FIGS. 1 and 2, at block 74, during a phone call between a hearing user using device 14 and an assisted user using device 12, the hearing user's voice messages are transmitted to server 30 at relay 16. Upon receiving the hearing user's voice messages, server 30 checks the auto and help flags at blocks 76 and 84, respectively. At least initially the auto flag will be set to zero at block 76 meaning that automated text has not reached the accuracy standard requirement and therefore control passes down to block 78 where the hearing user's voice messages are provided to a call assistant. At block 80 the call assistant listens to the hearing user's voice messages and generates text corresponding thereto by either typing the messages, revoicing the messages to voice-to-text transcription software trained to the call assistant's voice or a combination of both. Text generated is presented on screen 50 and the call assistant makes corrections to the text using keyboard 52 and/or headset 54 at block 80. At block 82 the call assistant generated text is transmitted to assisted user device 12 to be displayed for the assisted user on screen 18.

Referring again to FIGS. 1 and 2, at block 84, at least initially the help flag will be set to zero indicating that the assisted user has not requested additional captioning assistance. In fact, at least initially the "help" button 68 may not be presented to an assisted user as call assistant generated text is initially presented. Where the help flag is zero at block 84, control passes to block 86 where the hearing user's voice messages are fed to voice-to-text software run by server 30 that has not been previously trained to any particular voice. At block 88 the software automatically converts the hearing user's voice-to-text generating automated text. At block 90 server 30 compares the call assistant generated text to the automated text to identify errors in the automated text. At block 92 server 30 uses the errors to train the voice-to-text software for the hearing user's voice. In this regard, for instance, where an error is identified, server 30 modifies the software so that the next time the utterance that resulted in the error occurs, the software will generate the word or words that the call assistant generated for the utterance. Other ways of altering or training the voice-to-text software are well known in the art and any way of training the software may be used at block 92.

After block 92 control passes to block 94 where server 30 monitors for a selection of the "help" button 68 by the assisted user. If the help button has not been selected, control passes to block 96 where server 30 compares the accuracy of the automated text to a threshold standard accuracy requirement. For instance, the standard requirement may require that accuracy be great than 96% measured over at least a most recent forty-five second period or a most recent 100 words uttered by a hearing user, whichever is longer. Where accuracy is below the threshold requirement, control passes back up to block 74 where the process described above continues. At block 96, once the accuracy is greater than the threshold requirement, control passes to block 98 where the auto flag is set to one indicating that the system should start using the automated text and delink the call assistant from the call to free up the assistant to handle a different call. A virtual "help" button may also be presented via the assisted user's display 18 at this time. Next, at block 100, the call assistant is delinked from the call and at block 102 the processor generated automated text is transmitted to the AU device to be presented on display screen 18.

Referring again to block 74, the hearing user's voice is continually received during a call and at block 76, once the auto flag has been set to one, the lower portion of the left hand loop including blocks 78, 80 and 82 is cut out of the process as control loops back up to block 74.

Referring again to Block 94, if, during an automated portion of a call when automated text is being presented to the assisted user, the assisted user decides that there are too many errors in the transcription presented via display 18 and the assisted user selects the "help" button 68 (see again FIG. 1), control passes to block 104 where the help flag is set to one indicating that the assisted user has requested the assistance of a call assistant and the auto flag is reset to zero indicating that call assistant generated text will be used to drive the assisted user's display 18 instead of the automated text. Thereafter control passes back up to block 74. Again, at block 76, with the auto flag set to zero the next time through decision block 76, control passes back down to block 78 where the call is again linked to a call assistant for transcription as described above. In addition, the next time through block 84, because the help flag is set to one, control passes back up to block 74 and the automated text loop including blocks 86 through 104 is effectively cut out of the rest of the call.

In at least some embodiments, there will be a short delay (e.g., 5 to 10 seconds in most cases) between setting the flags at block 104 and stopping use of the automated text so that a new call assistant can be linked up to the call and start generating call assistant generated text prior to halting the automated text. In these cases, until the call assistant is linked and generating text for at least a few seconds (e.g., 3 seconds), the automated text will still be used to drive the assisted user's display 18. The delay may either be a pre-defined delay or may have a case specific duration that is determined by server 30 monitoring call assistant generated text and switching over to the call assistant generated text once the call assistant is up to speed.

In some embodiments, prior to delinking a call assistant from a call at block 100, server 30 may store a call assistant identifier along with a call identifier for the call. Thereafter, if an assisted user requests help at block 94, server 30 may be programmed to identify if the call assistant previously associated with the call is available (e.g. not handling another call) and, if so, may re-link to the call assistant at block 78. In this manner, if possible, a call assistant that has at least some context for the call can be linked up to restart transcription services.

In some embodiments it is contemplated that after an assisted user has selected a help button to receive call assistance, the call will be completed with a call assistant on the line. In other cases it is contemplated that server 30 may, when a call assistant is re-linked to a call, start a second triage process to attempt to delink the call assistant a second time if a threshold accuracy level is again achieved. For instance, in some cases, midstream during a call, a second hearing user may start communicating with the assisted user via the hearing user's device. For instance, a child may yield the hearing user's device 14 to a grandchild that has a different voice profile causing the assisted user to request help from a call assistant because of perceived text errors. Here, after the hand back to the call assistant, server 30 may start training on the grandchild's voice and may eventually achieve the threshold level required. Once the threshold again occurs, the call assistant may be delinked a second time so that automated text is again fed to the assisted user's device.

As another example text errors in automated text may be caused by temporary noise in one or more of the lines carrying the hearing user's voice messages to relay 16. Here, once the noise clears up, automated text may again be a suitable option. Thus, here, after an assisted user requests call assistant help, the triage process may again commence and if the threshold accuracy level is again exceeded, the call assistant may be delinked and the automated text may again be used to drive the assisted user's device 12. While the threshold accuracy level may be the same each time through the triage process, in at least some embodiments the accuracy level may be changed each time through the process. For instance, the first time through the triage process the accuracy threshold may be 96%. The second time through the triage process the accuracy threshold may be raised to 98%.

In at least some embodiments, when the automated text accuracy exceeds the standard accuracy threshold, there may be a short transition time during which a call assistant on a call observes automated text while listening to a hearing user's voice message to manually confirm that the handover from call assistant generated text to automated text is smooth. During this short transition time, for instance, the call assistant may watch the automated text on her workstation screen 50 and may correct any errors that occur during the transition. In at least some cases, if the call assistant perceives that the handoff does not work or the quality of the automated text is poor for some reason, the call assistant may opt to retake control of the transcription process.

Figure 4:
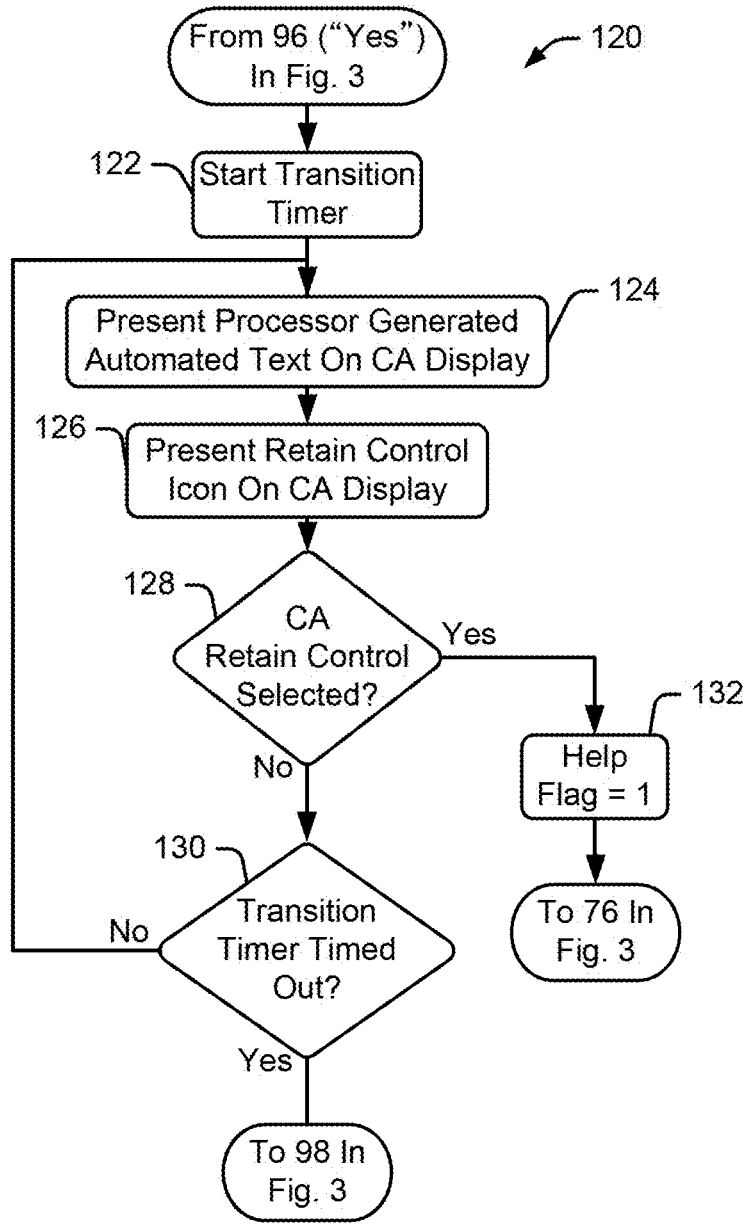
FIG. 4 is a sub-process that maybe substituted for a portion of the process shown in FIG. 3 whereby a control assistant can determine whether or not the automated text takes over the process after the accuracy threshold has been achieved.

One sub-process 120 that may be added to the process shown in FIG. 3 for managing a call assistant to automated text handoff is illustrated in FIG. 4. Referring also to FIGS. 1 and 2, at block 96 in FIG. 3, if the accuracy of the automated text exceeds the accuracy standard threshold level, control may pass to block 122 in FIG. 4. At block 122, a short duration transition timer (e.g. 10-15 seconds) is started. At block 124 automated text (e.g., text generated by feeding the hearing user's voice messages directly to voice-to-text software) is presented on the call assistant's display 50. At block 126 an on screen a "Retain Control" icon or virtual button is provided to the call assistant via the assistant's display screen 50 which can be selected by the call assistant to forego the handoff to the automated voice-to-text software. At block 128, if the "Retain Control" icon is selected, control passes to block 132 where the help flag is set to one and then control passes back up to block 76 in FIG. 3 where the call assistant process for generating text continues as described above. At block 128, if the call assistant does not select the "Retain Control" icon, control passes to block 130 where the transition timer is checked. If the transition timer has not timed out control passes back up to block 124. Once the timer times out at block 130, control passes back to block 98 in FIG. 3 where the auto flag is set to one and the call assistant is delinked from the call.

In at least some embodiments it is contemplated that after voice-to-text software takes over the transcription task and the call assistant is delinked from a call, server 30 itself may be programmed to sense when transcription accuracy has degraded substantially and the server 30 may cause a re-link to a call assistant to increase accuracy of the text transcription. For instance, server 30 may assign a confidence factor to each word in the automated text based on how confident the server is that the word has been accurately transcribed. The confidence factors over a most recent number of words (e.g., 100) or a most recent period (e.g., 45 seconds) may be averaged and the average used to assess an overall confidence factor for transcription accuracy. Where the confidence factor is below a threshold level, server 30 may re-link to a call assistant to increase transcription accuracy. The automated process for re-linking to a call assistant may be used instead of or in addition to the process described above whereby an assisted user selects the "help" button to re-link to a call assistant.

In at least some cases when an assisted user selects a "help" button to re-link to a call assistant, partial call assistance may be provided instead of full call assistant service. For instance, instead of adding a call assistant that transcribes a hearing user's voice messages and then corrects errors, a call assistant may be linked only for correction purposes. The idea here is that while software trained to a hearing user's voice may generate some errors, the number of errors after training will still be relatively small in most cases even if objectionable to an assisted user. In at least some cases call assistants may be trained to have different skill sets where highly skilled and relatively more expensive to retain call assistants are trained to re-voice hearing user voice messages and correct the resulting text and less skilled call assistants are trained to simply make corrections to automated text. Here, initially all calls may be routed to highly skilled revoicing or "transcribing" call assistants and all re-linked calls may be routed to less skilled "corrector" call assistants.

Figure 5:
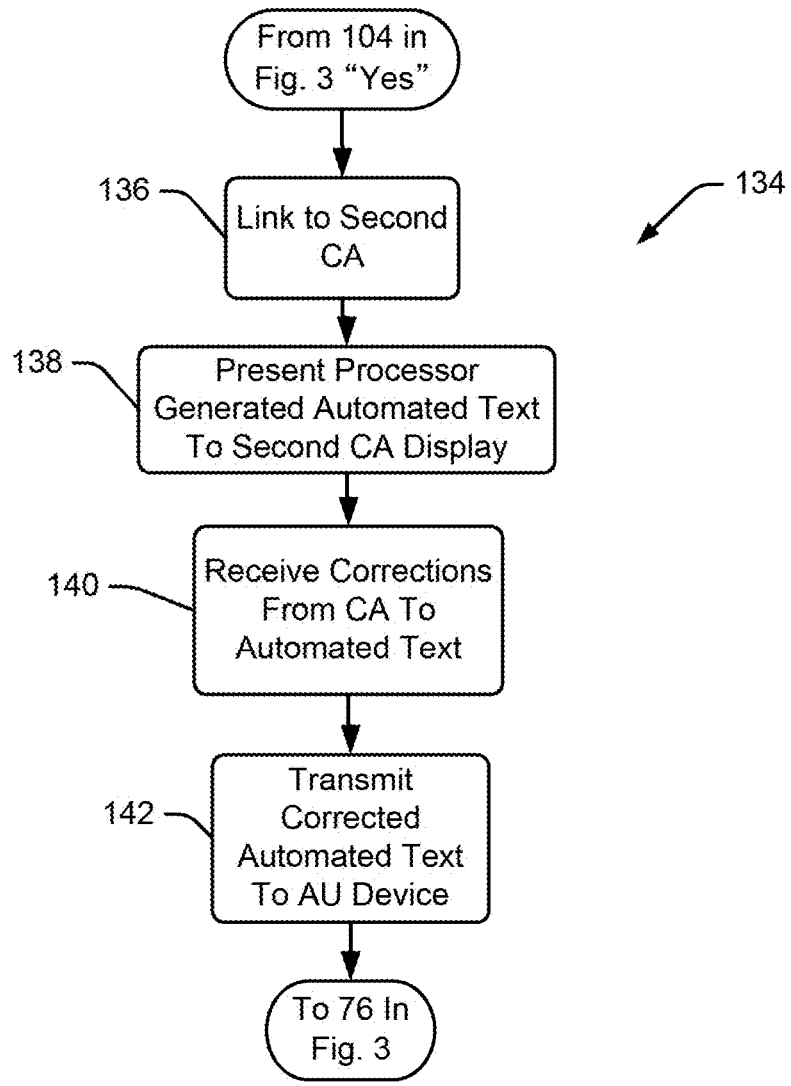
FIG. 5 is a sub-process that may be added to the process shown in FIG. 3 wherein, upon an assisted user's requesting help, a call is linked to a second call assistant for correcting the automated text.

A sub-process 134 that may be added to the process of FIG. 3 for routing re-linked calls to a corrector call assistant is shown in FIG. 5. Referring also to FIGS. 1 and 3, at decision block 94, if an assisted user selects the help button, control may pass to block 136 in FIG. 3 where the call is linked to a second corrector call assistant. At block 138 the automated text is presented to the second call assistant via the call assistant's display 50. At block 140 the second call assistant listens to the voice of the hearing user and observes the automated text and makes corrections to errors perceived in the text. At block 142 server 30 transmits the corrected automated text to the assisted user's device for display via screen 18. After block 142 control passes back up to block 76 in FIG. 2.

In some cases where a call assistant generates text that drives an assisted user's display screen 18 (see again FIG. 1), for one reason or another the call assistant's transcription to text may fall behind the hearing user's voice message stream by a substantial amount. For instance, where a hearing user is speaking quickly, is using odd vocabulary, and/or has an unusual accent that is hard to understand, call assistant transcription may fall behind a voice message stream by 20 seconds, 40 seconds or more.

In many cases when captioning falls behind, an assisted user can perceive that presented text has fallen far behind broadcast voice messages from a hearing user based on memory of recently broadcast voice message content and observed text. For instance, an assisted user may recognize that currently displayed text corresponds to a portion of the broadcast voice message that occurred thirty seconds ago. In other cases some captioning delay indicator may be presented via an assisted user's device display 18. For instance, see FIG. 17 where captioning delay is indicated in two different ways on a display screen 18. First, text 212 indicates an estimated delay in seconds (e.g., 24 second delay). Second, at the end of already transcribed text 214, blanks 216 for words already voiced but yet to be transcribed may be presented to give an assisted user a sense of how delayed the captioning process has become.

When an assisted user perceives that captioning is too far behind or when the user cannot understand a recently broadcast voice message, the assisted user may want the text captioning to skip ahead to the currently broadcast voice message. For instance, if an assisted user had difficulty hearing the most recent five seconds of a hearing user's voice message and continues to have difficulty hearing but generally understood the preceding 25 seconds, the assisted user may want the captioning process to be re-synced with the current hearing user's voice message so that the assisted user's understanding of current words is accurate.

Here, however, because the assisted user could not understand the most recent 5 seconds of broadcast voice message, a re-sync with the current voice message would leave the assisted user with at least some void in understanding the conversation (e.g., at least 5 the most recent 5 seconds of misunderstood voice message would be lost). To deal with this issue, in at least some embodiments, it is contemplated that server 30 may run automated voice-to-text software on a hearing user's voice message simultaneously with a call assistant generating text from the voice message and, when an assisted user requests a "catch-up" or "re-sync" of the transcription process to the current voice message, server 30 may provide "fill in" automated text corresponding to the portion of the voice message between the most recent call assistant generated text and the instantaneous voice message which may be provided to the assisted user's device for display and also, optionally, to the call assistant's display screen to maintain context for the call assistant. In this case, while the fill in automated text may have some errors, the fill in text will be better than no text for the associated period and can be referred to by the assisted user to better understand the voice messages.

In cases where the fill in text is presented on the call assistant's display screen, the call assistant may correct any errors in the fill in text. This correction and any error correction by a call assistant for that matter may be made prior to transmitting text to the assisted user's device or subsequent thereto. Where corrected text is transmitted to an assisted user's device subsequent to transmission of the original error prone text, the assisted user's device corrects the errors by replacing the erroneous text with the corrected text.

Because it is often the case that assisted users will request a re-sync only when they have difficulty understanding words, server 30 may only present automated fill in text to an assisted user corresponding to a pre-defined duration period (e.g., 8 seconds) that precedes the time when the re-sync request occurs. For instance, consistent with the example above where call assistant captioning falls behind by thirty seconds, an assisted user may only request re-sync at the end of the most recent five seconds as inability to understand the voice message may only be an issue during those five seconds. By presenting the most recent eight seconds of automated text to the assisted user, the user will have the chance to read text corresponding to the misunderstood voice message without being inundated with a large segment of automated text to view. Where automated fill in text is provided to an assisted user for only a pre-defined duration period, the same text may be provided for correction to the call assistant.

Figure 6:
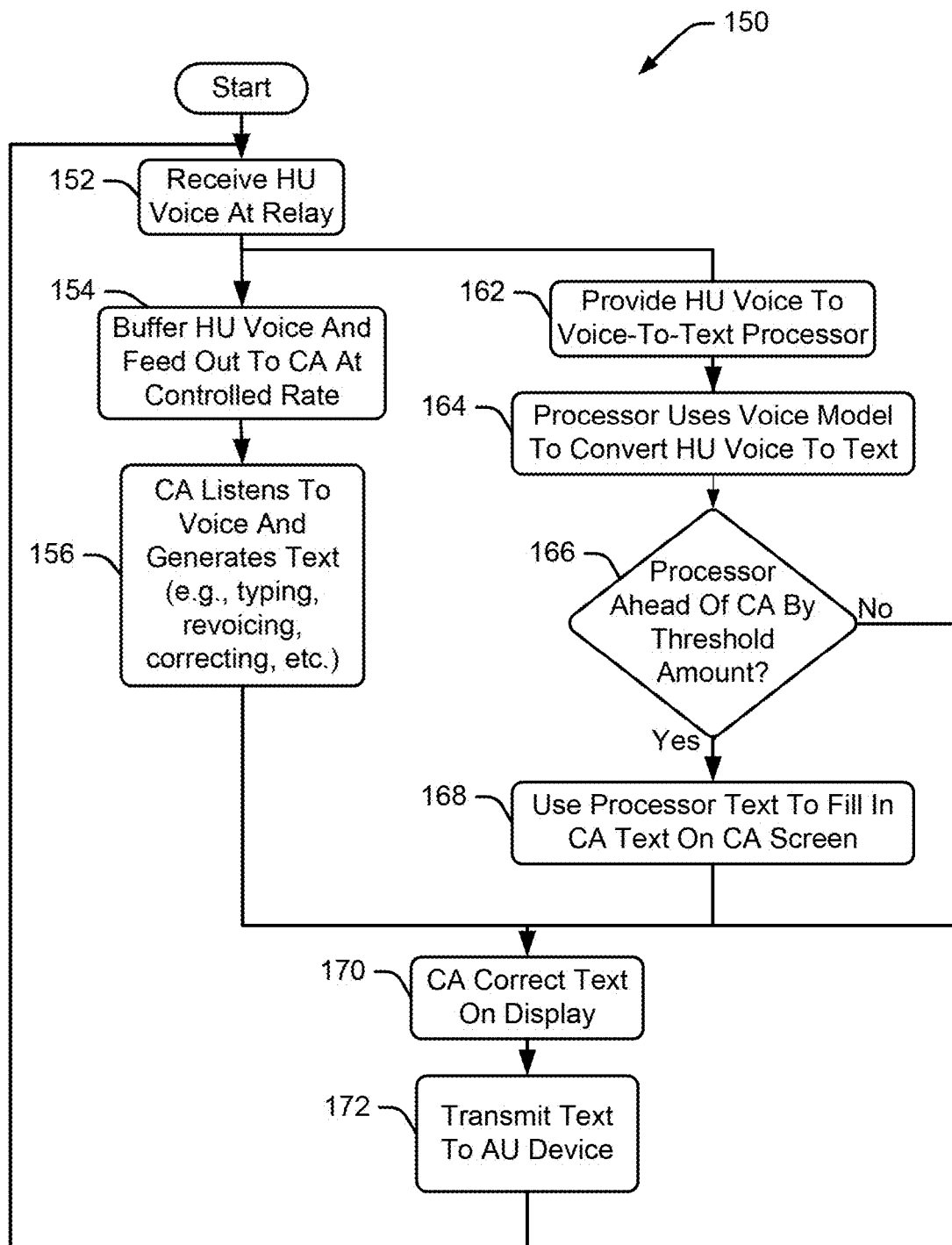
FIG. 6 is a process whereby an automated voice-to-text engine is used to fill in text for a hearing user's voice messages that are skipped over by a call assistant when an assisted user requests instantaneous captioning of a current message.

Referring now to FIG. 6, a method 190 by which an assisted user requests a re-sync of the transcription process to current voice messages when call assistant generated text falls behind current voice messages is illustrated. Referring also to FIG. 1, at block 192 a hearing user's voice messages are received at relay 16. After block 192, control passes down to each of blocks 194 and 200 where two simultaneous sub-processes occur in parallel. At block 194, the hearing user's voice messages are stored in a rolling buffer. The rolling buffer may, for instance, have a two minute duration so that the most recent two minutes of a hearing user's voice messages are always stored. At block 196, a call assistant listens to the hearing user's voice message and transcribes text corresponding to the messages via re-voicing to software trained to the call assistant's voice, typing, etc. At block 198 the call assistant generated text is transmitted to assisted user's device 12 to be presented on display screen 18 after which control passes back up to block 192. Text correction may occur at block 196 or after block 198.

Referring again to FIG. 6, at process block 200, the hearing user's voice is fed directly to voice-to-text software run by server 30 which generates automated text at block 202. Although not shown in FIG. 5, after block 202, server 30 may compare the automated text to the call assistant generated text to identify errors and may use those errors to train the software to the hearing user's voice so that the automated text continues to get more accurate as a call proceeds.

Figure 17:
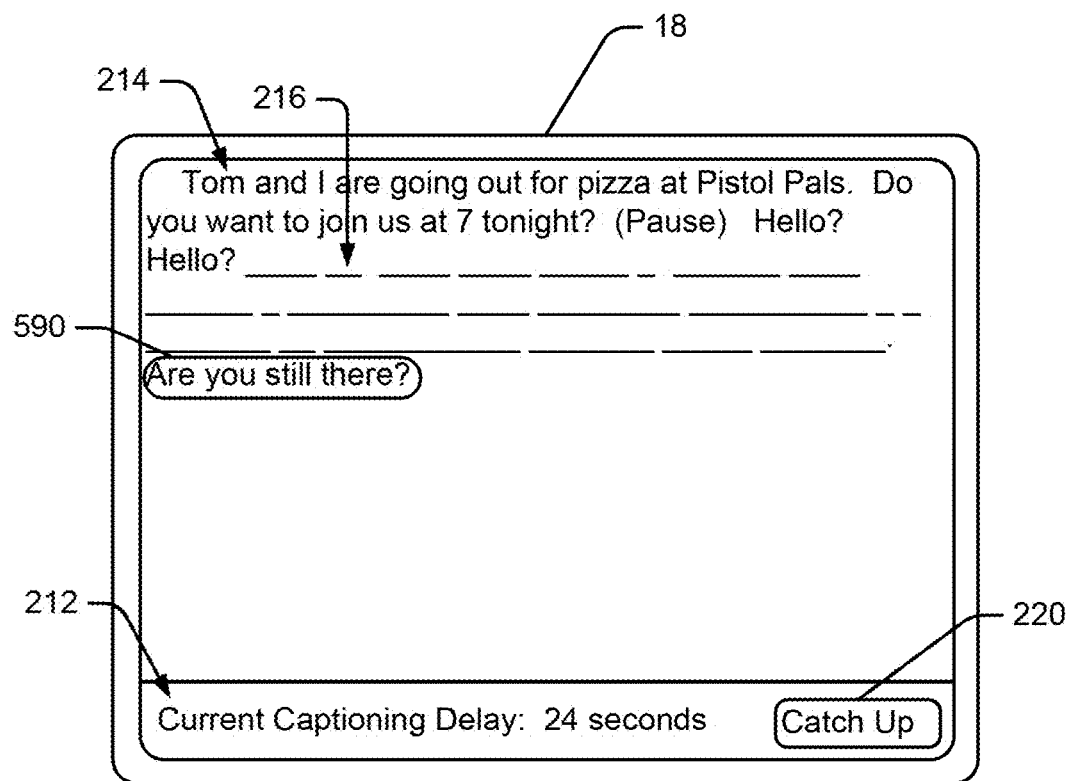
FIG. 17 is a schematic illustrating a screen shot that may be presented via an assisted user's device display screen.
Figure 18:
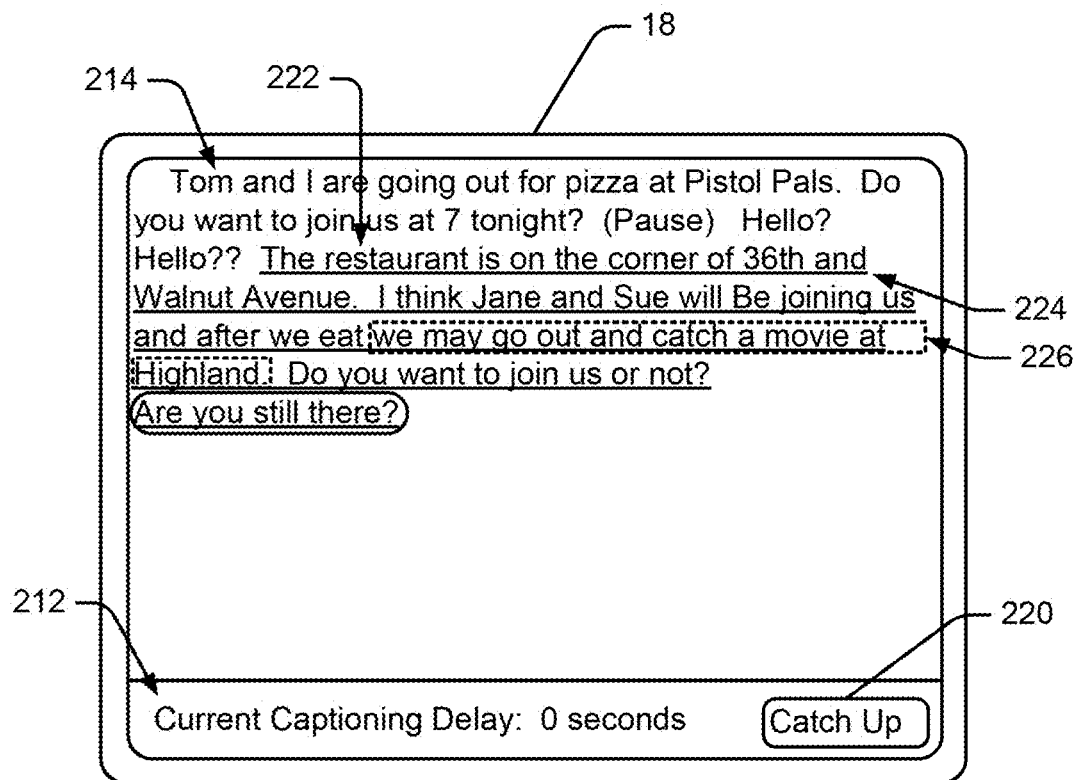
FIG. 18 is similar to FIG. 17, albeit showing a different screen shot.

Referring still to FIGS. 1 and 6, at decision block 204, controller 30 monitors for a catch up or re-sync command received via the assisted user's device 12 (e.g., via selection of an on-screen virtual "catch up" button 220, see again FIG. 17). Where no catch up or re-sync command has been received, control passes back up to block 192 where the process described above continues to cycle. At block 204, once a re-sync command has been received, control passes to block 206 where the buffered voice messages are skipped and a current voice message is presented to the ear of the call assistant to be transcribed. At block 208 the automated text corresponding to the skipped voice message segment is filled in to the text on the call assistant's screen for context and at block 210 the fill in text is transmitted to the assisted user's device for display.

Where automated text is filled in upon the occurrence of a catch up process, the fill in text may be visually distinguished on the assisted user's screen and/or on the call assistant's screen. For instance, fill in text may be highlighted, underlined, bolded, shown in a distinct font, etc. for example, see FIG. 18 that shows fill in text 222 that is underlined to visually distinguish. See also that the captioning delay 212 has been updated. In some cases, fill in text corresponding to voice messages that occur after or within some pre-defined period prior to a re-sync request may be distinguished in yet a third way to point out the text corresponding to the portion of a voice message that the assisted user most likely found interesting (e.g., the portion that prompted selection of the re-sync button). For instance, where 24 previous seconds of text are filled in when a re-sync request is initiated, all 24 seconds of fill in text may be underlined and the 8 seconds of text prior to the re-sync request may also be highlighted in yellow. See in FIG. 18 that some of the fill in text is shown in a phantom box 226 to indicate highlighting.

In at least some cases it is contemplated that server 30 may be programmed to automatically determine when call assistant generated text substantially lags a current voice message from a hearing user and server 30 may automatically skip ahead to re-sync a call assistant with a current message while providing automated fill in text corresponding to intervening voice messages. For instance, server 30 may recognize when call assistant generated text is more than thirty seconds behind a current voice message and may skip the voice messages ahead to the current message while filling in automated text to fill the gap. In at least some cases this automated skip ahead process may only occur after at least some (e.g., 2 minutes) training to a hearing user's voice so ensure that minimal errors are generated in the fill in text.

Figure 7:
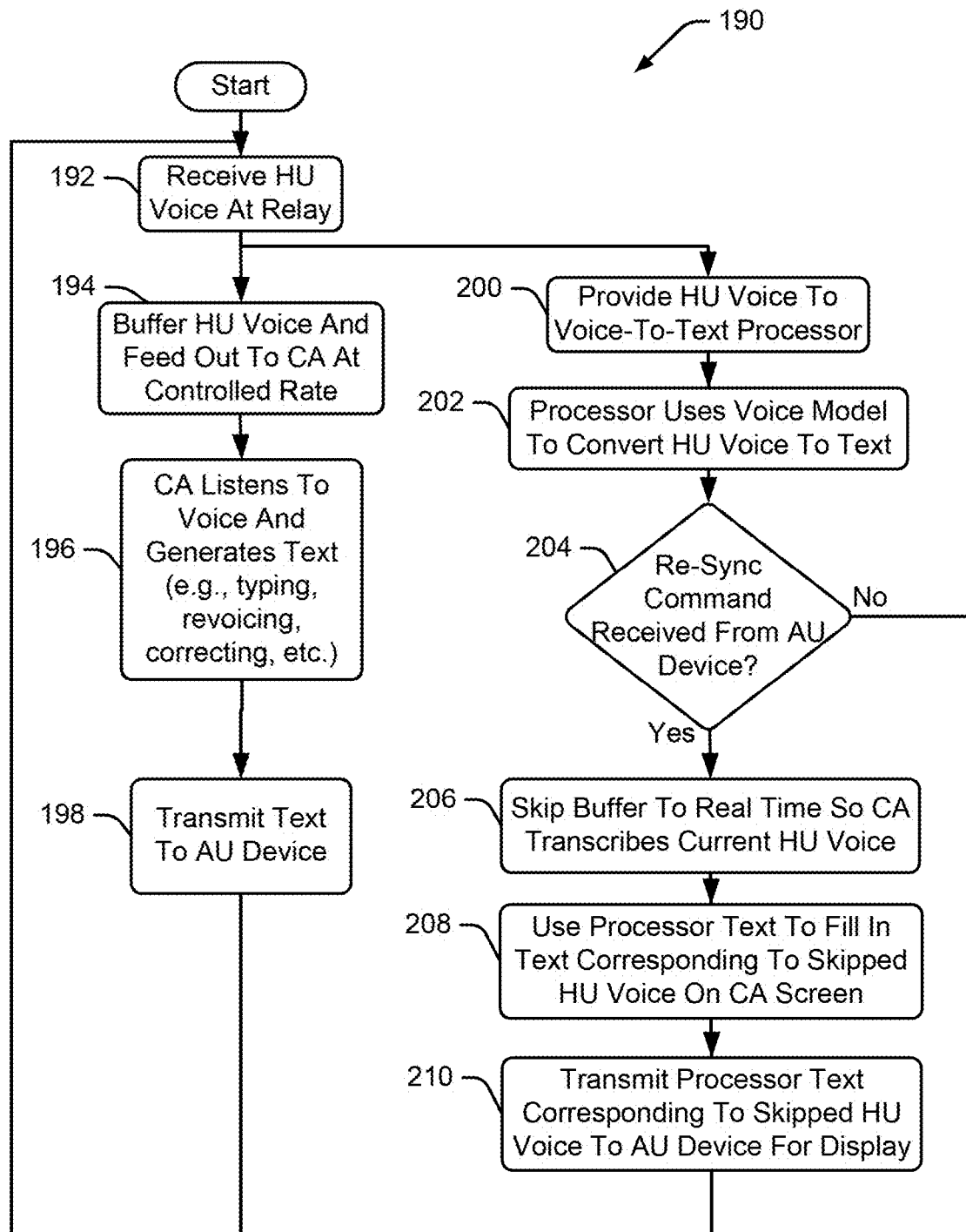
FIG. 7 is a process whereby automated text is automatically used to fill in captioning when transcription by a call assistant lags behind a hearing user's voice messages by a threshold duration.

A method 150 for automatically skipping to a current voice message in a buffer when a call assistant falls to far behind is shown in FIG. 7. Referring also to FIG. 1, at block 152, a hearing user's voice messages are received at relay 16. After block 152, control passes down to each of blocks 154 and 162 where two simultaneous sub-processes occur in parallel. At block 154, the hearing user's voice messages are stored in a rolling buffer. At block 156, a call assistant listens to the hearing user's voice message and transcribes text corresponding to the messages via re-voicing to software trained to the call assistant's voice, typing, etc., after which control passes to block 170.

Referring still to FIG. 7, at process block 162, the hearing user's voice is fed directly to voice-to-text software run by server 30 which generates automated text at block 164. Although not shown in FIG. 7, after block 164, server 30 may compare the automated text to the call assistant generated text to identify errors and may use those errors to train the software to the hearing user's voice so that the automated text continues to get more accurate as a call proceeds.

Referring still to FIGS. 1 and 7, at decision block 166, controller 30 monitors how far call assistant text transcription is behind the current voice message and compares that value to a threshold value. If the delay is less than the threshold value, control passes down to block 170. If the delay exceeds the threshold value, control passes to block 168 where server 30 uses automated text from block 164 to fill in the call assistant generated text and skips the call assistant up to the current voice message. After block 168 control passes to block 170. At block 170, the text including the call assistant generated text and the fill in text is presented to the call assistant via display screen 50 and the call assistant makes any corrections to observed errors. At block 172, the text is transmitted to assisted user's device 12 and is displayed on screen 18. Again, uncorrected text may be transmitted to and displayed on device 12 and corrected text may be subsequently transmitted and used to correct errors in the prior text in line on device 12. After block 172 control passes back up to block 152 where the process described above continues to cycle.

Many assisted user's devices can be used as conventional telephones without captioning service or as assisted user devices where captioning is presented and voice messages are broadcast to an assisted user. The idea here is that one device can be used by hearing impaired persons and persons that have no hearing impairment and that the overall costs associated with providing captioning service can be minimized by only using captioning when necessary. In many cases even a hearing impaired person may not need captioning service all of the time. For instance, a hearing impaired person may be able to hear the voice of a person that speaks loudly fairly well but may not be able to hear the voice of another person that speaks more softly. In this case, captioning would be required when speaking to the person with the soft voice but may not be required when speaking to the person with the loud voice. As another instance, an impaired person may hear better when well rested but hear relatively more poorly when tired so captioning is required only when the person is tired. As still another instance, an impaired person may hear well when there is minimal noise on a line but may hear poorly if line noise exceeds some threshold. Again, the impaired person would only need captioning some of the time.

To minimize captioning service costs and still enable an impaired person to obtain captioning service whenever needed and even during an ongoing call, some systems start out all calls with a default setting where an assisted user's device 12 is used like a normal telephone without captioning. At any time during an ongoing call, an assisted user can select either a mechanical or virtual "Caption" icon or button (see again 68 in FIG. 1) to link the call to a relay, provide a hearing user's voice messages to the relay and commence captioning service. One problem with starting captioning only after an assisted user experiences problems hearing words is that at least some words (e.g., words that prompted the assisted user to select the caption button in the first place) typically go unrecognized and therefore the assisted user is left with a void in their understanding of a conversation.

One solution to the problem of lost meaning when words are not understood just prior to selection of a caption button is to store a rolling recordation of a hearing user's voice messages that can be transcribed subsequently when the caption button is selected to generate "fill in" text. For instance, the most recent 20 seconds of a hearing user's voice messages may be recorded and then transcribed only if the caption button is selected. The relay generates text for the recorded message either automatically via software or via revoicing or typing by a call assistant or a combination of both. In addition, the call assistant starts transcribing current voice messages. The text from the recording and the real time messages is transmitted to and presented via assisted user's device 12 which should enable the assisted user to determine the meaning of the previously misunderstood words. In at least some embodiments the rolling recordation of hearing user's voice messages may be maintained by the assisted user's device 12 (see again FIG. 1) and that recordation may be sent to the relay for immediate transcription upon selection of the caption button.

Figure 8:
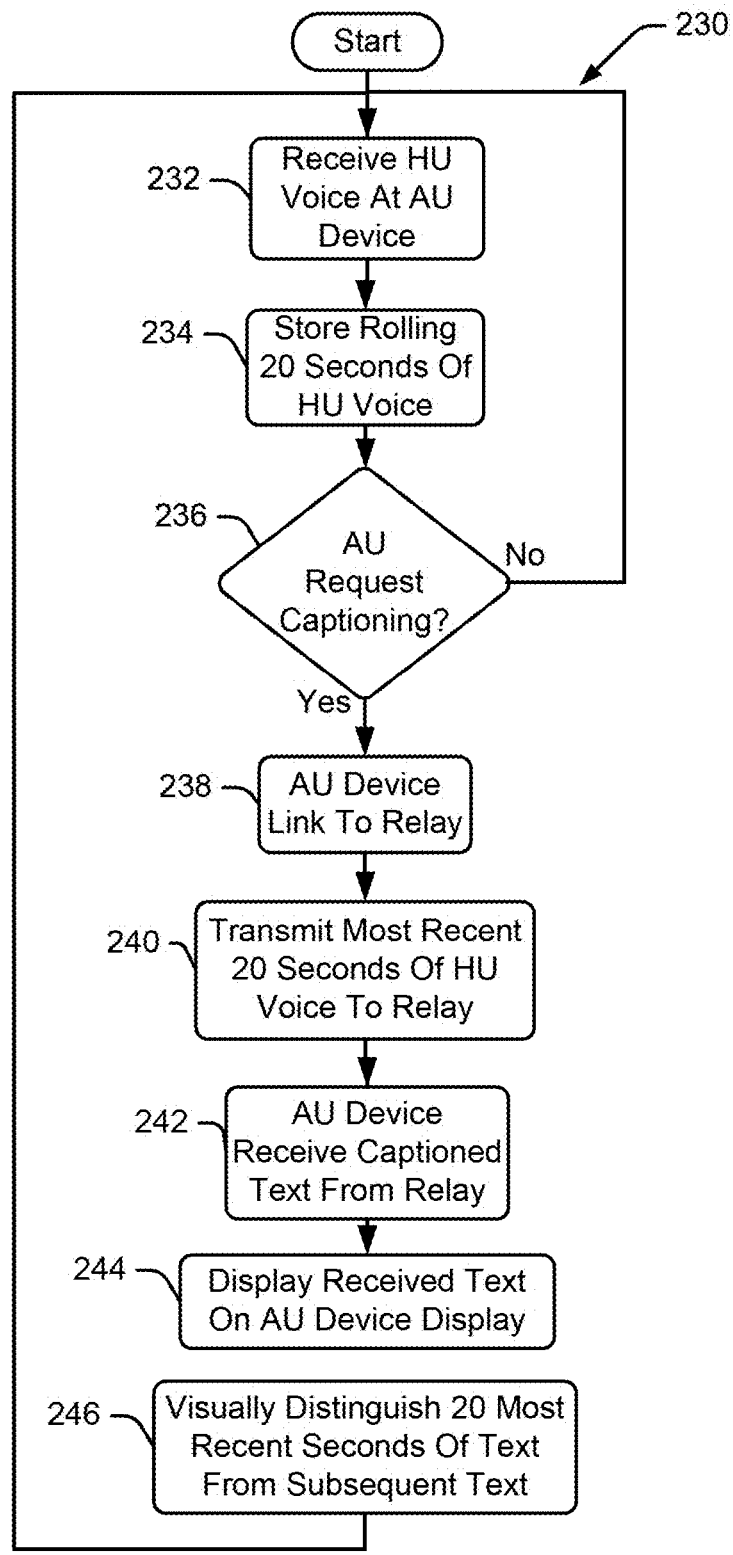
FIG. 8 is a flow chart illustrating a process whereby text is generated for a hearing user's voice messages that precede a request for captioning services.

Referring now to FIG. 8, a process 230 that may be performed by the system of FIG. 1 to provide captioning for voice messages that occur prior to a request for captioning service is illustrated. Referring also to FIG. 1, at block 232 a hearing user's voice messages are received during a call with an assisted user at the assisted user's device 12. At block 234 the assisted user's device 12 stores a most recent 20 seconds of the hearing user's voice messages on a rolling basis. The 20 seconds of voice messages are stored without captioning initially. At decision block 236, the assisted user's device monitors for selection of a captioning button (not shown). If the captioning button has not been selected, control passes back up to block 232 where blocks 232, 234 and 236 continue to cycle.

Once the caption button has been selected, control passes to block 238 where assisted user's device 12 establishes a communication link to relay 16. At block 240 assisted user's device 12 transmits the stored 20 seconds of the hearing user's voice messages along with current ongoing voice messages from the hearing user to relay 16. At this point a call assistant and/or software at the relay transcribes the voice-to-text, corrections are made (or not), and the text is transmitted back to device 12 to be displayed. At block 242 assisted user's device 12 receives the captioned text from the relay 16 and at block 244 the received text is displayed or presented on the assisted user's device display 18. At block 246, in at least some embodiments, text corresponding to the 20 seconds of hearing user voice messages prior to selection of the caption button may be visually distinguished (e.g., highlighted, bold, underlined, etc.) from other text in some fashion. After block 246 control passes back up to block 232 where the process described above continues to cycle.

Figure 9:
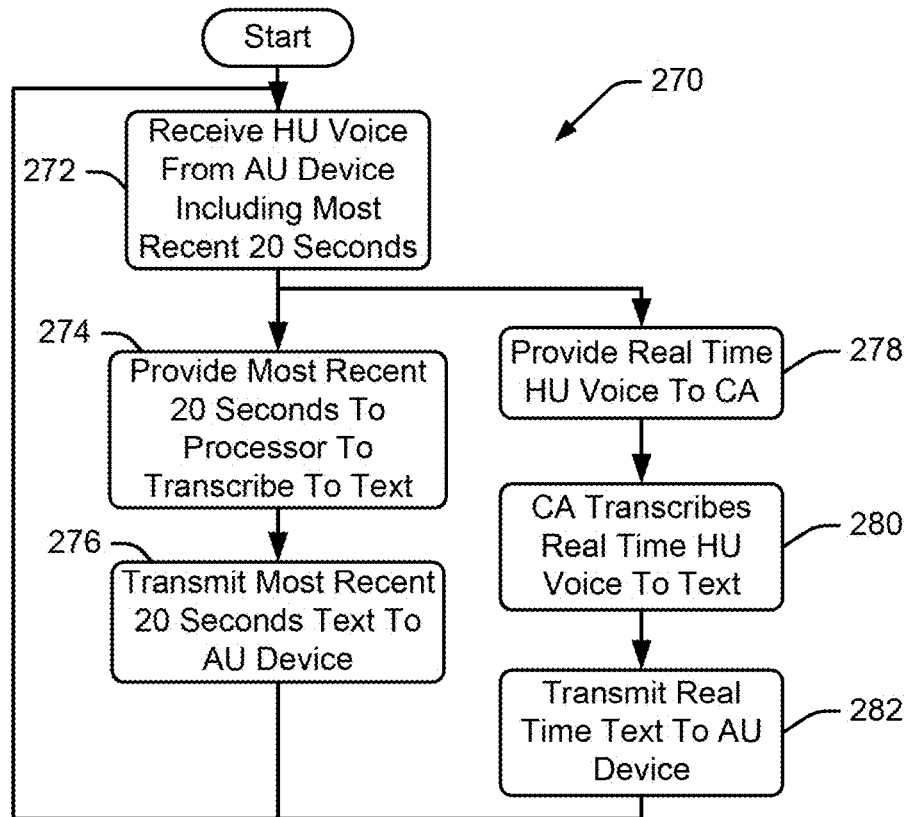
FIG. 9 is a flow chart illustrating a process whereby voice messages prior to a request for captioning service are automatically transcribed to text by an automated voice-to-text engine.

Referring to FIG. 9, a relay server process 270 whereby automated software transcribes voice messages that occur prior to selection of a caption button and a call assistant at least initially captions current voice messages is illustrated. At block 272, after an assisted user requests captioning service by selecting a caption button, server 30 receives a hearing user's voice messages including current ongoing messages as well as the most recent 20 seconds of voice messages that had been stored by assisted user's device 12 (see again FIG. 1). After block 27, control passes to each of blocks 274 and 278 where two simultaneous processes commence in parallel. At block 274 the stored 20 seconds of voice messages are provided to voice-to-text software run by server 30 to generate automated text and at block 276 the automated text is transmitted to the assisted user's device 12 for display. At block 278 the current or real time hearing user's voice messages are provided to a call assistant and at block 280 the call assistant transcribes the current voice messages to text. The call assistant generated text is transmitted to an assisted user's device at block 282 where the text is displayed along with the text transmitted at block 276. Thus, here, the assisted user receives text corresponding to misunderstood voice messages that occur just prior to the assisted user requesting captioning. One other advantage of this system is that when captioning starts, the call assistant is not starting captioning with an already existing backlog of words to transcribe and instead automated software is used to provide the prior text.

In addition to using a service provided by relay 16 to transcribe stored rolling text, other resources may be used to transcribe the stored rolling text. For instance, in at least some embodiments an assisted user's device may link via the Internet or the like to a third party provider that can receive voice messages and transcribe those messages, at least somewhat accurately, to text. In these cases it is contemplated that real time transcription where accuracy needs to meet a high accuracy standard would still be performed by a call assistant or software trained to a specific voice while less accuracy sensitive text may be generated by the third party provider, at least some of the time for free, and transmitted back to the assisted user's device for display.

In other cases, it is contemplated that the assisted user's device 12 itself may run voice-to-text software that could be used to at least somewhat accurately transcribe voice messages to text where the text generated by the assisted user's device would only be provided in cases where accuracy sensitivity is less than normal such as where rolling voice messages prior to selection of a caption icon to initiate captioning are to be transcribed.

Figure 10:
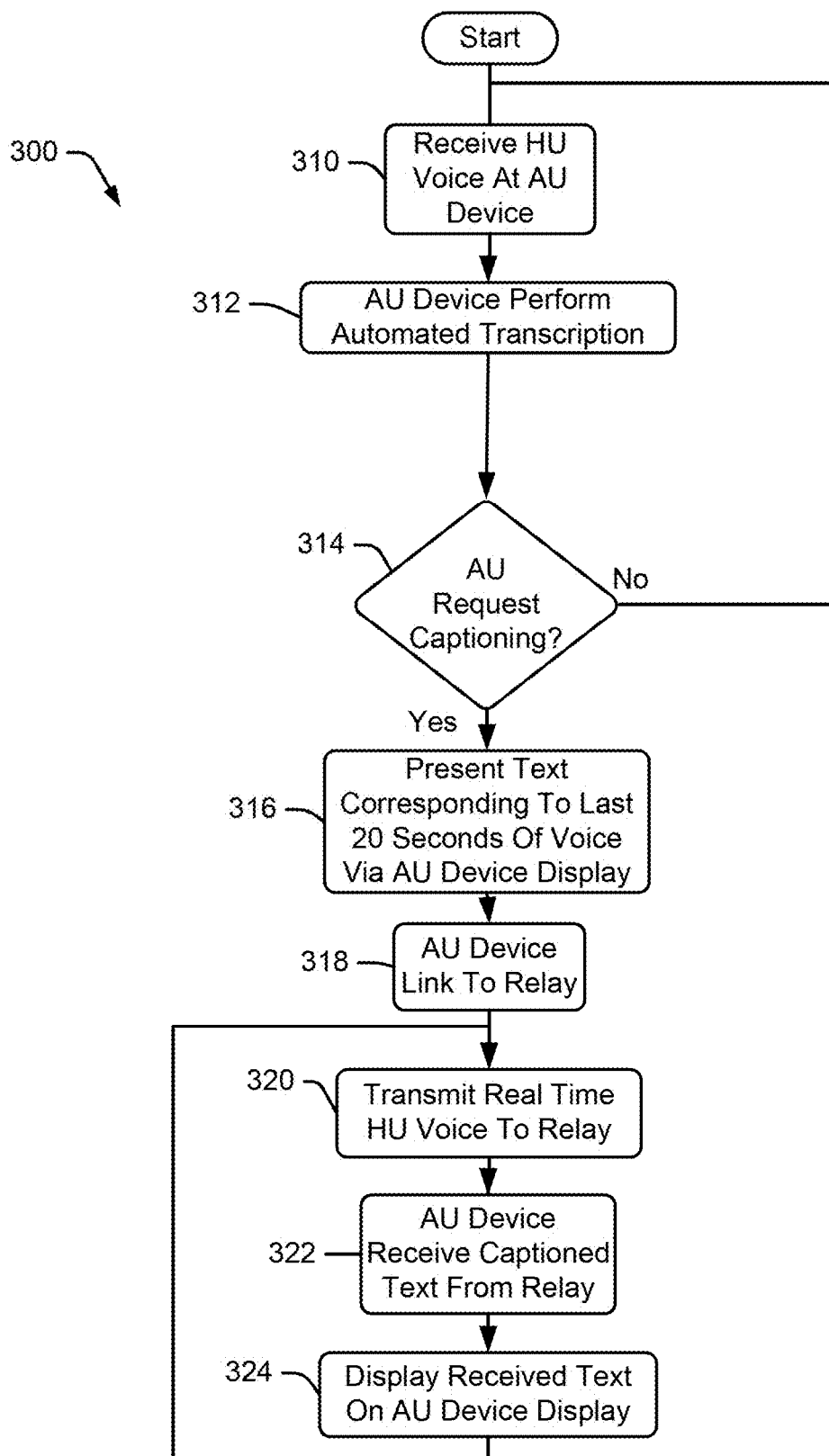
FIG. 10 is a flow chart illustrating a process whereby an assisted user's device processor performs transcription processes until a request for captioning is received at which point the assisted user's device presents texts related to hearing user voice messages prior to the request and on going voice messages are transcribed via a relay.

FIG. 10 shows another method 300 for providing text for voice messages that occurred prior to a caption request, albeit where the an assisted user's device generates the pre-request text as opposed to a relay. Referring also to FIG. 1, at block 310 a hearing user's voice messages are received at an assisted user's device 12. At block 312, the assisted user's device 12 runs voice-to-text software that, in at least some embodiments, trains on the fly to the voice of a linked hearing user and generates caption text. In this embodiment, at least initially, the caption text generated by the assisted user's device 12 is not displayed to the assisted user. At block 314, until the assisted user requests captioning, control simply routes back up to block 310. Once captioning is requested by an assisted user, control passes to block 316 where the text corresponding to the last 20 seconds generated by the assisted user's device is presented on the assisted user's device display 18. Here, while there may be some errors in the displayed text, at least some text associated with the most recent voice message can be quickly presented and give the assisted user the opportunity to attempt to understand the voice messages associated therewith. At block 318 the assisted user's device links to a relay and at block 320 the hearing user's ongoing voice messages are transmitted to the relay. At block 322, after call assistant transcription at the relay, the assisted user's device receives the transcribed text from the relay and at block 324 the text is displayed. After block 324 control passes back up to block 320 where the sub-loop including blocks 320, 322 and 324 continues to cycle.

In at least some cases it is contemplated that voice-to-text software run outside control of the relay may be used to generate at least initial text for a hearing user's voice and that the initial text may be presented via an assisted user's device. Here, because known software still may include more errors than allowed given standard accuracy requirements, a relay correction service may be provided. For instance, in addition to presenting text transcribed by the assisted user's device via a device display 50, the text transcribed by the assisted user's device may also be transmitted to a relay 16 for correction. In addition to transmitting the text to the relay, the hearing user's voice messages may also be transmitted to the relay so that a call assistant can compare the text generated by the assisted user's device to the voice messages. At the relay, the call assistant can listen to the voice of the hearing person and can observe the text. Any errors in the text can be corrected and corrected text blocks can be transmitted back to the assisted user's device and used for in line correction on the assisted user's display screen. One advantage to this type of system is that relatively less skilled call assistants may be retained at a lesser cost to perform the call assistant tasks. A related advantage is that the stress level on call assistants may be reduced appreciably by eliminating the need to both transcribe and correct at high speeds and therefore call assistant turnover at relays may be appreciably reduced which ultimately reduces costs associated with providing relay services.

A similar system may include an assisted user's device that links to some other third party provider transcription/caption server to obtain initial captioned text which is immediately displayed to an assisted user and which is also transmitted to the relay for call assistant correction. Here, again, the call assistant corrections may be used by the third party provider to train the software on the fly to the hearing user's voice. In this case, the assisted user's device may have three separate links, one to the hearing user, a second link to a third party provider server, and a third link to the relay.

Figure 11:
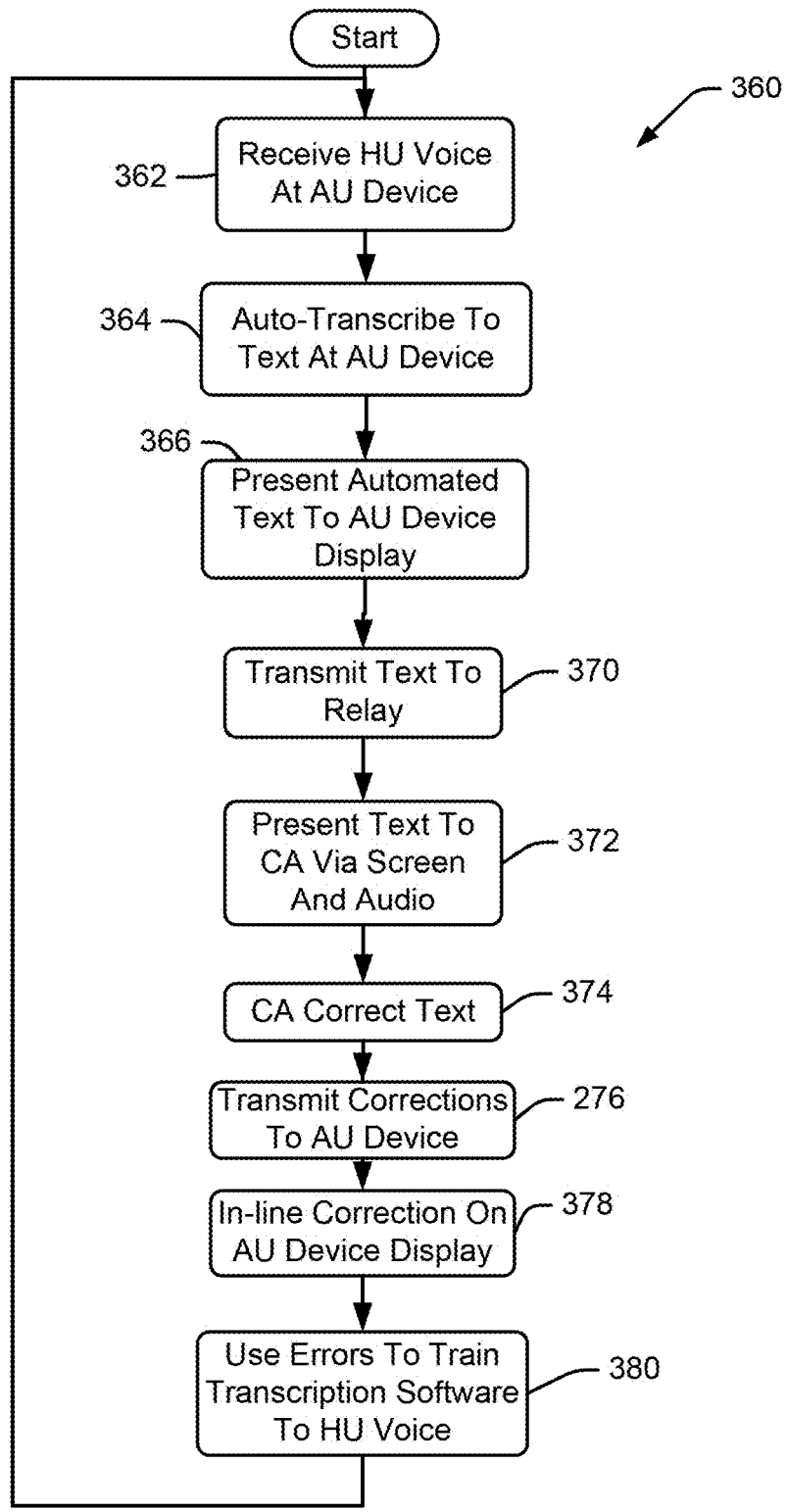
FIG. 11 is a flow chart illustrating a process whereby an assisted user's device processor generates automated text for a hear user's voice messages which is presented via a display to an assisted user and also transmits the text to a call assistant at a relay for correction purposes.

Referring to FIG. 11, a method 360 whereby an assisted user's device transcribes hearing user's voice-to-text and where corrections are made to the text at a relay is illustrated. At block 362 a hearing user's voice messages are received at an assisted user's device 12 (see also again FIG. 1). At block 364 the assisted user's device runs voice-to-text software to generate text from the received voice messages and at block 366 the generated text is presented to the assisted user via display 18. At block 370 the transcribed text is transmitted to the relay 16 and at block 372 the text is presented to a call assistant via the call assistant's display 50. At block 374 the call assistant corrects the text and at block 376 corrected blocks of text are transmitted to the assisted user's device 12. At block 378 the assisted user's device 12 uses the corrected blocks to correct the text errors via in line correction. At block 380, the assisted user's device uses the errors, the corrected text and the voice messages to train the captioning software to the hearing user's voice.

In some cases instead of having a relay or an assisted user's device run automated voice-to-text transcription software, a hearing user's device may include a processor that runs transcription software to generate text corresponding to the hearing user's voice messages. To this end, device 14 may, instead of including a simple telephone, include a computer that can run various applications including a voice-to-text program or may link to some third party real time transcription software program to obtain an initial text transcription substantially in real time. Here, as in the case where an assisted user's device runs the transcription software, the text will often have more errors than allowed by the standard accuracy requirements. Again, to correct the errors, the text and the hearing user's voice messages are transmitted to relay 16 where a call assistant listens to the voice messages, observes the text on screen 18 and makes corrections to eliminate transcription errors. The corrected blocks of text are transmitted to the assisted user's device for display. The corrected blocks may also be transmitted back to the hearing user's device for training the captioning software to the hearing user's voice. In these cases the text transcribed by the hearing user's device and the hearing user's voice messages may either be transmitted directly from the hearing user's device to the relay or may be transmitted to the assisted user's device 12 and then on to the relay. Where the hearing user's voice messages and text are transmitted directly to the relay 16, the voice messages and text may also be transmitted directly to the assisted user's device for immediate broadcast and display and the corrected text blocks may be subsequently used for in line correction.

In these cases the caption request option may be supported so that an assisted user can initiate captioning during an on-going call at any time by simply transmitting a signal to the hearing user's device instructing the hearing user's device to start the captioning process. Similarly, in these cases the help request option may be supported. Where the help option is facilitated, the automated text may be presented via the assisted user's device and, if the assisted user perceives that too many text errors are being generated, the help button may be selected to cause the hearing user's device or the assisted user's device to transmit the automated text to the relay for call assistant correction.

One advantage to having a hearing user's device manage or perform voice-to-text transcription is that the voice signal being transcribed can be a relatively high quality voice signal. To this end, a standard phone voice signal has a range of frequencies between 300 and about 3000 Hertz which is only a fraction of the frequency range used by most voice-to-text transcription programs and therefore, in many cases, automated transcription software does only a poor job of transcribing voice signals that have passed through a telephone connection. Where transcription can occur within a digital signal portion of an overall system, the frequency range of voice messages can be optimized for automated transcription. Thus, where a hearing user's computer that is all digital receives and transcribes voice messages, the frequency range of the messages is relatively large and accuracy can be increased appreciably. Similarly, where a hearing user's computer can send digital voice messages to a third party transcription server accuracy can be increased appreciably.

In at least some configurations it is contemplated that the link between an assisted user's device 12 and a hearing user's device 14 may be either a standard analog phone type connection or may be a digital connection depending on the capabilities of the hearing user's device that links to the assisted user's device. Thus, for instance, a first call may be analog and a second call may be digital. Because digital voice messages have a greater frequency range and therefore can be automatically transcribed more accurately than analog voice messages in many cases, it has been recognized that a system where automated voice-to-text program use is implemented on a case by case basis depending upon the type of voice message received (e.g., digital or analog) would be advantageous. For instance, in at least some embodiments, where a relay receives an analog voice message for transcription, the relay may automatically link to a call assistant for full call assistant transcription service where the call assistant transcribes and corrects text via revoicing and keyboard manipulation and where the relay receives a high definition digital voice message for transcription, the relay may run an automated voice-to-text transcription program to generate automated text. The automated text may either be immediately corrected by a call assistant or may only be corrected by an assistant after a help feature is selected by an assisted user as described above.

Figure 12:
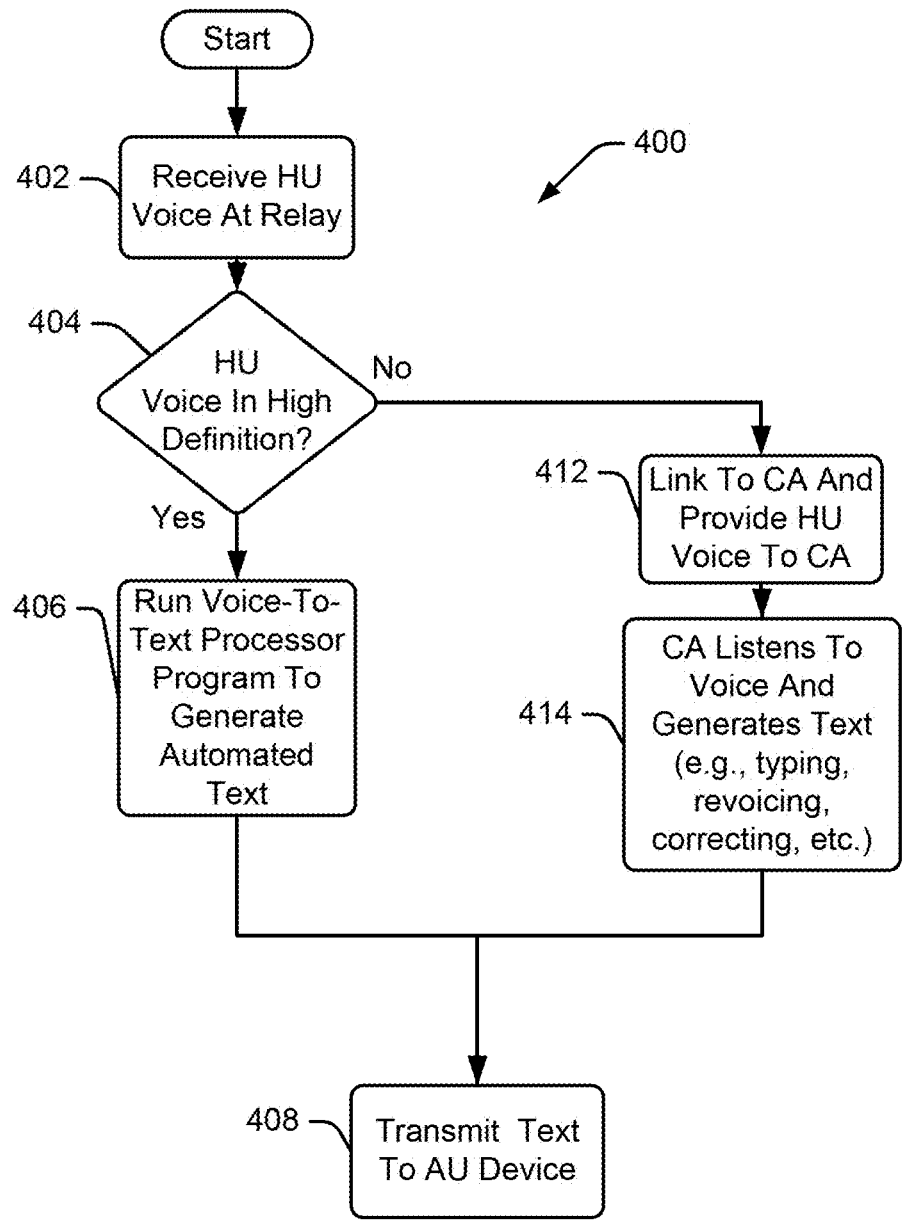
FIG. 12 is a flow chart illustrating a process whereby high definition digital voice messages and analog voice messages are handled differently at a relay.

Referring to FIG. 12, one process 400 for treating high definition digital messages differently than analog voice messages is illustrated. Referring also to FIG. 1, at block 402 a hearing user's voice messages are received at a relay 16. At decision block 404, relay server 30 determines if the received voice message is a high definition digital message or is an analog message. Where a high definition message has been received, control passes to block 406 where server 30 runs an automated voice-to-text program on the voice messages to generate automated text. At block 408 the automated text is transmitted to the assisted user's device 12 for display. Referring again to block 404, where the hearing user's voice messages are in analog, control passes to block 412 where a link to a call assistant is established so that the hearing user's voice messages are provided to a call assistant. At block 414 the call assistant listens to the voice messages and transcribes the messages into text. Error correction may also be performed at block 414. After block 414, control passes to block 408 where the call assistant generated text is transmitted to the assisted user's device 12. Again, in some cases, when automated text is presented to an assisted user, a help button may be presented that, when selected causes automated text to be presented to a call assistant for correction. In other cases automated text may be automatically presented to a call assistant for correction.

Another system is contemplated where all incoming calls to a relay are initially assigned to a call assistant for at least initial captioning where the option to switch to automated software generated text is only available when the call includes high definition audio and after accuracy standards have been exceeded. Here, all analog hearing user's voice messages would be captioned by a call assistant from start to finish and any high definition calls would cut out the call assistant when the standard is exceeded.

In at least some cases where an assisted user's device is capable of running automated voice-to-text transcription software, the assisted user's device 12 may be programmed to select either automated transcription when a high definition digital voice message is received or a relay with a call assistant when an analog voice message is received. Again, where device 12 runs an automated text program, call assistant correction may be automatic or may only start when a help button is selected.

Figure 13:
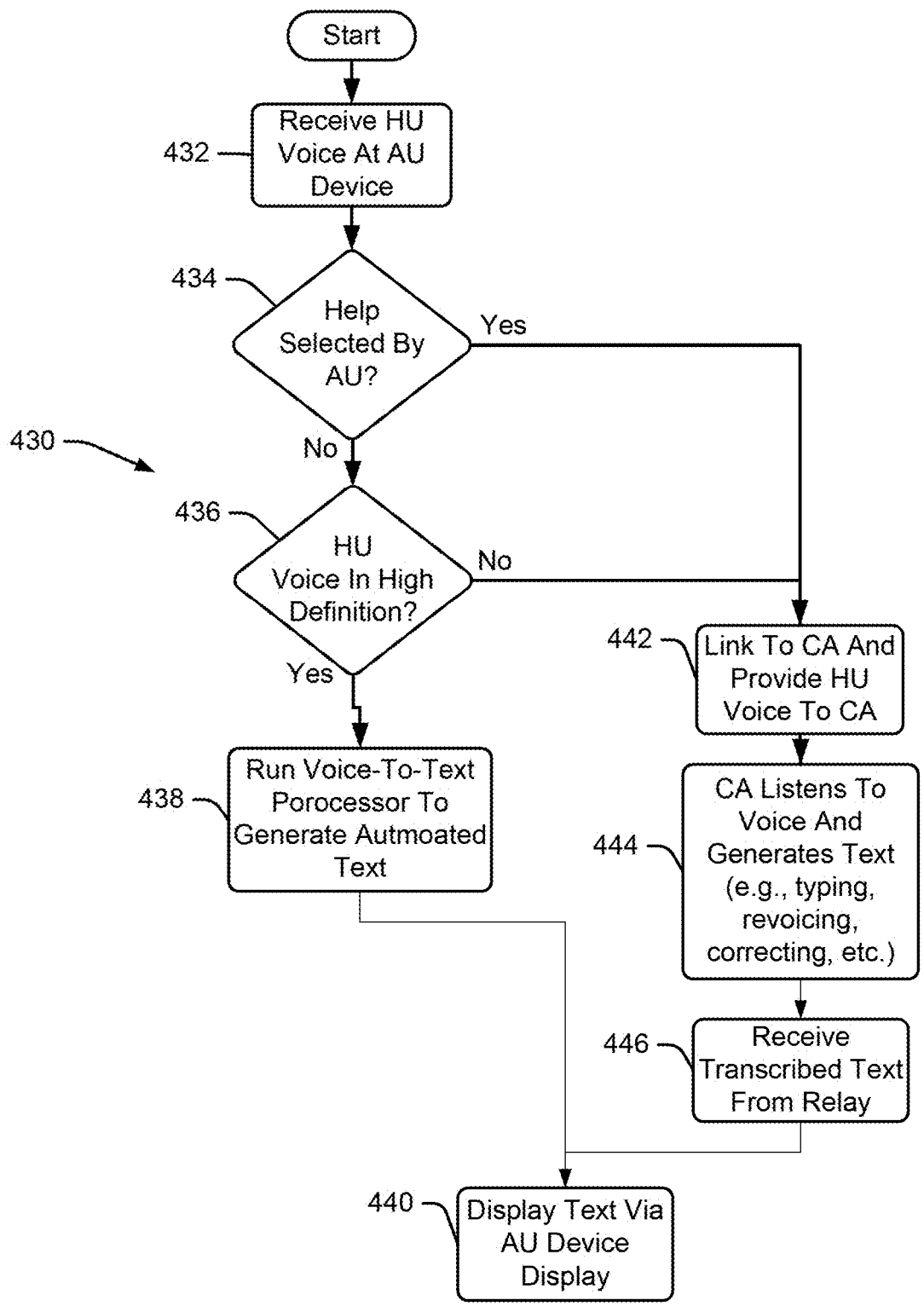
FIG. 13 is a process similar to FIG. 12, albeit where an assisted user also has the option to link to a call assistant for captioning service regardless of the type of voice message received.

FIG. 13 shows a process 430 whereby an assisted user's device 12 selects either automated voice-to-text software or a call assistant to transcribe based on the type of voice messages received. At block 432 a hearing user's voice messages are received by an assisted user's device 12. At decision block 434, a processor in device 12 determines if the assisted user has selected a help button. Initially no help button is selected as no text has been presented so at least initially control passes to block 436. At decision block 436, the device processor determines if a hearing user's voice signal that is received is high definition digital or is analog. Where the received signal is high definition digital, control passes to block 438 where the assisted user's device processor runs automated voice-to-text software to generate automated text which is then displayed on the assisted user device display 18 at block 440. Referring still to FIG. 13, if the help button has been selected at block 434 or if the received voice messages are in analog, control passes to block 442 where a link to a call assistant at relay 16 is established and the hearing user's voice messages are transmitted to the relay. At block 444 the call assistant listens to the voice messages and generates text and at block 446 the text is transmitted to the assisted user's device 12 where the text is displayed at block 440.

In has been recognized that in many cases most calls facilitated using an assisted user's device will be with a small group of other hearing or non-hearing users. For instance, in many cases as much as 70 to 80 percent of all calls to an assisted user's device will be with one of five or fewer hearing user's devices (e.g., family, close friends, a primary care physician, etc.). For this reason it has been recognized that it would be useful to store voice-to-text models for at least routine callers that link to an assisted user's device so that the automated voice-to-text training process can either be eliminated or substantially expedited. For instance, when an assisted user initiates a captioning service, if a previously developed voice model for a hearing user can be identified quickly, that model can be used without a new training process and the switchover from a full service call assistant to automated captioning may be expedited (e.g., instead of taking a minute or more the switchover may be accomplished in 15 seconds or less, in the time required to recognize or distinguish the hearing user's voice form other voices).

Figure 14:
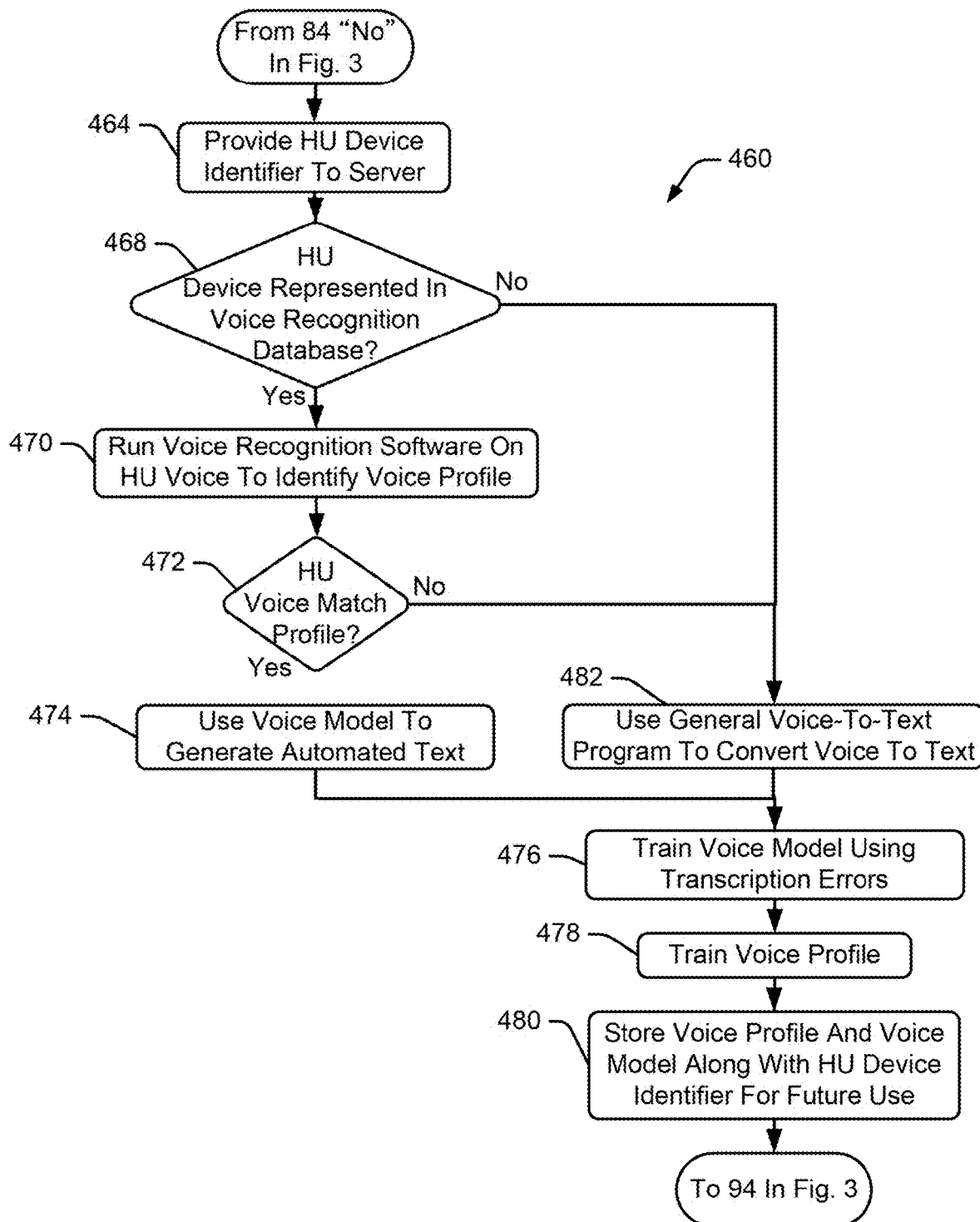
FIG. 14 is a flow chart that may be substituted for a portion of the process shown in FIG. 3 whereby voice models and voice profiles are generated for frequent hearing user's that communicate with an assisted user where the models and profiles can be subsequently used to increase accuracy of a transcription process.

FIG. 14 shows a sub-process 460 that may be substituted for a portion of the process shown in FIG. 3 wherein voice-to-text templates along with related voice recognition profiles for callers are stored and used to expedite the handoff to automated transcription. Prior to running sub-process 460, referring again to FIG. 1, server 30 is used to create a voice recognition database for storing hearing user device identifiers along with associated voice recognition profiles and associated voice-to-text models. A voice recognition profile is a data construct that can be used to distinguish one voice from others. In the context of the FIG. 1 system, voice recognition profiles are useful because more than one person may use a hearing user's device to call an assisted user. For instance in an exemplary case, an assisted user's son or daughter-in-law or one of any of three grandchildren may use device 14 to call an assisted user and therefore, to access the correct voice-to-text model, server 30 needs to distinguish which caller's voice is being received. Thus, in many cases, the voice recognition database will include several voice recognition profiles for each hearing user device identifier (e.g., each hearing user phone number). A voice-to-text model includes parameters that are used to customize voice-to-text software for transcribing the voice of an associated hearing user to text. The voice recognition database will include at least one voice model for each voice profile to be used by server 30 to automate transcription whenever a voice assocated with the specific profile is identified. Data in the voice recognition database will be generated on the fly as an assisted user uses device 12. Thus, initially the voice recognition database will include a simple construct with no device identifiers, profiles or voice models.

Referring still to FIGS. 1 and 14 and now also to FIG. 3, at decision block 84 in FIG. 3, if the help flag is still zero (e.g., an assisted user has not requested call assistant help to correct automated text errors) control may pass to block 464 in FIG. 13 where the hearing user's device identifier (e.g., a phone number, an IP address, a serial number of a hearing user's device, etc.) is received by server 30. At block 468 server 30 determines if the hearing user's device identifier has already been added to the voice recognition database. If the hearing user's device identifier does not appear in the database (e.g., the first time the hearing user's device is used to connect to the assisted user's device) control passes to block 482 where server 30 uses a general voice-to-text program to convert the hearing user's voice messages to text after which control passes to block 476. At block 476 the server 30 trains a voice-to-text model using transcription errors. Again, the training will include comparing call assistant generated text to automated text to identify errors and using the errors to adjust model parameters so that the next time the word associated with the error is uttered by the hearing user, the software will identify the correct word. At block 478 server 30 trains a voice profile for the hearing user's voice so that the next time the hearing user calls, a voice profile will exist for the specific hearing user that can be used to identify the hearing user. At block 480 the server 30 stores the voice profile and voice model for the hearing user along with the hearing user device identifier for future use after which control passes back up to block 94 in FIG. 3.

Referring still to FIGS. 1 and 14, at block 468 if the hearing user's device is already represented in the voice recognition database, control passes to block 470 where server 30 runs voice recognition software on the hearing user's voice messages in an attempt to identify a voice profile associated with the specific hearing user. At decision block 472, if the hearing user's voice does not match one of the previously stored voice profiles associated with the device identifier, control passes to block 482 where the process described above continues. At block 472, if the hearing user's voice matches a previously stored profile, control passes to block 474 where the voice model associated with the matching profile is used to tune the voice-to-text software to be used to generate automated text.

Referring still to FIG. 14, at blocks 476 and 478, the voice model and voice profile for the hearing user are continually trained. Continual training enables the system to constantly adjust the model for changes in a hearing user's voice that may occur over time or when the hearing user experiences some physical condition (e.g., a cold, a raspy voice) that affects the sound of their voice. At block 480, the voice profile and voice model are stored with the HU device identifier for future use.

In at least some embodiments server 30 may adaptively change the order of voice profiles applied to a hearing user's voice during the voice recognition process. For instance, while server 30 may store five different voice profiles for five different hearing users that routinely connect to an assisted user's device, a first of the profiles may be used 80 percent of the time. In this case, when captioning is commenced, server 30 may start by using the first profile to analyze a hearing user's voice at block 472 and may cycle through the profiles from the most matched to the least matched.

To avoid server 30 having to store a different voice profile and voice model for every hearing person that communicates with an assisted user via device 12, in at least some embodiments it is contemplated that server 30 may only store models and profiles for a limited number (e.g., 5) of frequent callers. To this end, in at least some cases server 30 will track calls and automatically identify the most frequent hearing user devices used to link to the assisted user's device 12 over some rolling period (e.g., 1 month) and may only store models and profiles for the most frequent callers. Here, a separate counter may be maintained for each hearing user device used to link to the assisted user's device over the rolling period and different models and profiles may be swapped in and out of the stored set based on frequency of calls.

In other embodiments server 30 may query an assisted user for some indication that a specific hearing user is or will be a frequent contact and may add that person to a list for which a model and a profile should be stored for a total of up to five persons.

While the system described above with respect to FIG. 14 assumes that the relay 16 stores and uses voice models and voice profiles that are trained to hearing user's voices for subsequent use, in at least some embodiments it is contemplated that an assisted user's device 12 processor may maintain and use or at least have access to and use the voice recognition database to generate automated text without linking to a relay. In this case, because the assisted user's device runs the software to generate the automated text, the software for generating text can be trained any time the user's device receives a hearing user's voice messages without linking to a relay. For example, during a call between a hearing user and an assisted user on devices 14 and 12, respectively, in FIG. 1, and prior to an assisted user requesting captioning service, the voice messages of even a new hearing user can be used by the assisted user's device to train a voice-to-text model and a voice profile for the user.

In addition, prior to a caption request, as the model is trained and gets better and better, the model can be used to generate text that can be used as fill in text (e.g., text corresponding to voice messages that precede initiation of the captioning function) when captioning is selected.

Figure 15:
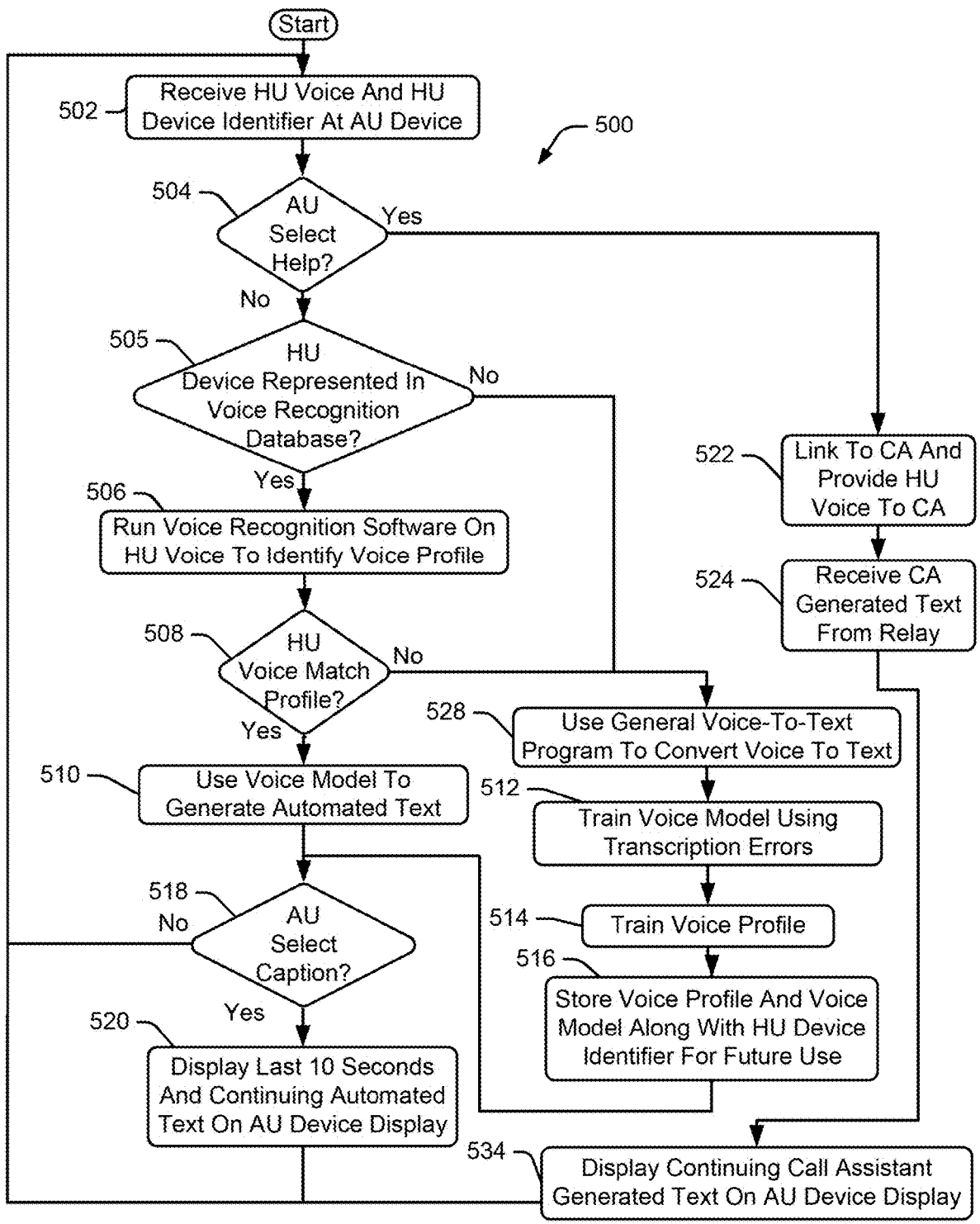
FIG. 15 is a flow chart illustrating a process similar to the sub-process shown in FIG. 14 where voice profiles and voice models are generated and stored for subsequent use during transcription.

FIG. 15 shows a process 500 that may be performed by an assisted user's device to train voce models and voice profiles and use those models and profiles to automate text transcription until a help button is selected. Referring also to FIG. 1, at block 502, an assisted user's device 12 processor receives a hearing user's voice messages as well as an identifier (e.g. a phone number) of the hearing user's device 14. At block 504 the processor determines if the assisted user has selected the help button (e.g., indicating that current captioning includes too many errors). If an assisted user selects the help button at block 504, control passes to block 522 where the assisted user's device is linked to a call assistant at relay 16 and the hearing user's voice is presented to the call assistant. At block 524 the assisted user's device receives text back from the relay and at block 534 the call assistant generated text is displayed on the assisted user's device display 18.

Where the help button has not been selected, control passes to block 505 where the processor uses the device identifier to determine if the hearing user's device is represented in the voice recognition database. Where the hearing user's device is not represented in the database control passes to block 528 where the processor uses a general voice-to-text program to convert the hearing user's voice messages to text after which control passes to block 512.

Referring again to FIGS. 1 and 15, at block 512 the processor adaptively trains the voice model using perceived errors in the automated text. To this end, one way to train the voice model is to generate text phonetically and thereafter perform a context analysis of each text word by looking at other words proximate the word to identify errors. Another example of using context to identify errors is to look at several generated text words as a phrase and compare the phrase to similar prior phrases that are consistent with how the specific hearing user strings words together and identify any discrepancies as possible errors. At block 514 a voice profile for the hearing user is generated from the hearing user's voice messages so that the hearing user's voice can be recognized in the future. At block 516 the voice model and voice profile for the hearing user are stored for future use during subsequent calls and then control passes to block 518 where the process described above continues. Thus, blocks 528, 512, 514 and 516 enable the assisted user's device to train voice models and voice profiles for hearing users that call in anew where a new voice model can be used during an ongoing call and during future calls to provide generally accurate transcription.

Referring still to FIGS. 1 and 15, if the hearing user's device is already represented in the voice recognition database at block 505, control passes to block 506 where the processor runs voice recognition software on the hearing user's voice messages in an attempt to identify one of the voice profiles associated with the device identifier. At block 508, where no voice profile is recognized, control passes to block 528.

At block 508, if the hearing user's voice matches one of the stored voice profiles, control passes to block 510 where the voice-to-text model associated with the matching profile is used to generate automated text from the hearing user's voice messages. Next, at block 518, the assisted user's device processor determine if the caption button on the assisted user's device has been selected. If captioning has not bee selected control passes to block 502 where the process continues to cycle. Once captioning has been requested, control passes to block 520 where assisted user's device 12 displays the most recent 10 seconds of automated text and continuing automated text on display 18.

In at least some embodiments it is contemplated that different types of voice model training may be performed by different processors within the overall FIG. 1 system. For instance, while an assisted user's device is not linked to a relay, the assisted user's device cannot use any errors identified by a call assistance at the relay to train a voice model as no call assistant is generating errors. Nevertheless, the assisted user's device can use context to identify errors and train a model. Once an assisted user's device is linked to a relay where a call assistant corrects errors, the relay server can use the call assistant identified errors and corrections to train a voice model which can, once sufficiently accurate, be transmitted to the assisted user's device where the new model is substituted for the old content based model or where the two models are combined into a single robust model in some fashion. In other cases when an assisted user's device links to a relay for call assistant captioning, a context based voice model generated by the assisted user's device for the hearing user may be transmitted to the relay server and used as an initial model to be further trained using call assistant identified errors and corrections. In still other cases call assistant errors may be provided to the assisted user's device and used by that device to further train a context based voice model for the hearing user.

Figure 16:
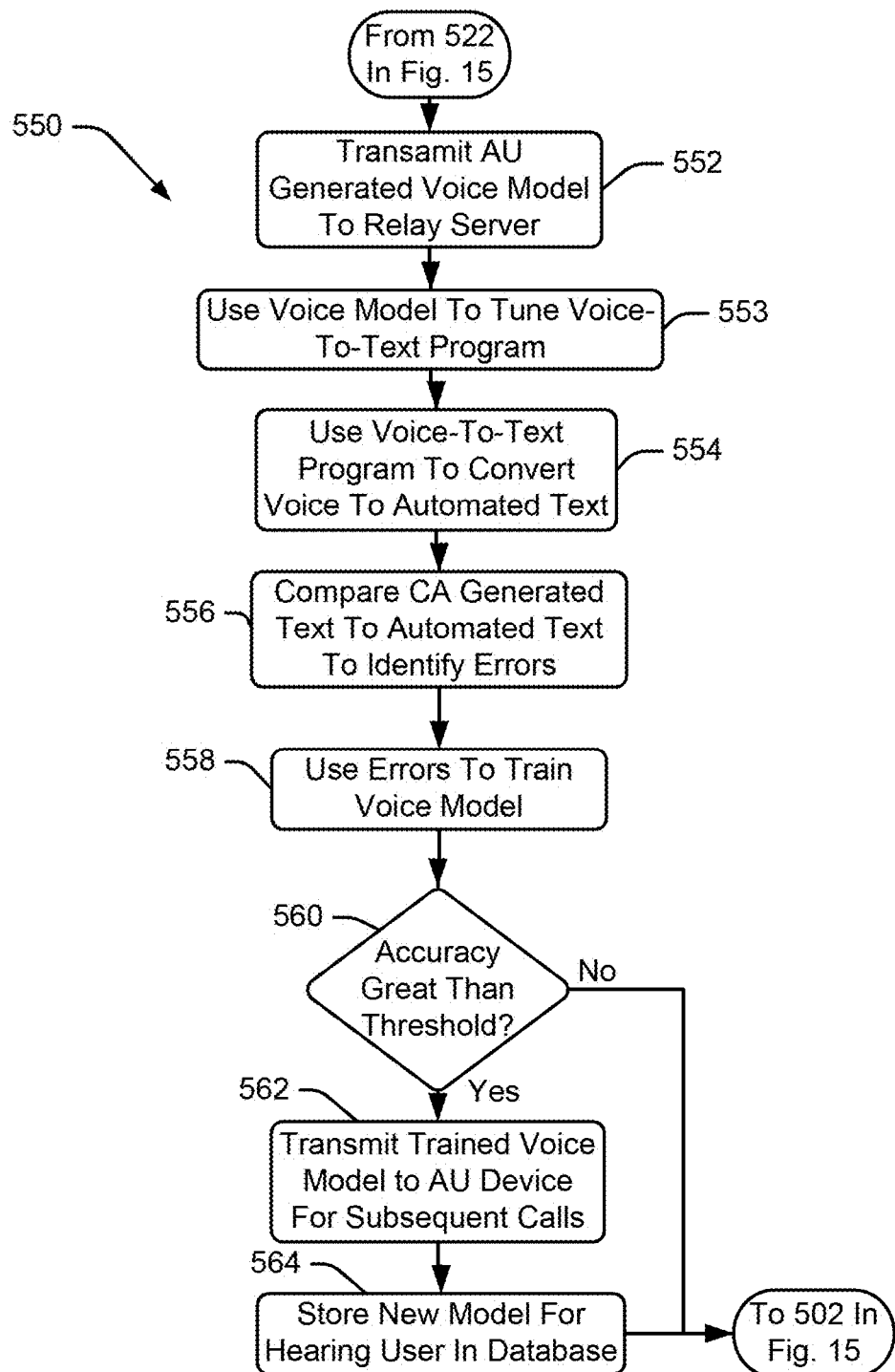
FIG. 16 is a flow chart illustrating a sub-process that may be added to the process shown in FIG. 15 where the resulting process calls for training of a voice model at each of an assisted user's device and a relay.

Referring now to FIG. 16, a sub-process 550 that may be added to the process shown in FIG. 15 whereby an assisted user's device trains a voice model for a hearing user using voice message content and a relay server further trains the voice model generated by the assisted user's device using call assistant identified errors is illustrated. Referring also to FIG. 15, sub-process 550 is intended to be performed in parallel with block 524 and 534 in FIG. 15. Thus, after block 522, in addition to block 524, control also passes to block 552 in FIG. 16. At block 552 the voice model for a hearing user that has been generated by an assisted user's device 12 is transmitted to relay 16 and at block 553 the voice model is used to modify a voice-to-text program at the relay. At block 554 the modified voice-to-text program is used to convert the hearing user's voice messages to automated text. At block 556 the call assistant generated text is compared to the automated text to identify errors. At block 558 the errors are used to further train the voice model. At block 560, if the voice model has an accuracy below the required standard, control passes back to block 502 in FIG. 15 where the process described above continues to cycle. At block 560, once the accuracy exceeds the standard requirement, control passes to block 562 wherein server 30 transmits the trained voice model to the assisted user's device for handling subsequent calls from the hearing user for which the model was trained. At block 564 the new model is stored in the database maintained by the assisted user's device.

Referring still to FIG. 16, in addition to transmitting the trained model to the assisted user's device at block 562, once the model is accurate enough to meet the standard requirements, server 30 may perform an automated process to cut out the call assistant and instead transmit automated text to the assisted user's device as described above in FIG. 1. In the alternative, once the model has been transmitted to the assisted user's device at block 562, the relay may be programmed to hand off control to the assisted user's device which would then use the newly trained and relatively more accurate model to perform automated transcription so that the relay could be disconnected.

Several different concepts and aspects of the present disclosure have been described above. It should be understood that many of the concepts and aspects may be combined in different ways to configure other triage systems that are more complex. For instance, one exemplary system may include an assisted user's device that attempts automated captioning with on the fly training first and, when automated captioning by the assisted user's device fails (e.g., a help icon is selected by an assisted user), the assisted user's device may link to a third party captioning system via the internet or the like where another more sophisticated voice-to-text captioning software is applied to generate automated text. Here, if the help button is selected again, the assisted user's device may link to a call assistant at the relay for call assistant captioning with simultaneous voice-to-text software transcription where errors in the automated text are used to train the software until a threshold accuracy requirement is met. Here, once the accuracy requirement is exceeded, the system may automatically cut out the call assistant and switch to the automated text from the relay until the help button is again selected. In each of the transcription hand offs, any learning or model training performed by one of the processors in the system may be provided to the next processor in the system to be used to expedite the training process.

In at least some embodiments an automated voice-to-text engine may be utilized in other ways to further enhance calls handled by a relay. For instance, in cases where transcription by a call assistant lags behind a hearing user's voice messages, automated transcription software may be programmed to transcribe text all the time and identify specific words in a hearing user's voice messages to be presented via an assisted user's display immediately when identified to help the assisted user determine when a hearing user is confused by a communication delay. For instance, assume that transcription by a call assistant lags a hearing user's most current voice message by 20 seconds and that an assisted user is relying on the call assistant generated text to communicate with the hearing user. In this case, because the call assistant generated text lag is substantial, the hearing user may be confused when the assisted user's response also lags a similar period and may generate a voice message questioning the status of the call. For instance, the hearing user may utter "Are you there?" or "Did you hear me?" or "Hello" or "What did you say?". These phrases and others like them querying call status are referred to herein as "line check words" (LCWs) as the hearing user is checking the status of the call on the line.

If the line check words are not presented until they occurred sequentially in the hearing user's voice messages, they would be delayed for 20 or more seconds in the above example. In at least some embodiments it is contemplated that the automated voice engine may search for line check words in a hearing user's voice messages and present the line check words immediately via the assisted user's device during a call regardless of which words have been transcribed and presented to an assisted user. The assisted user, seeing line check words or a phrase can verbally respond that the captioning service is lagging but catching up so that the parties can avoid or at least minimize confusion.

When line check words are presented to an assisted user the words may be presented in-line within text being generated by a call assistant with intermediate blanks representing words yet to be transcribed by the call assistant. To this end, see again FIG. 17 that shows line check words "Are you still there?" in a highlighting box 590 at the end of intermediate blanks 216 representing words yet to be transcribed by the call assistant. Line check words will, in at least some embodiments, be highlighted on the display or otherwise visually distinguished. In other embodiments the line check words may be located at some prominent location on the assisted user's display screen (e.g., in a line check box or field at the top or bottom of the display screen).

One advantage of using an automated voice engine to only search for specific words and phrases is that the engine can be tuned for those words and will be relatively more accurate than a general purpose engine that transcribes all words uttered by a hearing user. In at least some embodiments the automated voice engine will be run by an assisted user's device processor while in other embodiments the automated voice engine may be run by the relay server with the line check words transmitted to the assisted user's device immediately upon generation and identification.

Figure 19:
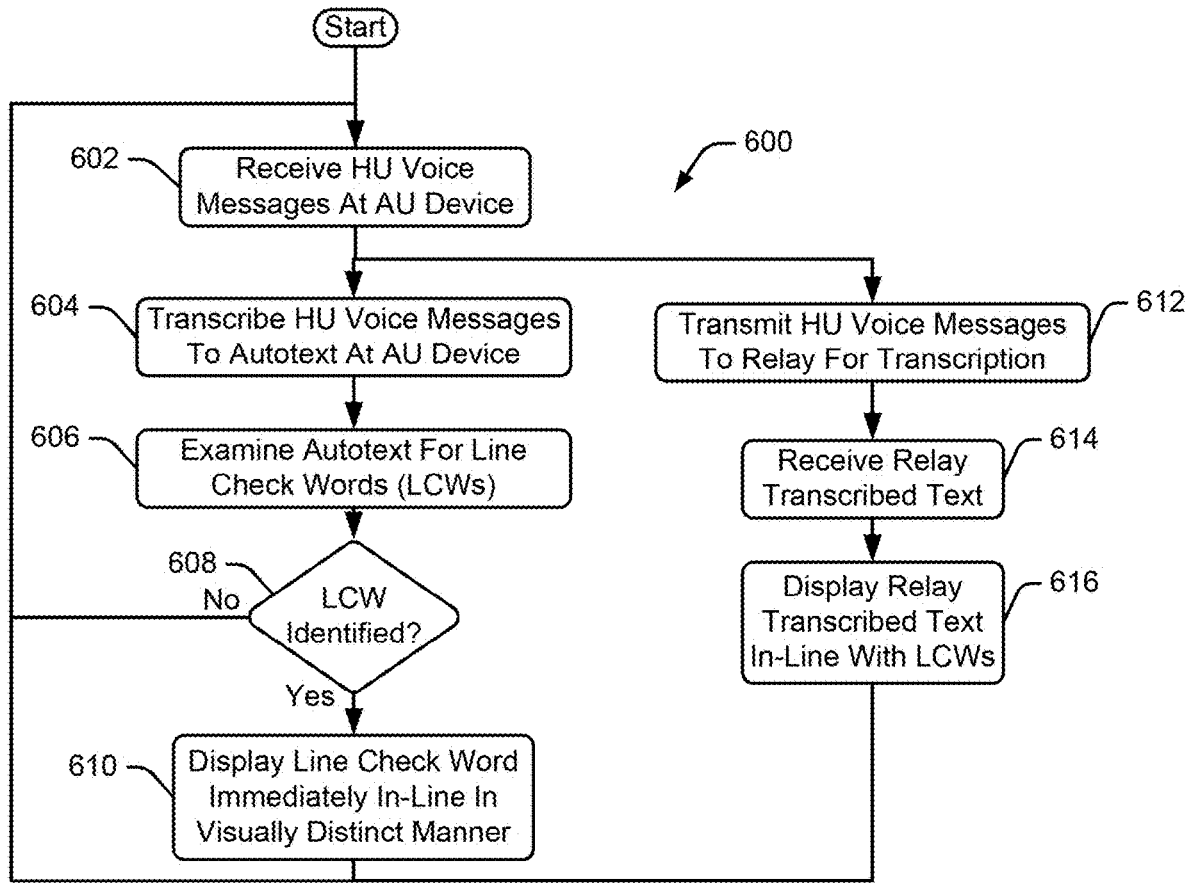
FIG. 19 is a process that may be performed by the system shown in FIG. 1 where automated text is generated for line check words and is presented to an assisted user immediately upon identification of the words.

Referring now to FIG. 19, a process 600 that may be performed by an assisted user's device 12 and a relay to transcribe hearing user's voice messages and provide line check words immediately to an assisted user when transcription by a call assistant lags in illustrated. At block 602 a hearing user's voice messages are received by an assisted user's device 12. After block 602 control continues along parallel sub-processes to blocks 604 and 612. At block 604 the assisted user's device processor uses an automated voice engine to transcribe the hearing user's voice messages to text. Here, it is assumed that the voice engine may generate several errors and therefore likely would be insufficient for the purposes of providing captioning to the assisted user. The engine, however, is optimized and trained to caption a set (e.g., 10 to 100) line check words and/or phrases which the engine can do extremely accurately. At block 606 the assisted user's device processor searches for line check words in the automated text. At block 608, if a line check word or phrase is not identified control passes back up to block 602 where the process continues to cycle. At block 608, if a line check word or phrase is identified, control passes to block 610 where the line check word/phrase is immediately presented to the assisted user via display 18 either in-line or in a special location and, in at least some cases, in a visually distinct manner.

Referring still to FIG. 19, at block 612 the hearing user's voice messages are sent to a relay for transcription. At block 614 transcribed text is received at the assisted user's device back from the relay. At block 616 the text from the relay is used to fill in the intermediate blanks (see again FIG. 17 and also FIG. 18 where text has been filled in) on the assisted user's display.

In at least some embodiments it is contemplated that an automated voice-to-text engine may operate all the time and may check for and indicate any potential errors in call assistant generated text so that the call assistant can determine if the errors should be corrected. For instance, in at least some cases, the automated voice engine may highlight potential errors in call assistant generated text on the call assistant's display screen inviting the call assistant to correct the potential errors. In these cases the call assistant would have the final say regarding whether or not a potential error should be altered.

Figure 20:
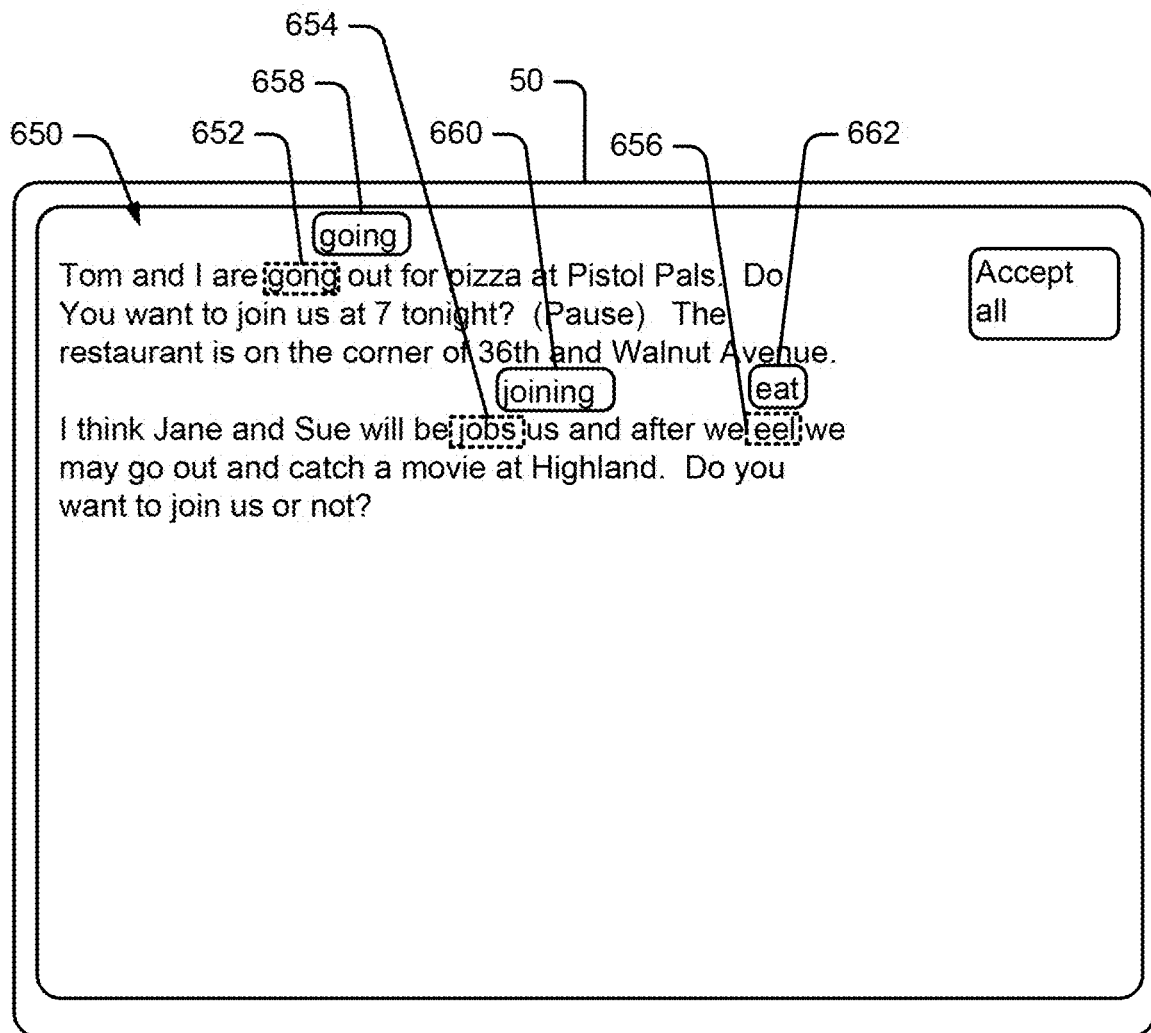
FIG. 20 is similar to FIG. 17, albeit showing a different screen shot.

Consistent with the above comments, see FIG. 20 that shows a screen shot of a call assistant's display screen where potential errors have been highlighted to distinguish the errors from other text. Exemplary call assistant generated text is shown at 650 with errors shown in phantom boxes 652, 654 and 656 that representing highlighting. In the illustrated example exemplary words generated by an automated voice-to-text engine are also presented to the call assistant in hovering fields above the potentially erroneous text as shown at 658, 660 and 662. Here, a call assistant can simply touch a suggested correction in a hovering field to make a correction and replace the erroneous word with the automated text suggested in the hovering field. If a call assistant instead touches an error, the call assistant can manually change the word to another word. If a call assistant does not touch an error or an associated corrected word, the word remains as originally transcribed by the call assistant. An "Accept All" icon is presented at 669 that can be selected to accept all of the suggestions presented on a call assistant's display. All corrected words are transmitted to an assisted user's device to be displayed.

Figure 21:
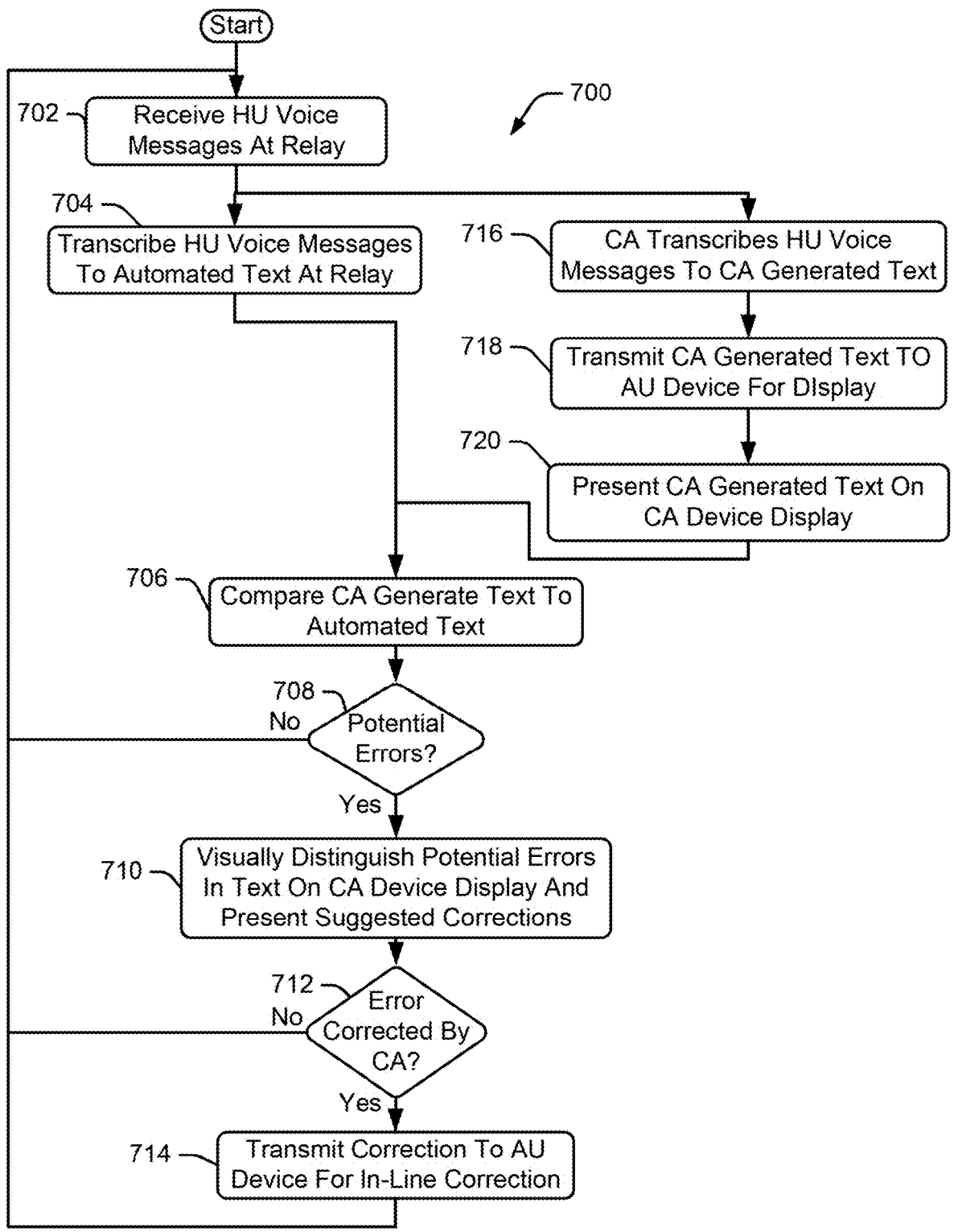
FIG. 21 is a flow chart illustrating a method whereby an automated voice-to-text engine is used to identify errors in call assistant generated text which can be highlighted and can be corrected by a call assistant.

Referring to FIG. 21, a method 700 by which a voice engine generates text to be compared to call assistant generated text and for providing a correction interface as in FIG. 20 for the call assistant is illustrated. At block 702 the hearing user's voice messages are provided to a relay. After block 702 control follows to two parallel paths to blocks 704 and 716. At block 704 the hearing user's voice messages are transcribed into text by an automated voice-to-text engine run by the relay server before control passes to block 706. At block 716 a call assistant transcribes the hearing user's voice messages to call assistant generated text. At block 718 the call assistant generated text is transmitted to the assisted user's device to be displayed. At block 720 the call assistant generated text is displayed on the call assistant's display screen 50 for correction after which control passes to block 706.

Referring still to FIG. 21, at block 706 the relay server compares the call assistant generated text to the automated text to identify any discrepancies. Where the automated text matches the call assistant generated text at block 708, control passes back up to block 702 where the process continues. Where the automated text does not match the call assistant generated text at block 708, control passes to block 710 where the server visually distinguishes the mismatched text on the call assistant's display screen 50 and also presents suggested correct text (e.g., the automated text). Next, at block 712 the server monitors for any error corrections by the call assistant and at block 714 if an error has been corrected, the corrected text is transmitted to the assisted user's device for in-line correction.

In at least some embodiments the relay server may be able to generate some type of probability factor related to how likely a discrepancy between automated and call assistant generated text is related to a call assistant error and may only indicate errors and present suggestions for probable errors or discrepancies likely to be related to errors. For instance, where an automated text segment that is different than an associated call assistant generated text segment but the automated segment makes no sense contextually in a sentence, the server may not indicate the discrepancy or show the automated text segment as an option for correction. The same discrepancy may be shown as a potential error at a different time if the automated segment makes contextual sense.

In still other embodiments automated voice-to-text software that operates at the same time as a call assistant to generate text may be trained to recognize words often missed by a call assistant such as articles, for instance, and to ignore other words that a call assistant is trained to transcribe.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, while the methods above are described as being performed by specific system processors, in at least some cases various method steps may be performed by other system processors. For instance, where a hearing user's voice is recognized and then a voice model for the recognized hearing user is employed for voice-to-text transcription, the voice recognition process may be performed by an assisted user's device and the identified voice may be indicated to a relay 16 which then identifies a related voice model to be used. As another instance, a hearing user's device may identify a hearing user's voice and indicate the identity of the hearing user to the assisted user's device and/or the relay.

As another example, while the system is described above in the context of a two line captioning system where one line links an assisted user's device to a hearing user's device and a second line links the assisted user's device to a relay, the concepts and features described above may be used in any transcription system including a system where the hearing user's voice is transmitted directly to a relay and the relay then transmits transcribed text and the hearing user's voice to the assisted user's device.

As still one other example, while inputs to an assisted user's device may include mechanical or virtual on screen buttons/icons, in some embodiments other inputs arrangements may be supported. For instance, in some cases help or captioning may be indicated via a voice input (e.g., verbal a request for assistance or for captioning).

As another example, in at least some cases where a relay includes first and second differently trained call assistants where first call assistants are trained to capable of transcribing and correcting text and second call assistants are only trained to or capable of correcting text, a call assistant may always be on a call but the automated voice-to-text software may aid in the transcription process whenever possible to minimize overall costs. For instance, when a call is initially linked to a relay so that a hearing user's voice is received at the relay, the hearing user's voice may be provided to a first call assistant fully trained to transcribe and correct text. Here, voice-to-text software may train to the hearing user's voice while the first call assistant transcribes the text and after the voice-to-text software accuracy exceeds a threshold, instead of completely cutting out the relay or call assistant, the automated text may be provided to a second call assistant that is only trained to correct errors. Here, after training the automated text should have minimal errors and therefore even a minimally trained call assistant should be able to make corrections to the errors in a timely fashion.

In other systems an assisted user's device processor may run automated voice-to-text software to transcribe hearing user's voice messages and may also generate a confidence factor to each word in the automated text based on how confident the processor is that the word has been accurately transcribed. The confidence factors over a most recent number of words (e.g., 100) or a most recent period (e.g., 45 seconds) may be averaged and the average used to assess an overall confidence factor for transcription accuracy. Where the confidence factor is below a threshold level, the device processor may link to relay for more accurate transcription either via more sophisticated automated voice-to-text software or via a call assistant. The automated process for linking to a relay may be used instead of or in addition to the process described above whereby an assisted user selects a "caption" button to link to a relay.

In addition to storing hearing user voice models, a system may also store other information that could be used when an assisted user is communicating with specific hearing user's to increase accuracy of automated voice-to-text software when used. For instance, a specific hearing user may routinely use complex words from a specific industry when conversing with an assisted user. The system software can recognize when a complex word is corrected by a call assistant or contextually by automated software and can store the word and the pronunciation of the word by the specific hearing user in a hearing user word list for subsequent use. Then, when the specific hearing user subsequently links to the assisted user's device to communicate with the assisted user, the stored word list for the hearing user may be accessed and used to automate transcription. The hearing user's word list may be stored at a relay, by an assisted user's device or even by a hearing user's device where the hearing user's device has data storing capability.

In other cases a word list specific to an assisted user's device (i.e., to an assisted user) that includes complex or common words routinely used to communicate with the assisted user may be generated, stored and updated by the system. This list may include words used on a regular basis by any hearing user that communicates with an assisted user. In at least some cases this list or the hearing user's word lists may be stored on an internet accessible database so that the assisted user has the ability to access the list(s) and edit words on the list via an internet portal or some other network interface.

In still other embodiments various aspects of a hearing user's voice messages may be used to select different voice-to-text software programs that optimized for voices having different characteristic sets. For instance, there may be different voice-to-text programs optimized for male and female voices or for voices having different dialects. Here, system software may be able to distinguish one dialect from others and select an optimized voice engine/software program to increase transcription accuracy. Similarly, a system may be able to distinguish a high pitched voice from a low pitched voice and select a voice engine accordingly.

In some cases a voice engine may be selected for transcribing a hearing user's voice based on the region of a country in which a hearing user's device resides. For instance, where a hearing user's device is located in the southern part of the United States, an engine optimized for a southern dialect may be used while a device in New England may cause the system to select an engine optimized for another dialect. Different word lists may also be used based on region of a country in which a hearing user's device resides.

To apprise the public of the scope of this invention, the following claims are made:

What is claimed is:

1. A method comprising:
   receiving, at the processor, a hearing user's (HU's) voice signal from an HU that is participating in a first call with an assisted user (AU) wherein the first call is a communication across a communication network;
   determining, by the processor, an identity of the HU;
   training, by the processor, a voice-to-text model associated with the identity of the specific HU that is participating in the first call, wherein the voice-to-text model comprises a plurality of rules, and further wherein each of the plurality of rules is a rule for transcribing a word in the HU's voice signal into text; and
   generating, by the processor, a text output, wherein the text output is a transcribed version of a plurality of words identified in the HU's voice signal, and further wherein at least one of the plurality of words identified is identified using at least one rule of the plurality of rules;
   while the first call is ongoing, automatically determining when accuracy of the voice-to-text model has exceeded a threshold level; and
   wherein, after accuracy of the voice-to-text model has exceeded a threshold level, the text output generated using the voice-to-text model is provided to the AU.

2. The method of claim 1, wherein a relationship is established between the voice-to-text model and the HU identity.

3. The method of claim 2, wherein the training the voice-to-text model comprises:
   receiving, by the processor, a unique identifier, wherein the unique identifier is unique to the HU; and
   establishing, by the processor, the voice-to-text model by associating the voice-to-text model with the unique identifier.

4. The method of claim 3, wherein the training the voice-to-text model further comprises establishing the at least one rule for transcribing a word into text, wherein the at least one rule is established by:
   receiving, by the processor, an input indicating what the word in the HU's voice signal is; and
   generating, by the processor, the text output using the input.

5. The method of claim 4, wherein the input is a communication assistant (CA) audio voice signal, and further wherein the processor can accurately recognize a CA word in the CA audio voice signal, and wherein the CA word indicates the word in the HU's voice signal.

6. The method of claim 4, wherein the input is a sequence of text inputs received by the processor from a user interface, wherein the sequence of text inputs comprises an indication of letters that form the word in the HU's voice signal.

7. The method of claim 1 wherein the plurality of rules are trained over more than one call involving the HU.

8. The method of claim 1 wherein the step of determining an identity of the HU includes identifying a voice profile associated with the HU.

9. The method of claim 1 wherein the communication network is a phone network.

10. The method of claim 1, wherein determining the identity of the HU comprises receiving, by the processor, a unique identifier, wherein the unique identifier is used to determine the identity of the HU.

11. The method of claim 10, wherein the unique identifier comprises at least one of a phone number of the first call participant and an auditory vocal identity of the first call participant.

12. The method of claim 1, further comprising sending the text output to a visual display.

13. The method of claim 12, wherein the visual display is viewable by the AU participating in the first call.

14. The method of claim 1, further comprising receiving, by the processor, a request for communication assistant (CA) assistance from the AU, wherein the request indicates that the AU desires a CA to input the HU's voice signal to generate the text output.

15. The method of claim 14, wherein the request for CA assistance comprises an input received by the processor from a user interface.

16. A system comprising:
a memory;
a processor coupled to the memory, wherein the processor is configured to:
receive a hearing user's (HU's) voice signal from an HU that is participating in a first call with an assisted user (AU) wherein the first call is a communication across a communication network;
determine an identity of the HU;
train a voice-to-text model associated with the identity of the specific HU that is participating in the first call, wherein the voice-to-text model comprises a plurality of rules, and further wherein each of the plurality of rules is a rule for transcribing a word in the HU's voice signal into text; and
generate a text output, wherein the text output is a transcribed version of a plurality of words identified in the HU's voice signal, and further wherein at least one of the plurality of words identified is identified using at least one rule of the plurality of rules;
while the first call is ongoing, automatically determine when accuracy of the voice-to-text model has exceeded a threshold level; and
wherein, after accuracy of the voice-to-text model has exceeded a threshold level, the text output generated using the voice-to-text model is provided to the AU.

17. A software program stored in a memory for execution by a processor, the program causing the processor to:
receive a hearing user's (HU's) voice signal from an HU that is participating in a first call with an assisted user (AU) wherein the first call is a communication across a communication network;
determine an identity of the HU;
train a voice-to-text model associated with the identity of the specific HU that is participating in the first call, wherein the voice-to-text model comprises a plurality of rules, and further wherein each of the plurality of rules is a rule for transcribing a word in the HU's voice signal into text; and
generate a text output, wherein the text output is a transcribed version of a plurality of words identified in the HU's voice signal, and further wherein at least one of the plurality of words identified is identified using at least one rule of the plurality of rules;
while the first call is ongoing, automatically determine when accuracy of the voice-to-text model has exceeded a threshold level; and
wherein, after accuracy of the voice-to-text model has exceeded a threshold level, the text output generated using the voice-to-text model is provided to the AU.

18. A method comprising:
storing at least one voice recognition profile and at least one associated voice model for converting a voice signal to text in a memory device that is linked to a processor, the voice model including a plurality of rules, at least a subset of the rules for transcribing words in a voice signal into text;
receiving, at the processor, a hearing user's (HU's) voice signal from an HU that is participating in a first call with an assisted user (AU) wherein the first call is a communication across a communication network;
the processor programmed to perform the steps of:
comparing the HU voice signal to at least a subset of the voice recognition profiles to identify a specific voice recognition profile that corresponds to the HU voice signal;
accessing the voice model associated with the identified specific voice recognition profile; and
generating a text output, wherein the text output is a transcribed version of a plurality of words identified in the audio voice signal of the HU, and further wherein at least one of the plurality of words identified is identified using at least one rule of the plurality of rules.

19. The method of claim 18, further comprising establishing, by the processor, the voice model for the HU during calls with the AU.

20. The method of claim 19, wherein the step of establishing the voice model includes receiving automated text generated by a voice to text transcription program and receiving call assistant (CA) generated text and comparing the automated text to the CA generated text and, where the CA generated text for a word is different than the automated text for the word, creating a new rule whereby, the next time the HU voice signal includes the word, the transcription program provides the CA generated text.

21. The method of claim 19, wherein the step of establishing the voice model includes establishing the at least one rule for transcribing a word into text, wherein the at least one rule is established by:
receiving, by the processor, an input indicating what the word in the HU voice signal is; and
generating the text output using the input.

22. The method of claim 18 wherein the plurality of rules is established over more than one call involving the HU.

23. The method of claim 18 wherein the processor is further programmed to perform the steps of, prior to identifying a specific voice recognition profile, receiving a unique identifier and using the unique identifier to identify a subset of voice recognition profiles to be compared to the HU voice signal to identify the specific voice recognition profile.

24. The method of claim 18, further comprising sending the text output to a visual display.

25. The method of claim 24, wherein the visual display is viewable by the AU participating in the first call.

26. The method of claim 18 wherein the processor is further programmed to receive a request for call assistant (CA) assistance from the AU, wherein the request indicates that the AU desires a CA to input the HU's voice signal or generate the text output.

27. The method of claim 26, wherein the request for CA assistance comprises an input received by the processor from a user interface.

* * * * *